United States Patent
Juchniewicz et al.

(10) Patent No.: US 11,723,478 B2
(45) Date of Patent: Aug. 15, 2023

(54) FOLDABLE CHILD ENCLOSURE

(71) Applicant: Thorley Industries, LLC, Pittsburgh, PA (US)

(72) Inventors: Richard Juchniewicz, Pittsburgh, PA (US); Michael Laude, Upton, MA (US); Jared Rosenthal, Pittsburgh, PA (US)

(73) Assignee: Thorley Industries, LLC, Pittsburgh, PA (US)

( * ) Notice: Subject to any disclaimer, the term of this patent is extended or adjusted under 35 U.S.C. 154(b) by 593 days.

(21) Appl. No.: 16/675,682

(22) Filed: Nov. 6, 2019

(65) Prior Publication Data

US 2020/0281369 A1    Sep. 10, 2020

Related U.S. Application Data

(60) Provisional application No. 62/902,263, filed on Sep. 18, 2019, provisional application No. 62/852,657, filed on May 24, 2019, provisional application No. 62/837,578, filed on Apr. 23, 2019, provisional application No. 62/814,219, filed on Mar. 5, 2019.

(51) Int. Cl.
| | |
|---|---|
| *A47D 13/06* | (2006.01) |
| *F16H 21/54* | (2006.01) |
| *G05G 1/02* | (2006.01) |
| *F16H 19/04* | (2006.01) |
| *G05G 9/00* | (2006.01) |

(52) U.S. Cl.
CPC ........... *A47D 13/063* (2013.01); *F16H 19/04* (2013.01); *F16H 21/54* (2013.01); *G05G 1/02* (2013.01); *G05G 9/00* (2013.01)

(58) Field of Classification Search
CPC .... A47D 13/06; A47D 13/061; A47D 13/063; A47D 13/065; A47D 13/068; F16H 19/04; F16H 21/54; G05G 1/02; G05G 9/00
See application file for complete search history.

(56) References Cited

U.S. PATENT DOCUMENTS

| | | | |
|---|---|---|---|
| 4,811,437 A | 3/1989 | Dillner | |
| 6,511,562 B1 * | 1/2003 | Coffield | A47C 4/30 156/196 |
| 6,560,827 B1 * | 5/2003 | Gross | A47C 17/84 5/120 |
| 6,859,957 B1 | 3/2005 | Chen | |

(Continued)

FOREIGN PATENT DOCUMENTS

| | | |
|---|---|---|
| CN | 105124982 | 12/2015 |
| CN | 104720432 | 11/2017 |

*Primary Examiner* — David R Hare
*Assistant Examiner* — George Sun
(74) *Attorney, Agent, or Firm* — Perman & Green, LLP

(57) ABSTRACT

A child enclosure including a hub member including a crank link, a substantially four bar articulated link operably connected to the crank link, a push rod connected to the substantially four bar articulated link so that linear movement of the crank link effects, through the substantially four bar articulated link, a linear driving motion of the push rod, and a slide wedge coupled to the push rod, the slide wedge includes a slider and a pivot surface biasing the slider transverse to the linear driving motion of the push rod, where the linear driving motion of the push rod extends and retracts the slider.

26 Claims, 56 Drawing Sheets

(56) References Cited

U.S. PATENT DOCUMENTS

| | | | | |
|---|---|---|---|---|
| 7,836,530 B2* | 11/2010 | Thorne | ................ | A47D 13/063 |
| | | | | 5/98.1 |
| 8,998,241 B1 | 4/2015 | Cheng | | |
| 9,756,964 B2 | 9/2017 | Yang | | |
| 10,709,260 B2* | 7/2020 | Huang | .................... | A47D 9/005 |
| 2006/0021137 A1* | 2/2006 | Waldman | ............. | A47D 13/063 |
| | | | | 5/99.1 |
| 2007/0017025 A1 | 1/2007 | Myer | | |
| 2007/0079854 A1 | 4/2007 | You | | |
| 2010/0162484 A1* | 7/2010 | Thomas | ................... | A47D 5/00 |
| | | | | 5/93.1 |
| 2011/0173496 A1 | 7/2011 | Hosek et al. | | |
| 2014/0041116 A1* | 2/2014 | Rosenthal | ............ | A47D 13/063 |
| | | | | 5/99.1 |
| 2015/0122301 A1 | 5/2015 | Zhou | | |
| 2015/0272343 A1* | 10/2015 | Hung | ................... | A47D 13/061 |
| | | | | 5/99.1 |
| 2016/0338506 A1* | 11/2016 | Yang | ................... | A47D 13/063 |
| 2017/0280892 A1* | 10/2017 | Zhang | ................. | A47D 13/063 |

* cited by examiner

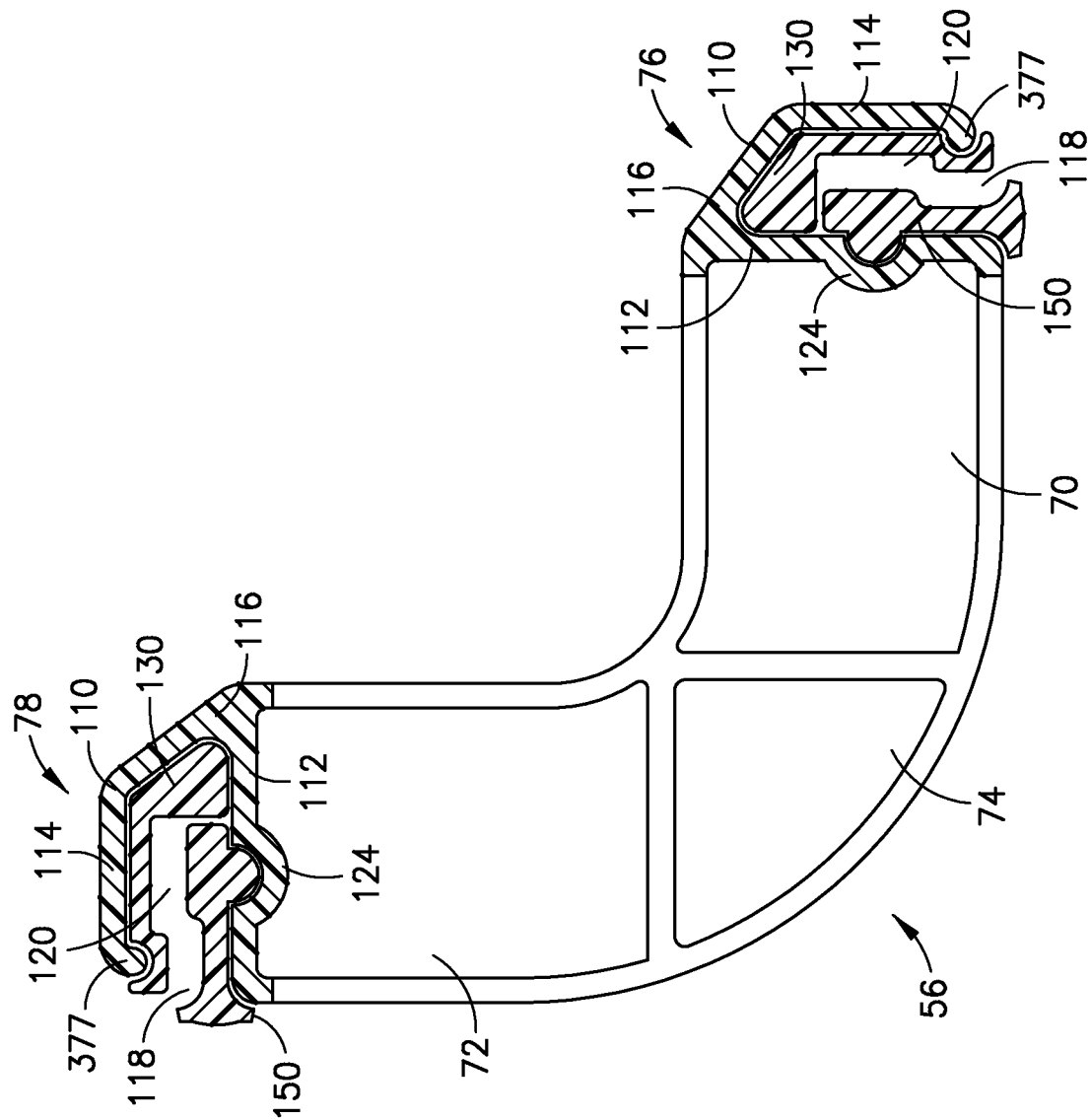

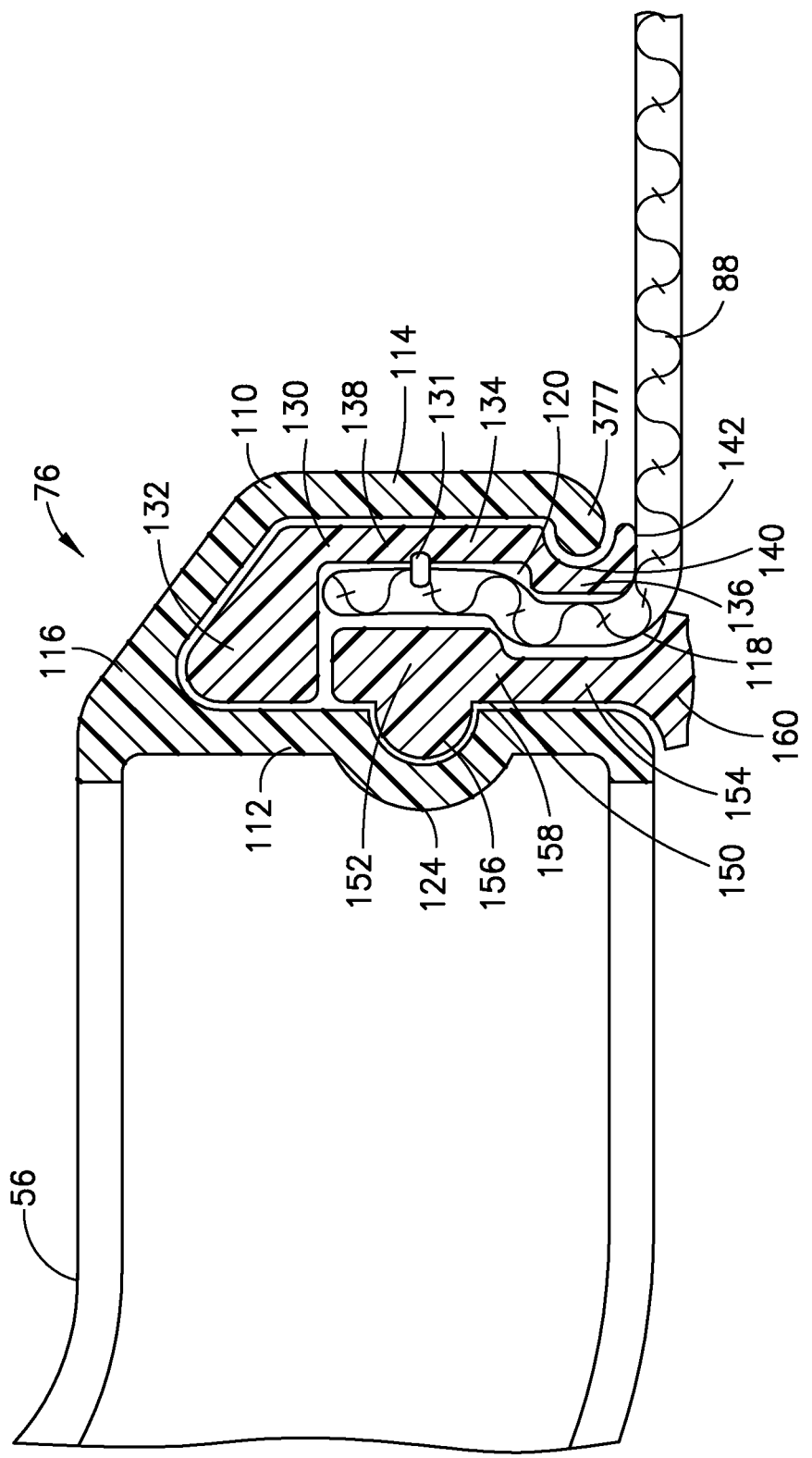

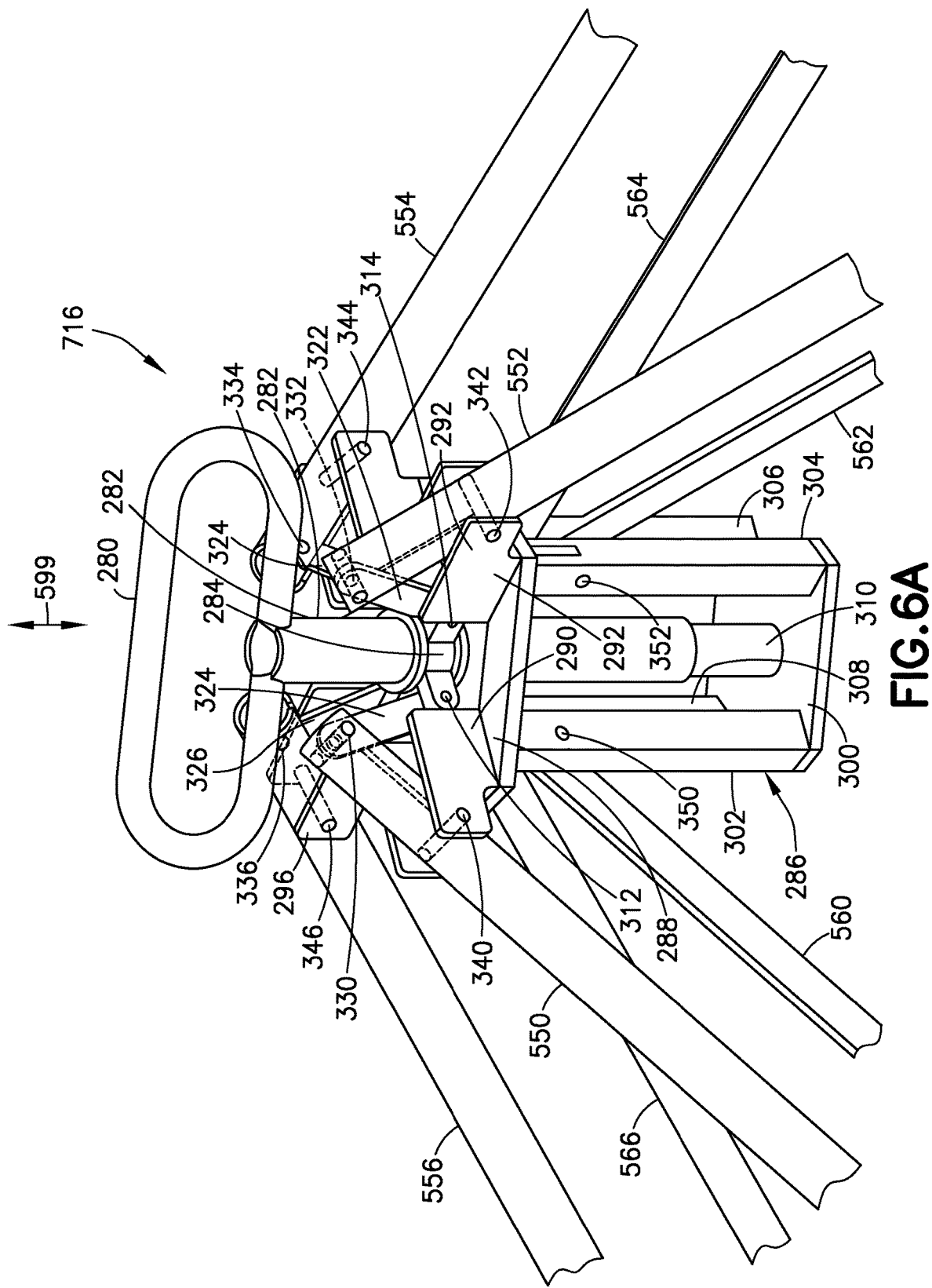

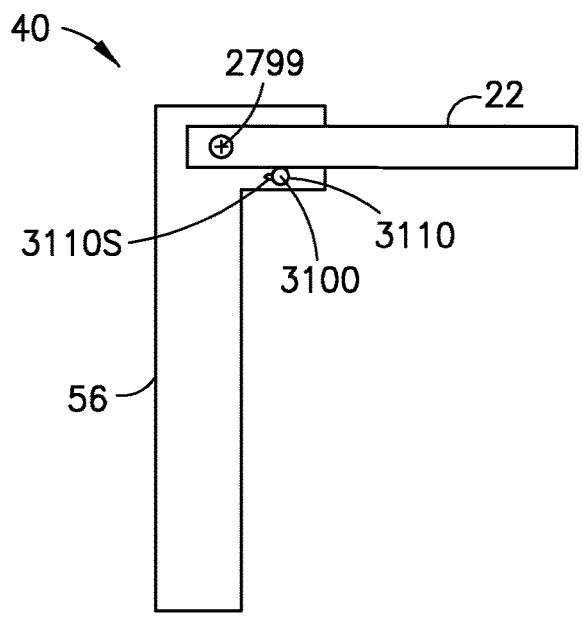
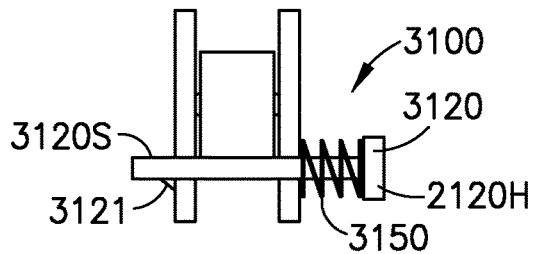
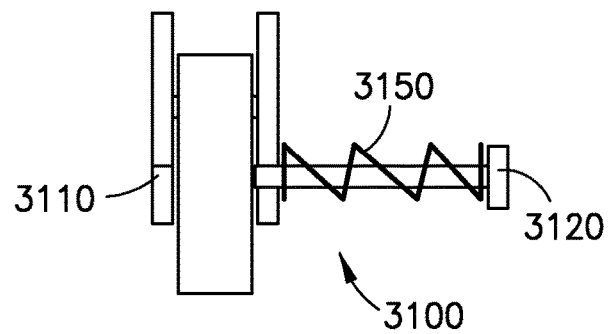
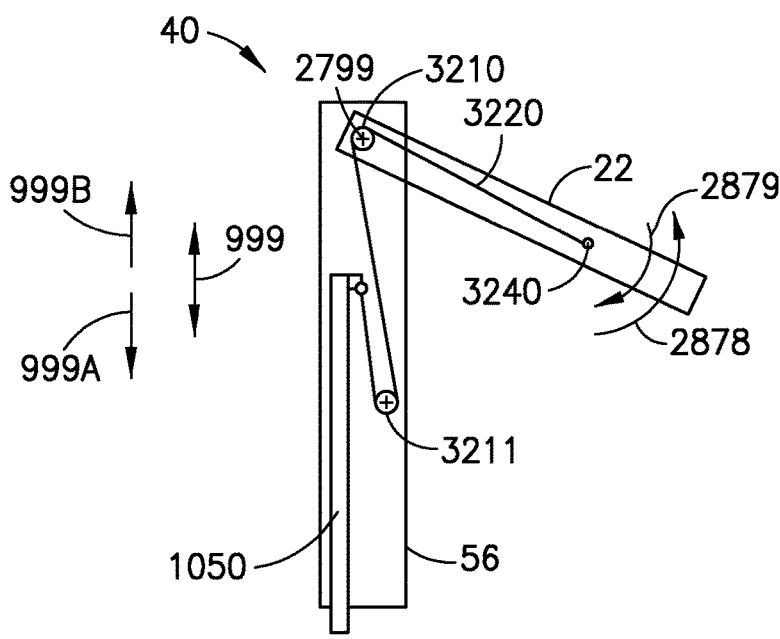
FIG.31A
FIG.31B
FIG.31C
FIG.32

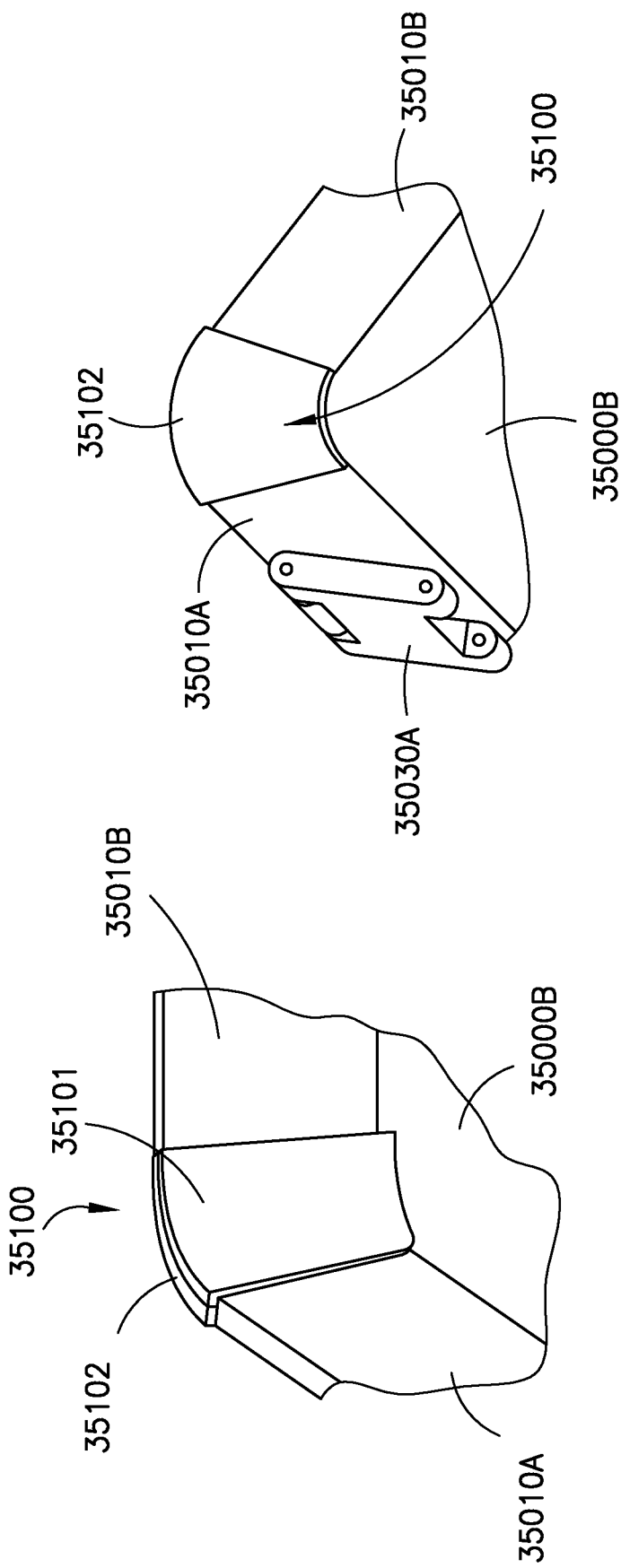

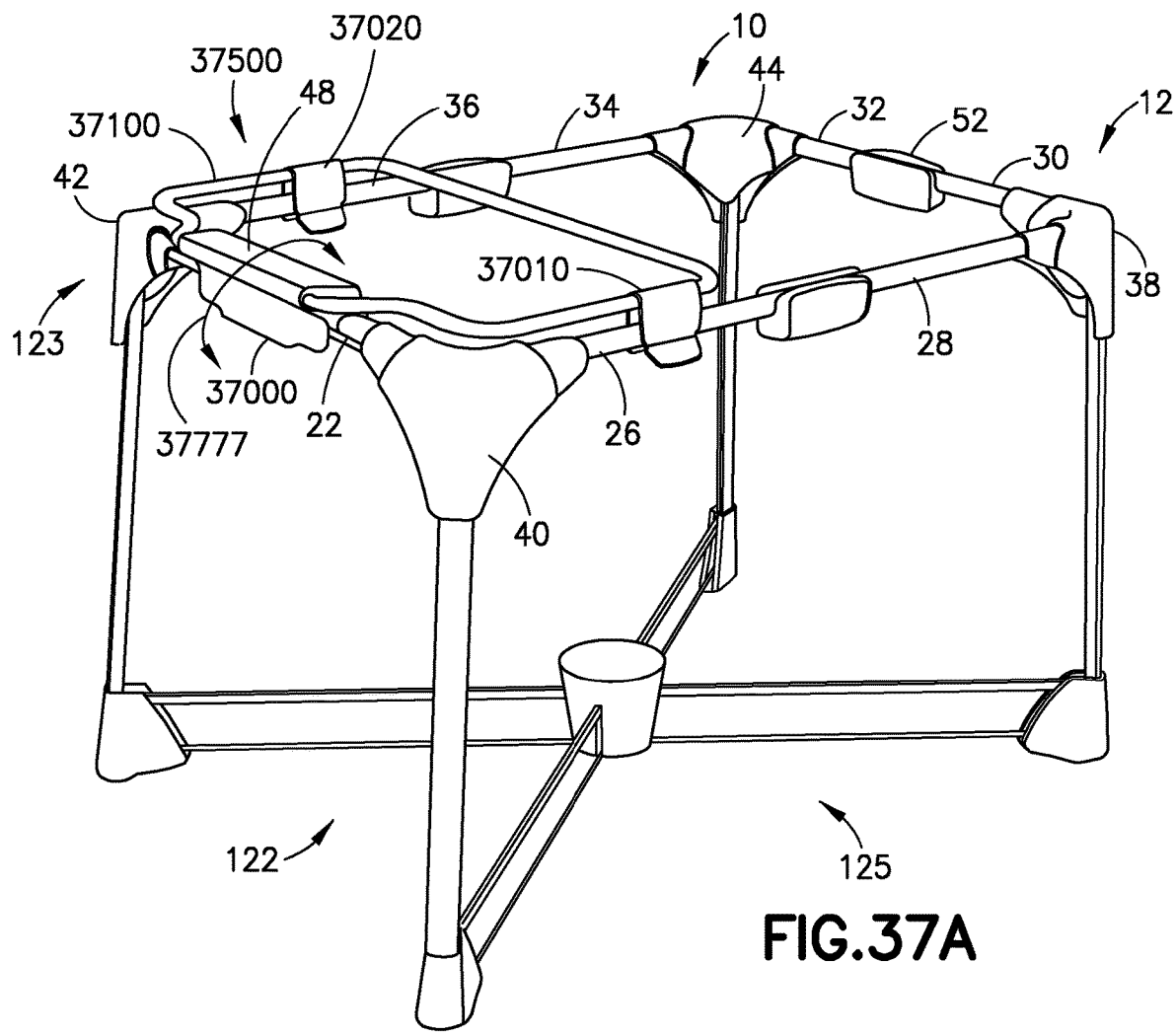
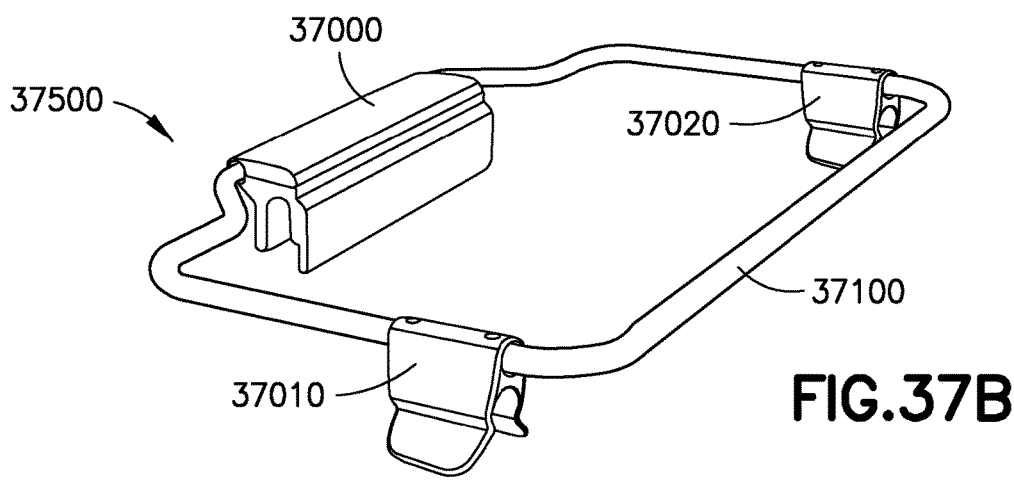

FOLDABLE CHILD ENCLOSURE

CROSS-REFERENCE TO RELATED APPLICATIONS

This application is a non-provisional of and claims the benefit of U.S. provisional application No. 62/814,219 filed on Mar. 5, 2019, U.S. provisional application No. 62/837,578 filed on Apr. 23, 2019, U.S. provisional application No. 62/852,657 filed on May 24, 2019, and U.S. provisional application No. 62/902,263 filed on Sep. 18, 2019, all of which are titled "Foldable Child Enclosure" and the disclosures of which are incorporated herein by reference in their entireties.

BACKGROUND

1. Field

The exemplary embodiments generally relate to child enclosures, and more particularly, to foldable child enclosures.

2. Brief Description of Related Developments

Foldable child enclosures, also known as play yards, playpens, and crib devices, generally form a fairly compact package when collapsed or folded that can be carried and transported by a user. However, foldable child enclosures may be difficult to handle when folding and unfolding because of generally clumsy operating mechanisms.

Generally, to fold a child enclosure a central lower mechanism is pulled upwards and the upper rails of the child enclosure are unlatched by the user (where the upwards motion of the central lower mechanism causes the child enclosure to fold). In some instances of the child enclosures a release mechanism may be provided that causes a cable to unlatch the upper rails so that the child enclosure may be folded from a deployed configuration; however these cables may not serve to latch the upper rails when the child enclosure is deployed to an unfolded configuration. A lower structure, including the central lower mechanism, of the child enclosure may also include diagonal braces and side members making the child enclosure complicated and heavy.

Child enclosure designs generally include complex interconnections of linkages, cables, and/or gear assemblies so as to provide ease of operation and compact folding of the child enclosure. However, such designs are often expensive to manufacture and assemble, where during assembly each child enclosure may be calibrated so that the child enclosure folds correctly.

In addition to the above, existing foldable child enclosures generally include a bed frame structure that has upright tubes that form the frame of the bed structure and fabric sheets attached between the tubes to form the enclosure walls. The enclosure members or walls are generally rectangular fabric pieces that include sleeves that are pulled over the upright tubes to form taut stretched walls between the tube members. Alternatively, the enclosure members may be attached to the tubes with fastening members such as a screw, pins, nails, or staples. The upright tubes support the enclosure members and hold them taut to form the walls of the child enclosure. In one example of fastening a fabric enclosure member to an upright tube of a foldable child enclosure includes the fabric member being held within the upright tube so that the fabric enclosure member extends from the upright tube through a longitudinal slit in the upright tube. For example, a positioning post mounted along the edge of the fabric enclosure member may be inserted in the upright tube. In this case, the attachment mechanism may be enclosed within the upright tube structure. However, such systems for affixing a fabric enclosure member to the frame or upright tube of the child enclosure may not be aesthetically pleasing. Furthermore, presently available fastening mechanisms often cause the enclosure member to stretch or tear when the playpen structure is folded or unfolded.

BRIEF DESCRIPTION OF THE DRAWINGS

The foregoing aspects and other features of the disclosed embodiment are explained in the following description, taken in connection with the accompanying drawings, wherein:

FIG. 3 schematically illustrates an exemplary cross section of an upright post of the frame of the foldable enclosure apparatus of FIG. 1 in accordance with aspects of the present disclosure;

FIG. 4A schematically illustrates a coupling of the flexible enclosure of the foldable enclosure apparatus to the frame in accordance with aspects of the present disclosure;

FIGS. 6A-6C are schematic illustrations of a central hub of the foldable enclosure apparatus of FIG. 1A in accordance with aspects of the present disclosure;

FIGS. 31A-31C is a schematic illustration of a portion of an upper corner assembly of the foldable enclosure apparatus of FIG. 1A in accordance with aspects of the present disclosure;

FIG. 32 is a schematic illustration of a portion of an upper corner assembly of the foldable enclosure apparatus of FIG. 1A in accordance with aspects of the present disclosure;

FIGS. 35A-35G are schematic illustrations of a changing station of the foldable enclosure apparatus respectively in deployed and stowed configurations in accordance with aspects of the present disclosure;

FIGS. 37A-37E are schematic illustrations of a changing station of the foldable enclosure apparatus respectively in deployed and stowed configurations in accordance with aspects of the present disclosure.

DETAILED DESCRIPTION

Figure 1A:
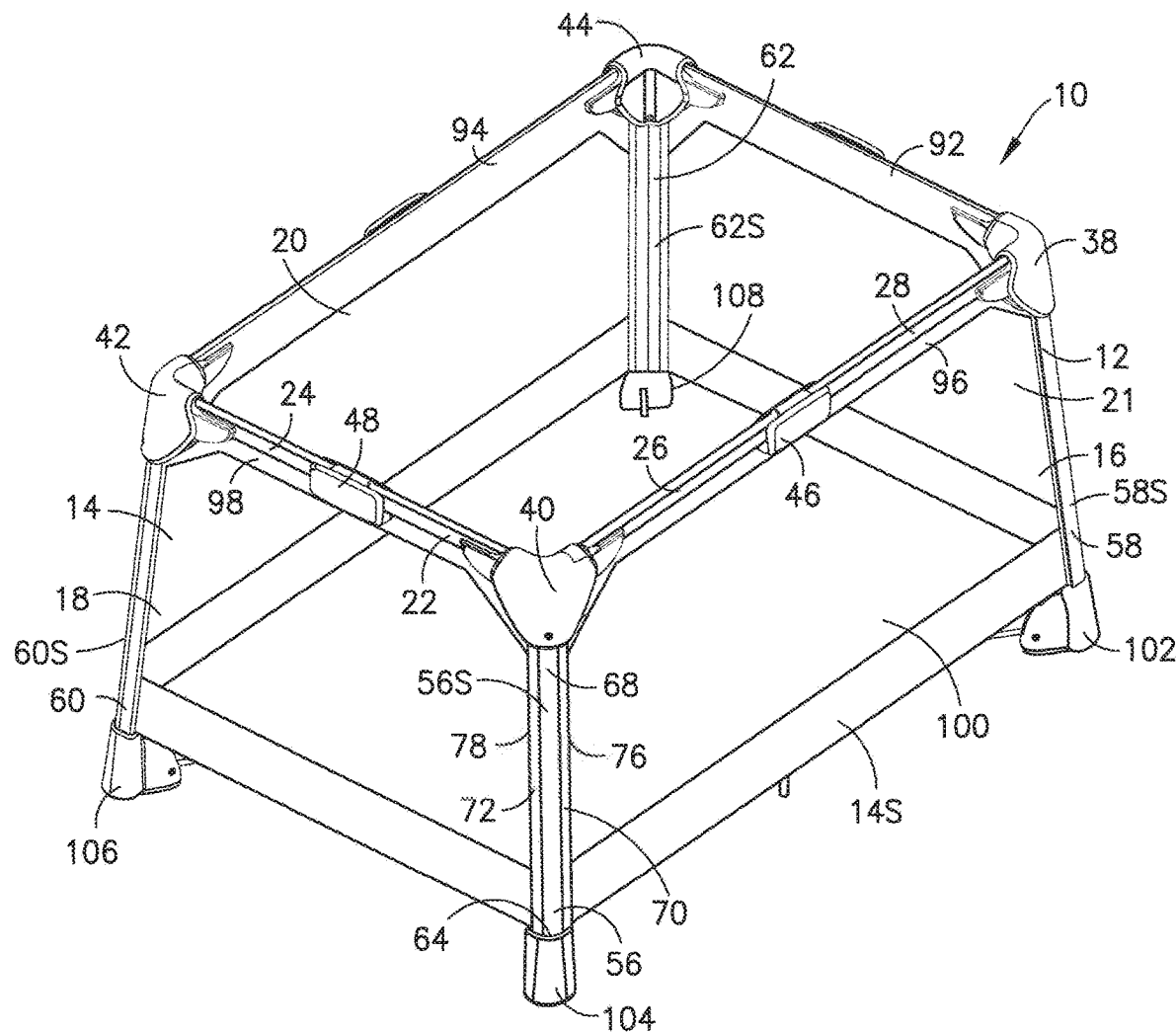
FIG. 1A is a schematic illustration of a foldable enclosure apparatus, incorporating aspects of the present disclosure, in an unfolded or deployed configuration.

FIG. 1A illustrates an exemplary foldable enclosure apparatus 10 in the form of a child enclosure (also referred to as a play yard or playpen), in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

Figure 1B:
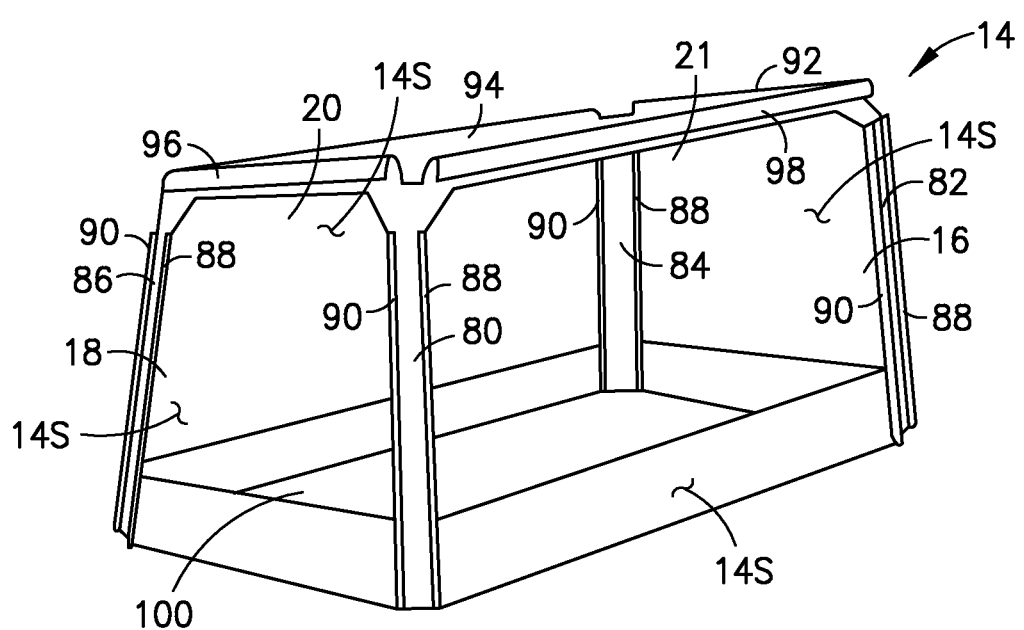
FIG. 1B schematically illustrates a flexible enclosure of the foldable enclosure apparatus of FIG. 1A in accordance with aspects of the present disclosure.
Figure 1C:
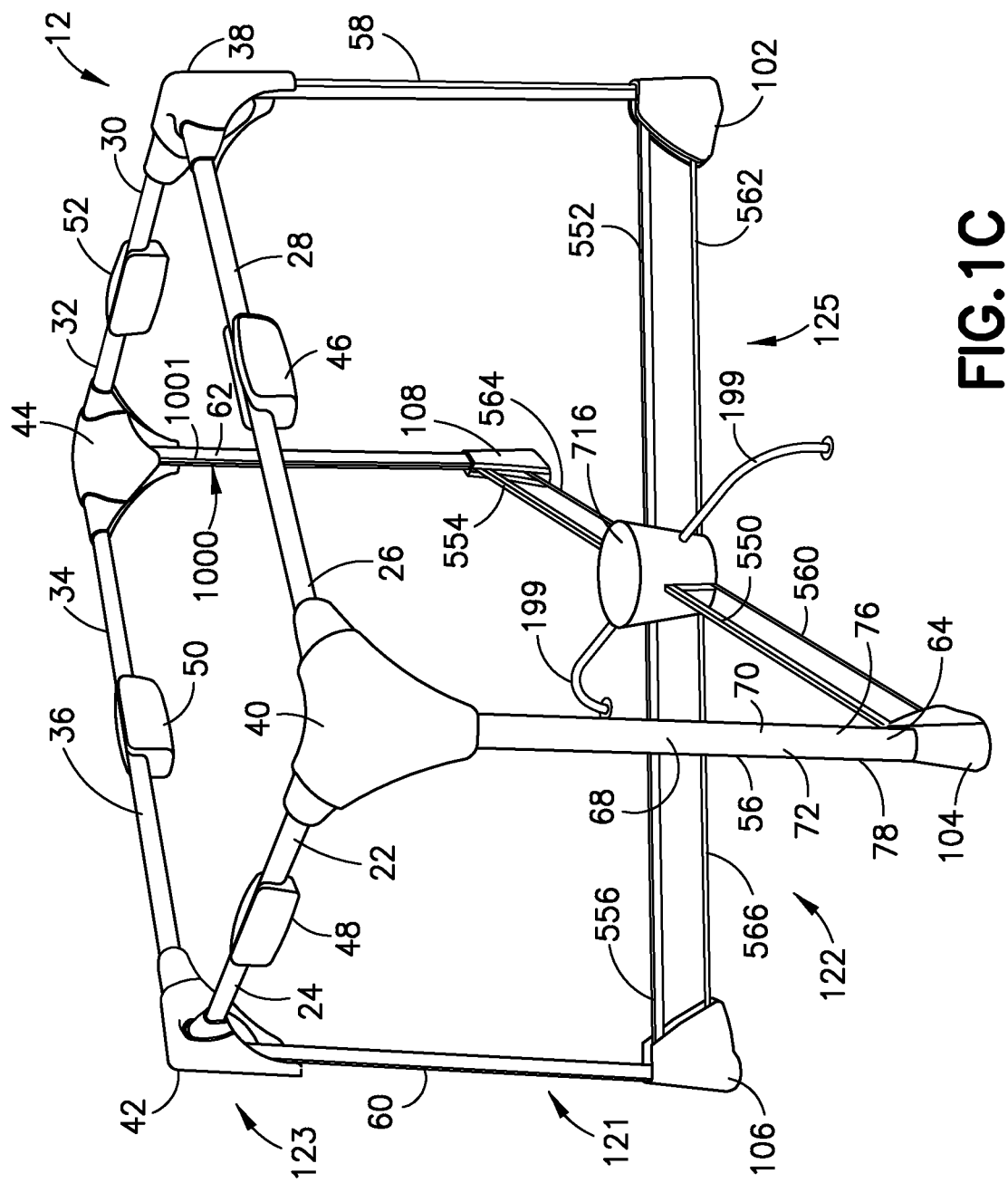
FIG. 1C schematically illustrates a frame of the foldable enclosure apparatus of FIG. 1A, incorporating aspects of the present disclosure, in the unfolded or deployed configuration.
Figure 2A:
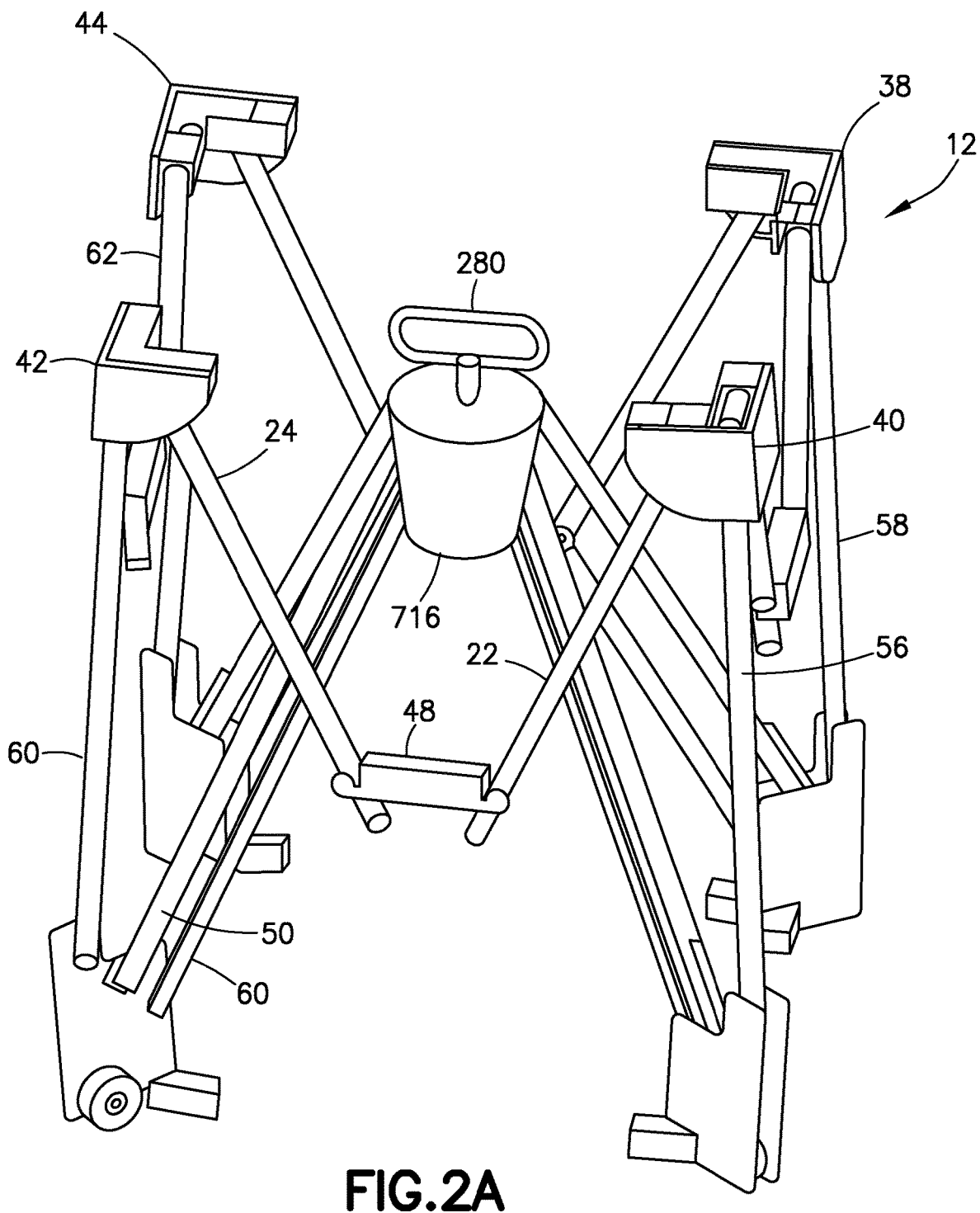
FIG. 2A schematically illustrates the frame of the foldable enclosure apparatus of FIG. 1A, incorporating aspects of the present disclosure, in a partially folded configuration.
Figure 2B:
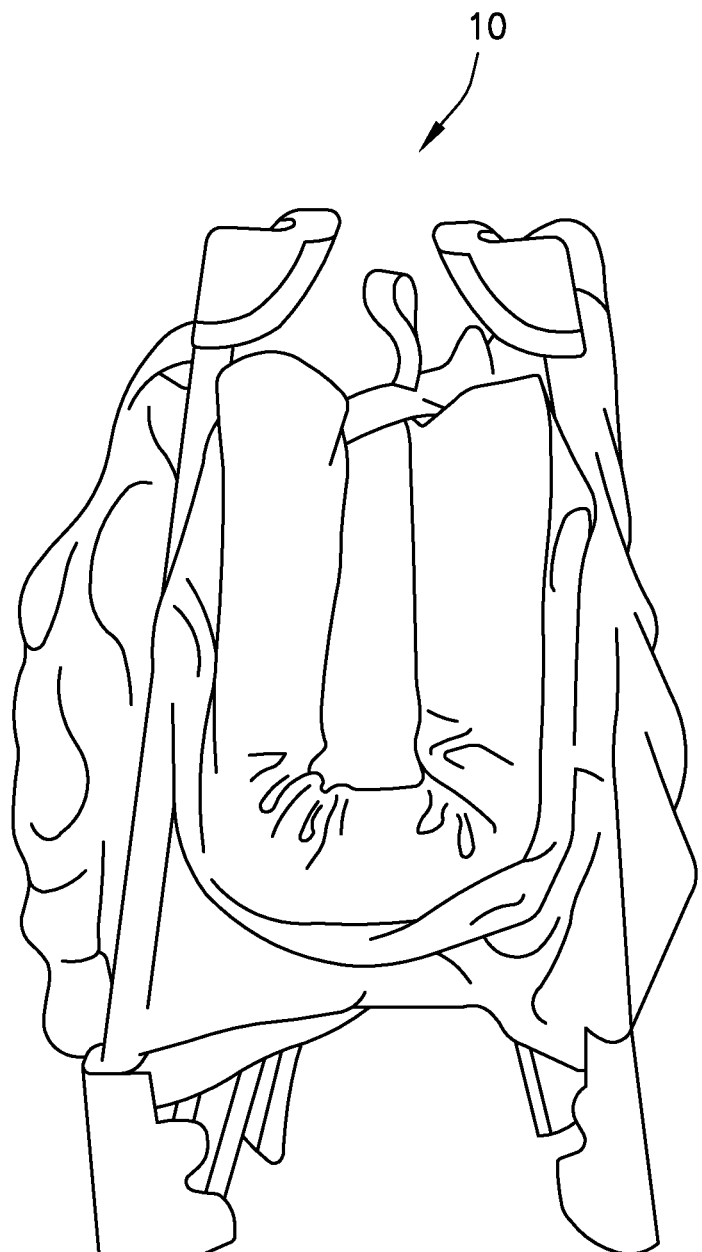
FIG. 2B schematically illustrates the foldable enclosure apparatus of FIG. 1A, with the flexible enclosure attached to the frame, in a folded configuration in accordance with aspects of the present disclosure.

Referring to FIGS. 1A-1C, the foldable enclosure apparatus 10 is portable and, as such, is foldable, closable, or collapsible for easy transition between an opened (e.g., unfolded or deployed) configuration (shown in FIG. 1A) and a folded (e.g., closed) configuration (shown in FIG. 2B). The foldable enclosure apparatus 10 includes a frame 12 connected to a flexible enclosure 14, having one or more sheets 14S, that forms walls 16, 18, 20, 21 of the foldable enclosure apparatus 10. The sheets 14S may be formed from any suitable material (e.g., a woven fabric material, a mesh material, or a combination thereof) that is flexible enough to be folded but is sufficiently strong to avoid tearing, puncturing, or stretching during prolonged use.

Figure 2C:
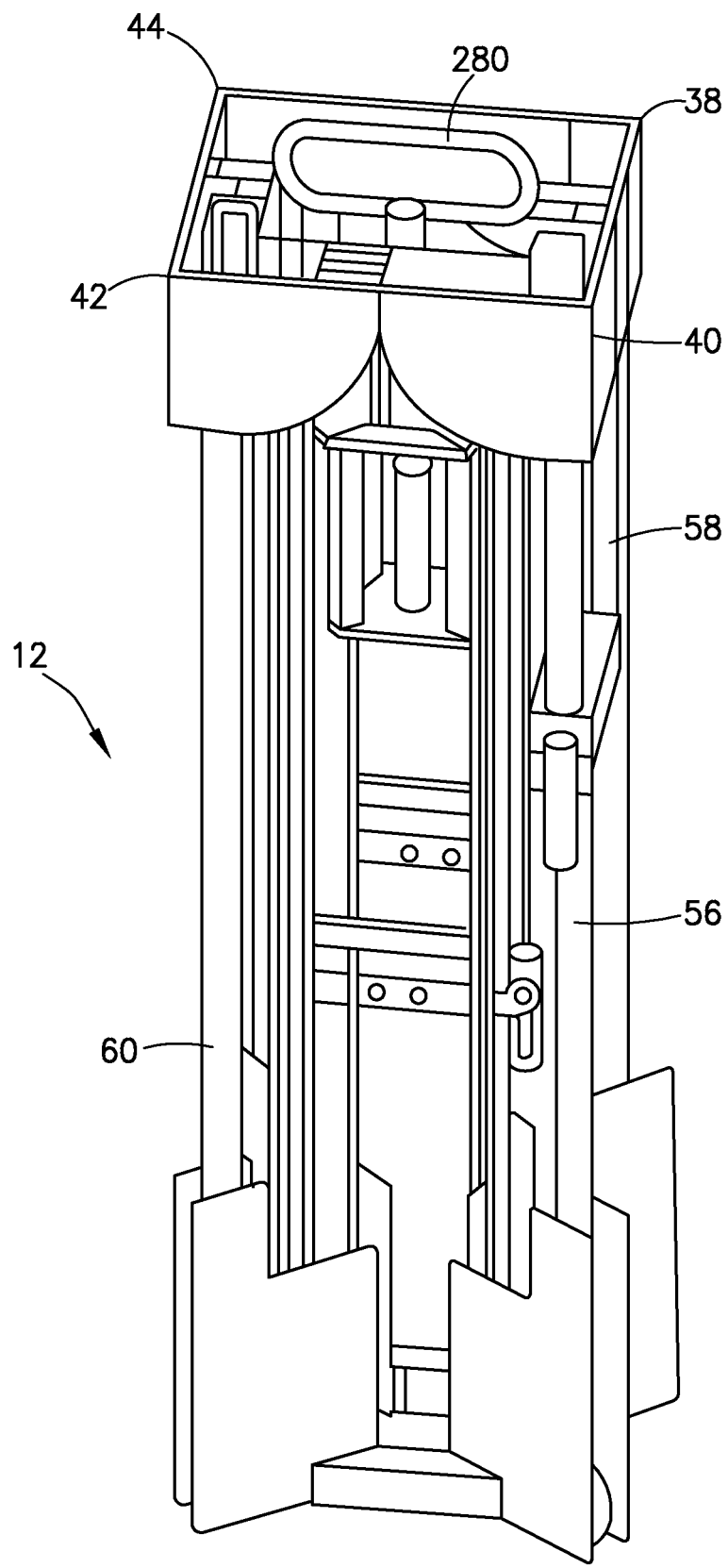
FIG. 2C schematically illustrates the frame of the foldable enclosure apparatus of FIG. 1A in the folded configuration in accordance with aspects of the present disclosure.

The frame 12 includes an upper assembly 123, a side structure 121, a base structure 122, and a central hub member 716 (referred to herein as hub member 716). The upper assembly includes, for example, eight upper arms 22, 24, 26, 28, 30, 32, 34, 36, four upper corner assemblies 38, 40, 42, 44, and four stiffening members 46, 48, 50, 52. In other aspects, the frame may include any suitable number of arms, corner assemblies and stiffening members which may depend on a shape and number of sides of the foldable enclosure apparatus 10 (e.g., rectangular, hexagonal, triangular, octagonal, etc.). The stiffening members 46, 48, 50, 52 may pivotally couple adjacent upper arms 22, 24, 26, 28, 30, 32, 34, 36 to each other while providing a joint between the adjacent upper arms 22, 24, 26, 28, 30, 32, 34, 36 so that the adjacent upper arms 22, 24, 26, 28, 30, 32, 34, 36 may pivot and fold relative to one another (see FIG. 2A) when the foldable enclosure apparatus 10 is folded and unfolded. For example, referring also to FIG. 2A, stiffening member 48 pivotally couples adjacent upper arms 22, 24 to each other so that the adjacent upper arms 22, 24 may be articulated between a folded configuration (shown in FIG. 2C) or partially folded configuration (as shown in FIG. 2A) and an unfolded configuration (as shown in FIG. 1C). In one aspect, the upper arms 22, 24 may be locked in the unfolded configuration by a push rod system 1000 (FIG. 10A) of the foldable child enclosure 10 as described herein. In other aspects, the upper arms 22, 24 may be locked in the unfolded configuration using biased locking members as described in U.S. Pat. No. 7,836,530 issued on Nov. 23, 2010 and titled "Foldable Child Enclosure", the disclosure of which is incorporated herein by reference in its entirety.

The side structure 121 is coupled to the upper assembly 123 in any suitable manner, such as described herein, and includes four generally vertically disposed upright posts 56, 58, 60, 62. Each upright post includes a stanchion 56S, 58S, 60S, 62S and a wheel assembly 102, 104, 106, 108 (see FIGS. 1A and 1C). The wheel assemblies 102, 104, 106, 108 may be referred to as compact and are configured to support the respective stanchion 56S, 58S, 60S, 62S, provide a coupling locations for the base structure 122, and form a respective foot for the foldable enclosure apparatus 10 to rest on or be supported by. The base structure 122 is coupled to the side structure 121 in any suitable manner such at the wheel assembly 102, 104, 106, 108 (as described herein) or to the stanchion 56S, 58S, 60S, 62S. The base structure is also coupled to the hub member 716 in any suitable manner, such as described herein, and includes a plurality of substantially four bar articulated links 125.

To avoid redundancy, only a portion or portions of the frame 12 will be described in detail. All other like structures of the frame 12 are configured in the same manner. All pivotal couplings between members of the frame 12 may be formed by any suitable mechanical connections such as rivets, bolts, rods, pins, or any other suitable structure. In some aspects, the mechanical connections form respective axes of rotation (such as with respect to the upper arms 22, 24, 26, 28, 30, 32, 34, 36, the plurality of substantially four bar articulated links 125, and the push rod system 1000 as described herein) and are configured to pivotally join (e.g., such as through threaded fastening, interference fit, retaining clips, etc.) to members to each other with or without the employment of bushings between the mechanical connections and the frame members and/or bushings between the frame members.

Referring to FIGS. 1A and 1C, the upper arm 22 is pivotally connected to a respective corner assembly 40 (such as by a bracket 933 shown in FIG. 9A) and to the stiffening member through any suitable mechanical connections such as those described above. The remaining upper arms 24, 26, 28, 30, 32, 34, 36 are coupled to their respective upper corner assemblies 40, 38, 42, 44 and stiffening members 46, 48, 50, 52 in a similar fashion.

The upright post 56 includes a bottom end 64 (at which the wheel assembly 104 is disposed) and a top end 68 connected to a respective upper corner assembly 40. In one aspect, the corner assembly 40 may be integral to the upright post 56 or coupled to the upright post 56 in any suitable manner so as to form a portion of the upright post 56. The upright posts 56, 58, 60, 62 may pivot or tilt outwardly and, at the same time, pull the respective upper corner assembly 38, 40, 42, 44 outwardly or apart from one another. In one aspect, referring also to FIG. 3, the upright post 56 is shown for exemplary purposes only as having a generally L-shaped cross-section with two sides 70, 72 extending outward from a central portion 74. In other aspect, the upright post 56 may have any suitable cross-section configured to accommodate the push rod system 1000 (FIG. 10A) that couples the upper assembly 123 to the base structure 122 for actuation (e.g., folding and unfolding) of the upper arms 24, 26, 28, 30, 32, 34, 36 as described herein.

Clamps 76 are connected to one or more sides 70, 72 of the upright post 56, and extend longitudinally along each side 70, 72 of the upright post 56. The clamps 76 are configured to hold and retain the flexible enclosure 14 to the upright post 56 described herein.

In the aspect illustrated in the figures the flexible enclosure 14 has a generally rectangular or square shape that corresponds to the shape of the frame 12 of the foldable enclosure apparatus 10; however, in other aspects the shape of the enclosure may be e.g., rectangular, hexagonal, triangular, octagonal, etc. depending on the shape of the frame 12. In this aspect, the flexible enclosure 14 is formed from four connected sheets 14S that, when connected to the upright posts 56, 58, 60, of the frame 12, become the walls 16, 18, 20, 21 of the foldable enclosure apparatus 10. The flexible enclosure 14 has four vertical corners 80, 82, 84, 86 that correspond to the upright posts 56, 58, 60, 62 of the frame 12.

In one aspect, each vertical corner 80, 82, 84, 86 includes two edges 88, 90. Each edge 88, 90 is configured in any suitable manner (e.g., double stitched, reinforced, etc.) to be received within the clamp 76, 78 of the respective upright post 56, to support the flexible enclosure 14 by providing structural stability for the walls 16, 18, 20, 21. The flexible enclosure 14 may be formed from any suitable flexible material that may be folded or rolled, such as natural fabrics or synthetic polymer fabrics, including but not limited to nylon, polyester, and the like. The flexible enclosure 14 may be manufactured from a plurality of sheets that are separate from each other when connected to the frame 12 of the foldable enclosure apparatus 10 or may be formed from a single sheet that is folded to form the walls 16, 18, 20, 21. In some aspects, central portions of the sheets of the flexible enclosure 14 may be formed from a softer, mesh material allowing the child or other occupant of the foldable enclosure apparatus 10 to look through the walls 16, 18, 20, 21 to see objects outside of the flexible enclosure 14.

With reference to FIGS. 3 and 4A, one aspect of the clamp 76, 78 for connecting the edge 88 of the flexible enclosure 14 to the upright post 56 is illustrated. Once again, to prevent redundancy, the structure of clamp 76 is described herein; however, clamp 78 is similarly configured and it is understood that a substantially identical clamp is included on each side of each upright post 56, 58, 60, 62. Accordingly, in one aspect, the foldable enclosure apparatus 10 of the present invention will include eight clamps (again depending on the number of sides formed by the frame 12) for securing the flexible enclosure 14 to the four respective upright posts 56, 58, 60, 62.

In one aspect, the clamp 76 includes a U-shaped housing 110 having a proximal arm 112 and a distal arm 114. As used herein, "proximal" refers to the portion of the clamp nearest the respective upright post 56; and "distal" refers to the portion of the clamp 76 farthest away from the respective upright post 56. The arms 112, 114 are attached together at a hub member 116 and extend away from the hub member 116 to define a slit/slot like opening 118 (referred to herein as the slit opening 118) at an opposite end of the housing 110 from the hub member 116. The slit opening 118 extends longitudinally along the length of the housing 110, where the longitudinal length of the housing 110 extends at least partially along a length of the respective upright post 56 between the bottom end 64 and the top end 68 of the respective upright post 56. The proximal arm 112 is connected to the respective side 70 of the respective upright post 56. In one aspect, the housing 110 may be integrally formed with the respective upright post 56, such that the side 70 of the respective upright post 56 forms the proximal arm 112 of the clamp housing 110; while in other aspects, the clamp 76 may be a separate structure attached to the respective upright post 56 in any suitable manner such as by fasteners or adhesives. The space between the arms 112, 114 of the housing 110 defines an interior channel 120 configured (e.g., having interior surfaces or walls that are shaped and sized) to receive and hold at least an edge 88 of the flexible enclosure 14. In this aspect, the edge 88 extends from the clamp housing 110 through the slit opening 118. As previously described, the edges 88 form the walls 16, 18, 20, 21 (FIGS. 1A and 1B) between adjacent upright posts 56, 58, 60, 62.

Still referring to FIGS. 3 and 4A, in one aspect, a flag piece 130 is attached to each edge 88 of the flexible enclosure 14. The flag piece 130 may be connected to the edge 88 of the flexible enclosure 14 by any suitable connector 131, such as stitching, fasteners, or adhesives. The flag piece 130 is configured as described herein to be retained within the clamp housing 110 and is positioned adjacent to the distal arm 114. The flag piece 130 has a wider bulbous end 132 which corresponds in shape to the back portion of the clamp 76, nearest the hub member 116. A narrower end 134 of the flag piece 130 extends from the bulbous end 132 and corresponds to the shape of the distal arm 114 of the clamp housing 110. The narrower end 134 of the flag piece 130 may further include a projection portion 136 and a recessed portion 138. In one aspect as depicted in FIGS. 3 and 4A, the projection portion 136 is located nearest to the slit opening 118 of the housing 110 and the recessed portion 138 is located in the interior of the housing 110 between the projection portion 136 and the wider bulbous end 132. However, it is understood that the orientation of the projection portion 136 and recessed portion 138 may be reversed, such that the recessed portion 138 is positioned nearest to the slit opening 118.

The flag piece 130 may also include a notch 140 located near the slit opening 118 of the housing 110 that is configured to receive a lip 377 extending from the distal arm 114 of the housing 110. The connection between the notch 140 and lip 377 at least in part maintains the flag piece 130 within the housing 110 and resists any force applied to the edge 88, such as, if a child pushes against the respective wall 16, 18, 20, 21.

The clamp 76, 78 further includes a locking piece 150 positioned adjacent to the proximal arm 112 of the housing 110. The locking piece 150 also includes a projection portion 152 and a recessed portion 154 oriented to oppose the projection portion 136 and recessed portion 138 of the flag piece 130. The recessed portion 154 is located nearest to the slit opening 118 of the clamp housing 110 and the projection portion 152 is located within the clamp housing 110 across the interior channel 120 from the recessed portion 138 of the flag piece 130. The locking piece 150 may further include a rib 156 extending from a proximal side 158 of the locking piece 150 and adapted to be retained within a corresponding notch 124 in the proximal arm 112 of the housing 110. The rib 156 and corresponding notch 124 are illustrated as being semicircular but in other aspects may have any suitable shape. The rib 156 and notch 124 effectively, at least in part, hold the locking piece 150 in place within the clamp housing 110 and resist force which acts to pull the edge 88 from the clamp 76.

When inserted within the clamp housing 110, the flag piece 130 and the locking piece 150 in combination generally conform to the shape of the interior channel 120, which extends from the slit opening 118 to the bulbous end 132 of the flag piece 130. In one aspect, the interior channel 120 is curved or hook-shaped. Thus, the edge 88, maintained within the clamp 76, follows a curved or hook-shaped path through the interior channel 120. Here, the edge 88 is configured so as to be retained within the interior channel 120 and held in place, at least in part, by a frictional engagement between the edge 88, locking piece 150, and flag piece 130. The edge 88 exits the clamp 76 through the slit opening 118 extending longitudinally along the length of the upright post 56. The locking piece 150 and/or flag piece 130 may also include structure for biasing the edge 88 as it exits the clamp housing 110 at the slit opening 118, such as to direct the sheet in the direction of the respective enclosure wall. For example, as shown in FIGS. 3 and 4A, the locking piece 150 may include a flange 160 located near the slit opening 118, for directing the curvature of the edge 88 as it exits the clamp housing 110. The end of the flag piece 130 may also include a similar curved end structure 142 for supporting the curvature of the fabric. By biasing the fabric in this way, a more aesthetically pleasing connection between the upright post 56 and flexible enclosure 14 is created. Such a connection prevents the material of the flexible enclosure 14 from bunching up, prevents unsightly twisting or folding, and which creates a flat and taut fabric wall for each side of the playpen or child enclosure apparatus, which inspires confidence in parents that the foldable enclosure apparatus 10 is safe and secure.

Figure 4B:
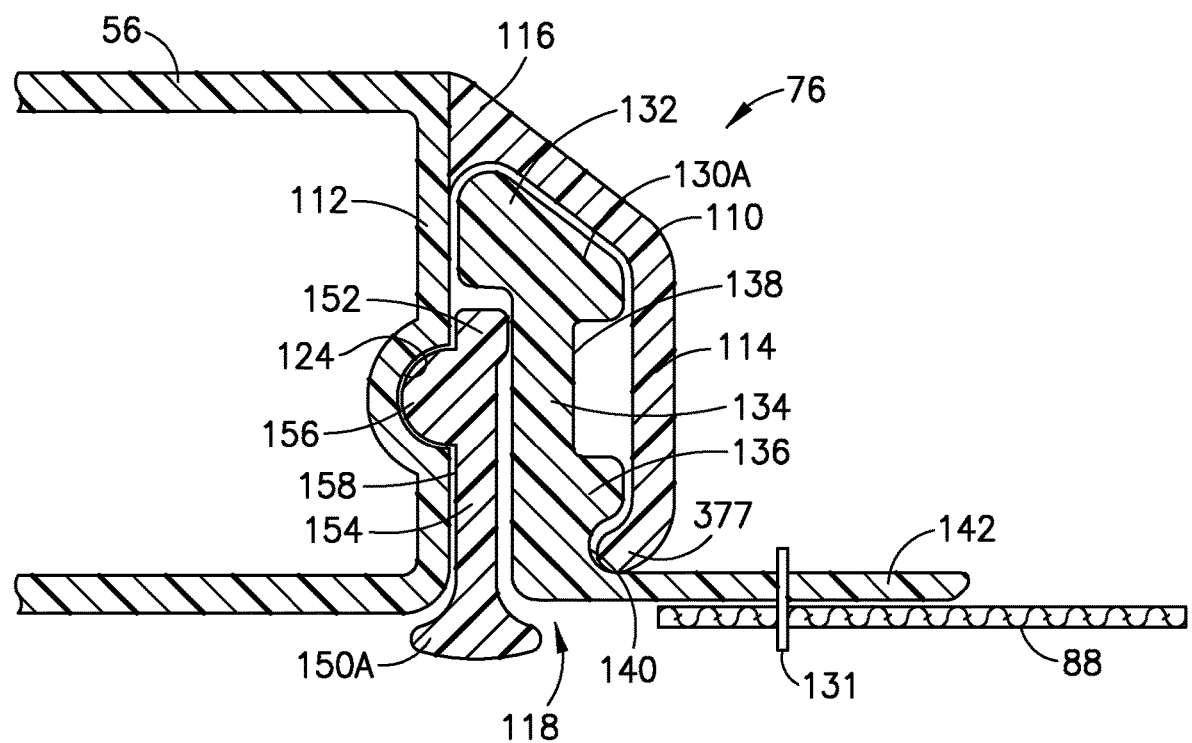
FIG. 4B schematically illustrates a coupling of the flexible enclosure of the foldable enclosure apparatus to the frame in accordance with aspects of the present disclosure.
Figure 4C:
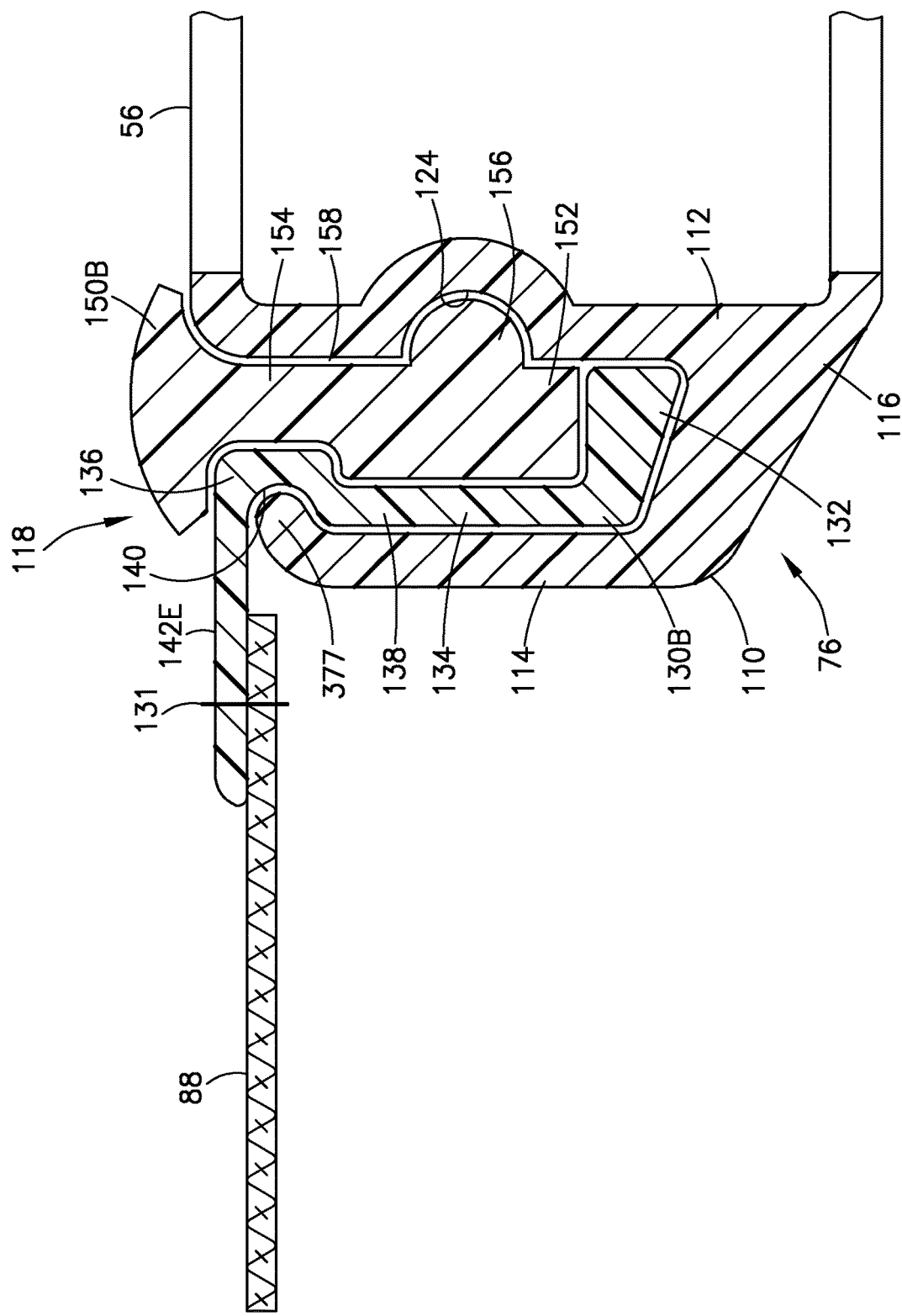
FIG. 4C schematically illustrates a coupling of the flexible enclosure of the foldable enclosure apparatus to the frame in accordance with aspects of the present disclosure.

Referring also to FIGS. 4B and 4C, clamp 76 is illustrated in accordance with other aspects of the present disclosure. In these other aspects, the clamp 76 is substantially similar to that described above with respect to FIGS. 3 and 4A; however in these aspects, the flag piece 130A, 130B and the locking piece 150A, 150B have different configurations than the flag piece 130 and locking piece 150 described above. For example, in the aspects illustrated in FIGS. 4B and 4C, the flag piece 130A, 130B has an extended curved end structure 142E which extends outside of the slit opening 118 so as to form a lock snubbing anchor where the edge of the flexible enclosure 14 is coupled to the flag piece 130A, 130B by any suitable connector 131 at a location that is outside or external to the housing 110 and the slit opening 118. In these aspects, the locking piece 150A, 150B forms a lock detent where the running clearance (or space) between the flag piece 130A, 130B and the locking piece 150A, 150B is configured (e.g., sized) so as to provide a sliding fit between the flag piece 130A, 130B, the locking piece 150A, 150B, and the housing 110 to effect installation (e.g., sliding, in a lengthwise direction, the flag piece 130A, 130B and the locking piece 150A, 150B into the housing so that a portion of the flag piece 130A, 130B and the locking piece 150A, 150B extend out of the slit opening 118) and free insertion of the flag piece 130A, 130B and the locking piece 150A, 150B into the housing at installation/assembly to the frame 12 while, at the same, time, preventing removal of one or both of the flag piece 130A, 130B and the locking piece 150A, 150B through the slit opening 118.

In the aspects illustrated in FIGS. 4B and 4C, the running clearance the between the flag piece 130A, 130B and the locking piece 150A, 150B may be effected by suitably sizing/configuring (two examples of such configuration are illustrated in FIGS. 4B and 4C noting that other configurations are possible and within the scope of the aspects of the present disclosure) one or more of the projection portion 152 and the rib 156 of the locking piece 150A, 150B and/or one or more of the bulbous end 132, the recessed portion 138, the projection portion 136, and the notch 140. It is noted that the clearance between the flag piece 130A, 130B and the locking piece 150A, 150B, at least at the projection portion 152 may be reduced so that the projection portion 152 pushes or snubs the flag piece 130A, 130B to a position that is substantially against or adjacent the distal arm 114 to effect locking of one or more of the flag piece 130A, 130B and the locking piece 150A, 150B at least partially within the housing 110 at least with the lip 377 of the distal arm 114.

In another aspect, referring to FIGS. 1A and 36A-36D, the vertical corner 80, 82, 84, 86 of the flexible enclosure 14 forms a sleeve or tubular covering 3600 through which at least respective upright post 56, 58, 60, 62 of the frame 12 is inserted. Referring to vertical corner 80 for exemplary purposes only (noting that vertical corners 82, 84, 86 are substantially similar), the vertical corner 80 forms the sleeve 3600 which includes an outer peripheral covering portion 3601 and an inner covering portion 3602. The outer peripheral covering portion 3601 covers the stanchion 56S of the upright post 56 such that the outer surface 56SS (the term "outer" being used with respect the occupant or enclosed space of the enclosure apparatus 10) of the stanchion 56S is covered in its entirety between the wheel assembly 104 and the upper corner assembly 40 (i.e., substantially none of the upright post 56 extending between the wheel assembly 104 and the upper corner 40 is exposed), noting corner assembly 40 is referred to herein for exemplary purposes only and that the upper corner assembly may have any suitable configuration such as those described herein. The inner covering portion 3602 of the sleeve 3600 covers the stanchion 56S of the upright post 56 such that the interior surface 56SN (the term "interior" being used with respect the occupant or enclosed space of the enclosure apparatus 10) of the stanchion 56S is covered in its entirety between the base pad or mattress 100 and the upper corner assembly 40 (i.e., no portion of the upright post extending between the base pad or mattress 100 and the upper corner assembly 40 is exposed). In one aspect, the flexible enclosure may extend beneath the base pad or mattress 100 so as to extend between the base pad or mattress 100 and the frame 12, such as where the base pad or mattress 100 is removable from the flexible enclosure 14.

The sleeve 3600 may form with the upright post a passage 3610 through which a portion of push rod systems described herein extend for coupling the upper assembly 123 to the base structure 122 for actuation (e.g., folding and unfolding) of the upper arms 24, 26, 28, 30, 32, 34, 36.

Referring again to FIGS. 1A, 1B, 36B, and 36C, the aspects of the flexible enclosure 14 described herein may further include coverings 92, 94, 96, 98, for covering the upper arms 22, 24, 26, 28, 30, 32, 34, 36 of the frame 12 and for providing additional structural stability for the walls 16, 18, 20, 21 of the foldable enclosure apparatus 10 (where the corner sleeves 3600 are integral with the walls 16, 18, 20, 21). The flexible enclosure 14 may further include a base pad or mattress 100. Any suitable side padding may also be placed around the interior of the foldable enclosure apparatus 10. An upper portion 3600U of the sleeve 3600 (or the vertical corner 80 in general) may be held in place adjacent the top end 68 of the upright post 56 at least in part by virtue of the coupling formed between the coverings 92, 94, 96, 98 and the upper arms 22, 24, 26, 28, 30, 32, 34, 36. In other aspects, the upper corner assembly 40 may press the sleeve 3600 (or the vertical corner 80 in general) against the upright post 56, or otherwise mechanically hold (e.g., with screws or pins extending through flexible enclosure, friction, etc.) the upper portion 3600U of the sleeve 3600 adjacent the top end 68 of the upright post 56. In still other aspects, the upper portion 3600U of the sleeve 3600 may include one or more coupling members (such as, e.g., tabs or latches 3630, 3631) that interface(s) with one or more fasteners 3620, 3621 of the upper corner assembly 40 so that the fastener 3620, 3621 passes through a respective tab or latch 3630, 3631 for holding the upper portion 3600U of the sleeve 3600 adjacent the top end 68 of the upright post 56.

Figure 36A:
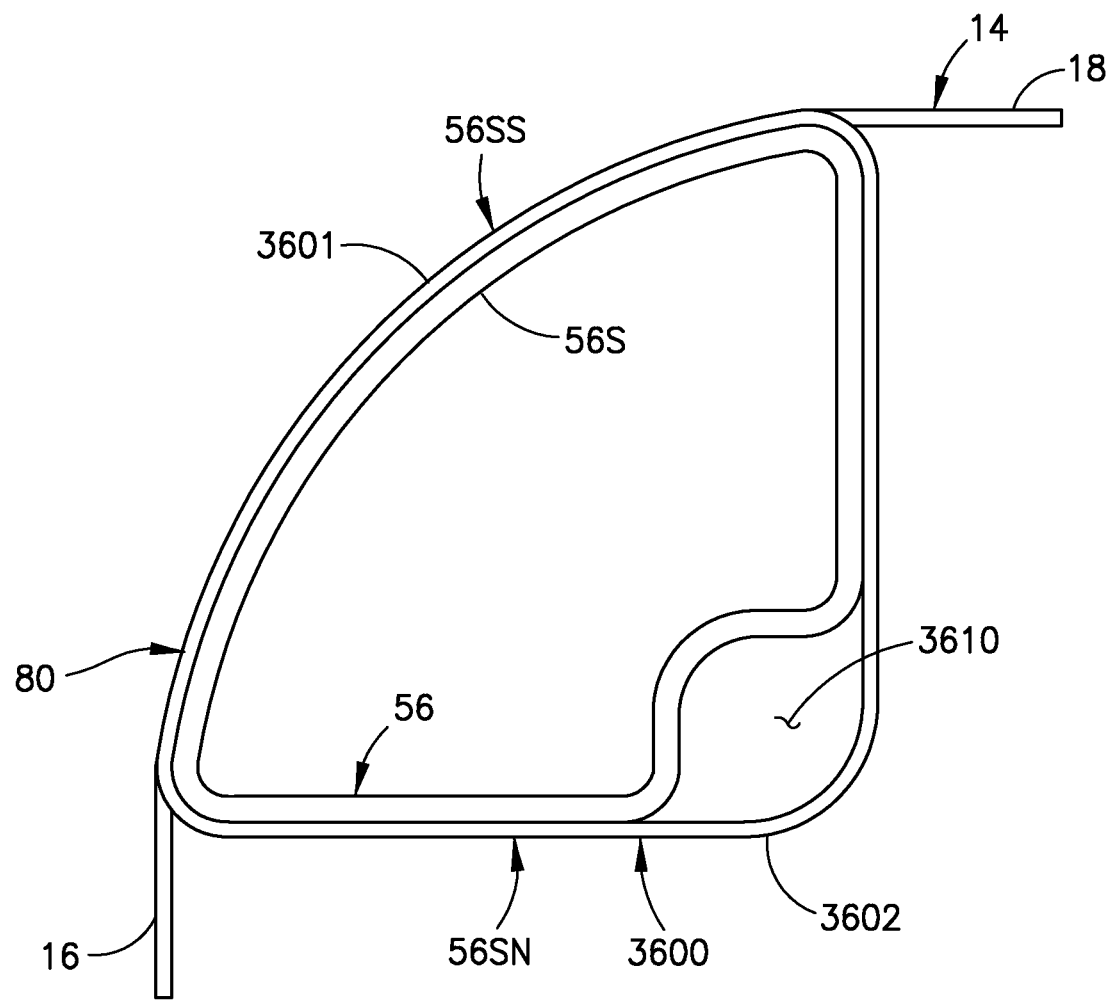
FIG. 36A is a schematic cross-sectional illustration of a corner of the foldable enclosure apparatus in accordance with aspects of the present disclosure.
Figure 36B:
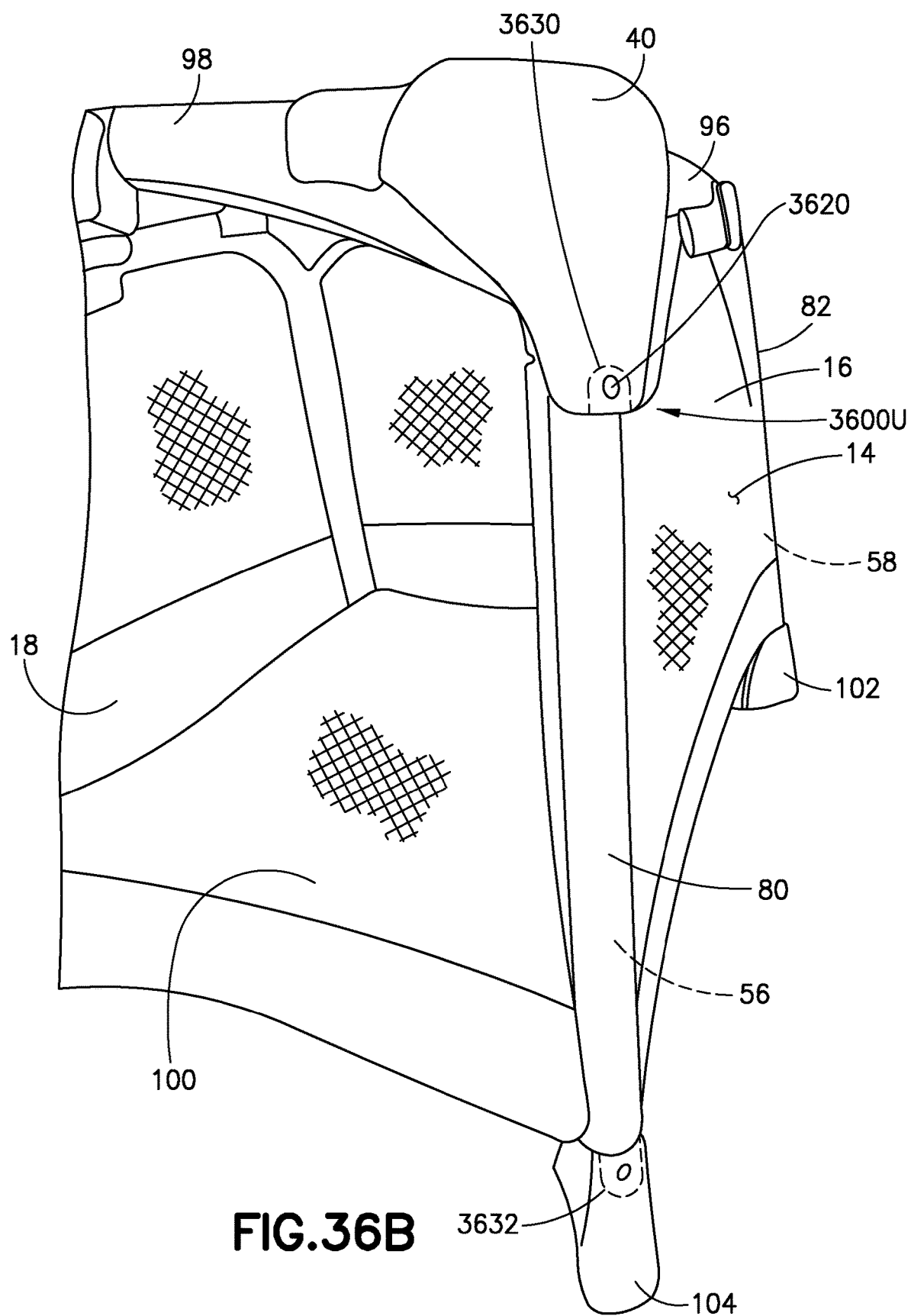
FIGS. 36B, 36C, and 36D are exemplary perspective illustrations of portions of the corner of FIG. 36A in accordance with aspects of the present disclosure.
Figure 36C:
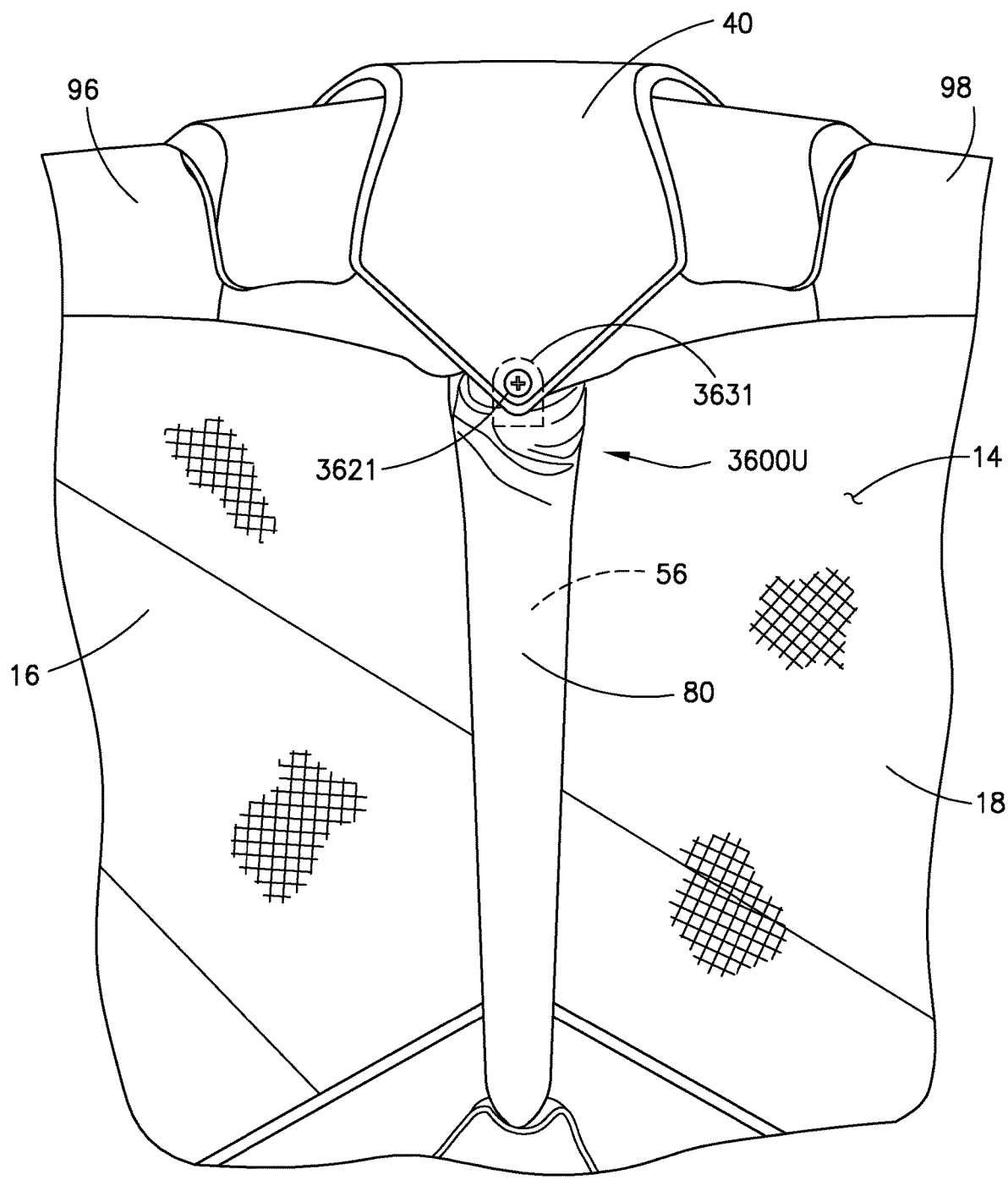
Figure 36D:
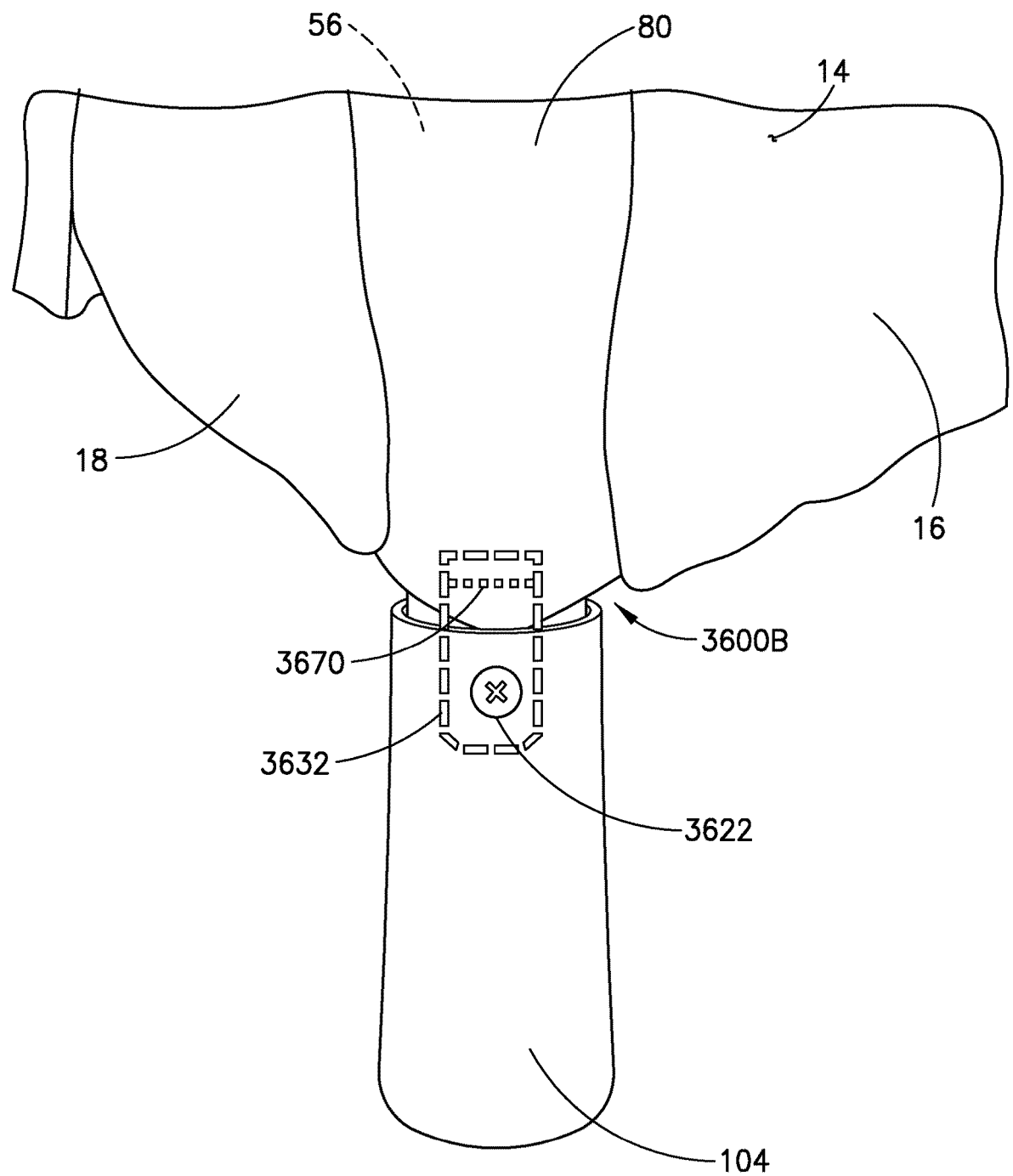
Figure 37C:
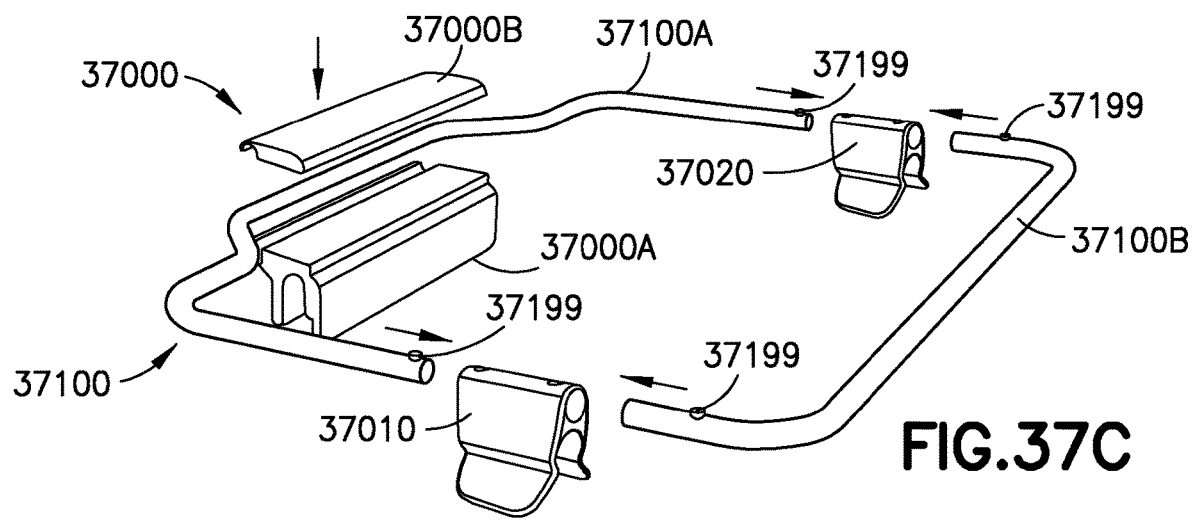
Figure 37D:
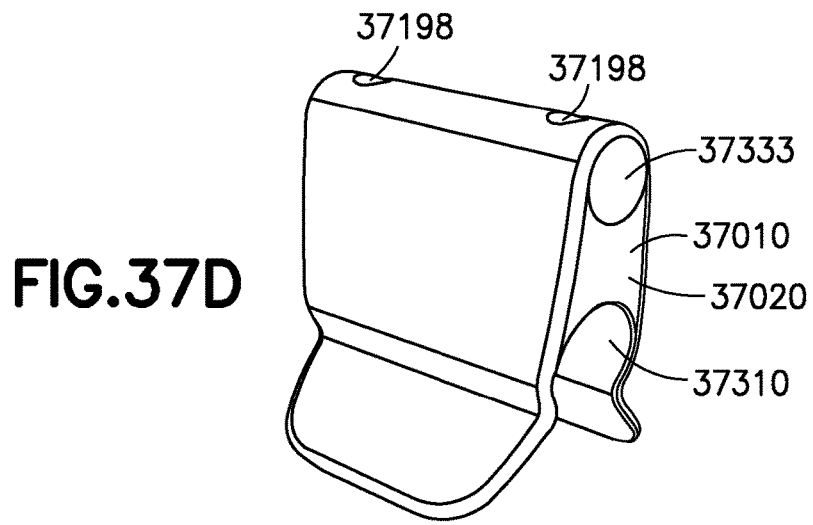
Figure 37E:
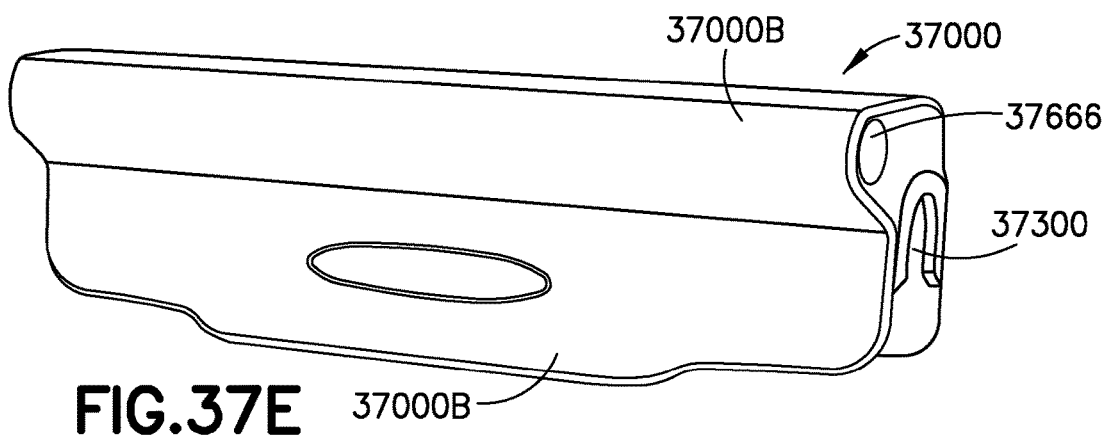

Similarly, referring to FIGS. 36B and 36D, a bottom portion 3600B of the sleeve 3600 (or the vertical corner 80 in general) may be held in place adjacent the bottom end 64 of the upright post 56 by the wheel assembly 104. For example the wheel assembly may press the sleeve 3600 (or the vertical corner in general) against the upright post 56, or otherwise mechanically hold (e.g., with screws or pins extending through flexible enclosure, friction, etc.) the bottom portion 3600B of the sleeve 3600 adjacent the bottom end 64 of the upright post 56. In still other aspects, the bottom portion 3600B of the sleeve 3600 may include one or more coupling members or fabric anchors (such as, e.g., tabs or latches 3632) that interface(s) with one or more fasteners 3622 of the wheel assembly 104 or upright post 56 so that the fastener 3622 passes through a respective tab or latch 3632 for holding the bottom portion 3600B of the sleeve 3600 adjacent the bottom end 64 of the upright post 56. The tabs or latches 3630, 3631, 3632 may be coupled to the sleeve 3600 in any suitable manner such as by stitching 3670 (see FIG. 36D), bonding, chemical adhesives, mechanical fasteners etc. In still other aspects, the top portion 3600U and bottom portion 3600B of the sleeve 3600 may be coupled to the upright post 56 in any suitable manner, such as by clips, snaps, bonding, chemical adhesives, etc., such that substantially none of the none of the upright post 56 extending between the wheel assembly 104 and the upper corner 40 is exposed.

The tabs or latches 3630, 3631, 3632 may have any suitable construction such as a plastic sheet, plastic ring, metal ring, metal tab, etc. that is configured so that the respective fastener 3620, 3621, 3622 passes there-through. The tabs or latches 3630, 3631, 3632 may also be sized and shaped so as to extend or "tuck" between the upright post 56 and a respective wheel assembly 104 (where the tab or latch is on the bottom portion 3600B of the sleeve 3600) or a respective upper corner assembly 40 (where the tab or latch is on the upper portion 3600U of the sleeve 3600).

Figure 5A:
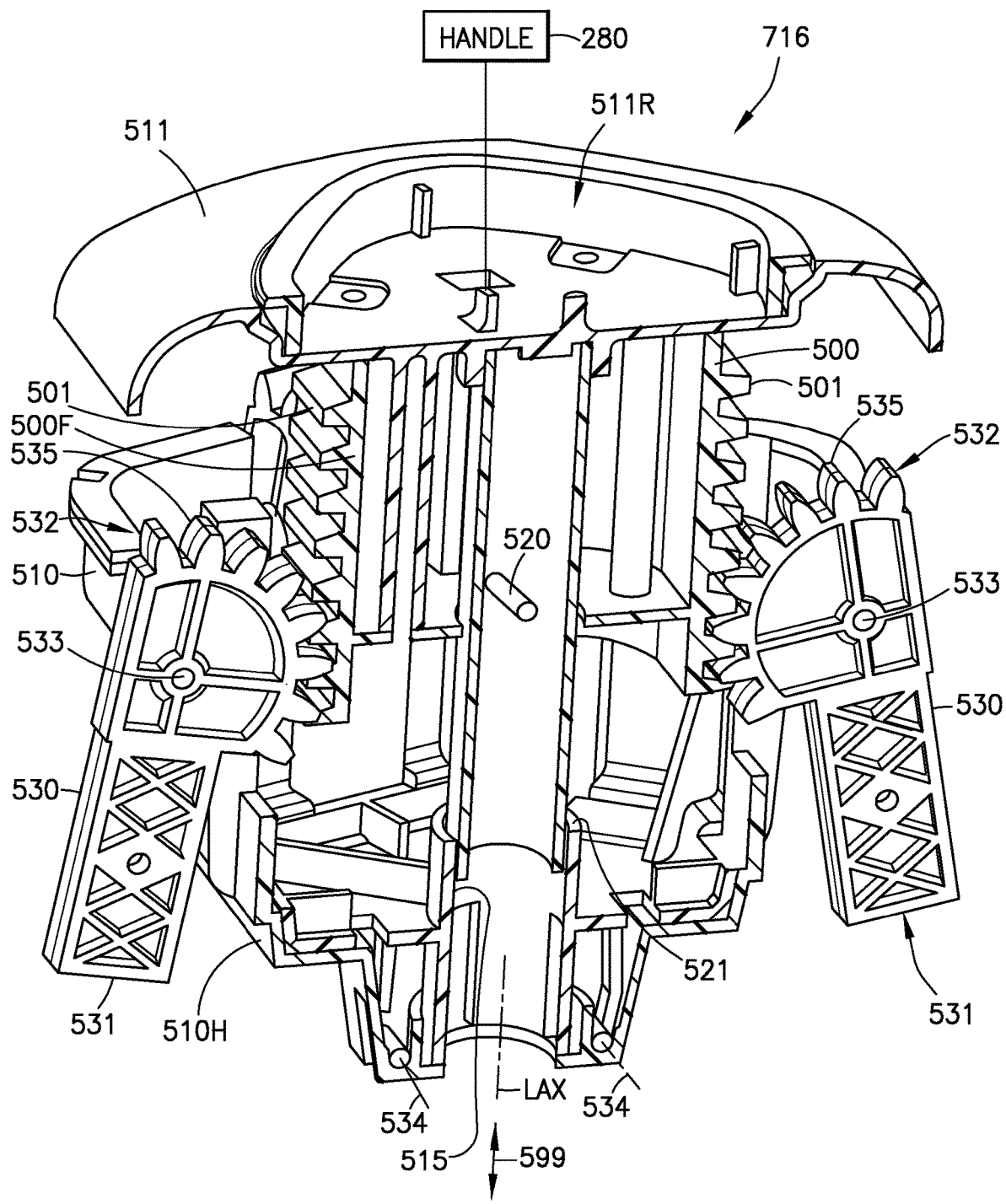
FIGS. 5A-5C are schematic illustrations of a central hub of the foldable enclosure apparatus of FIG. 1A in accordance with aspects of the present disclosure.
Figure 5B:
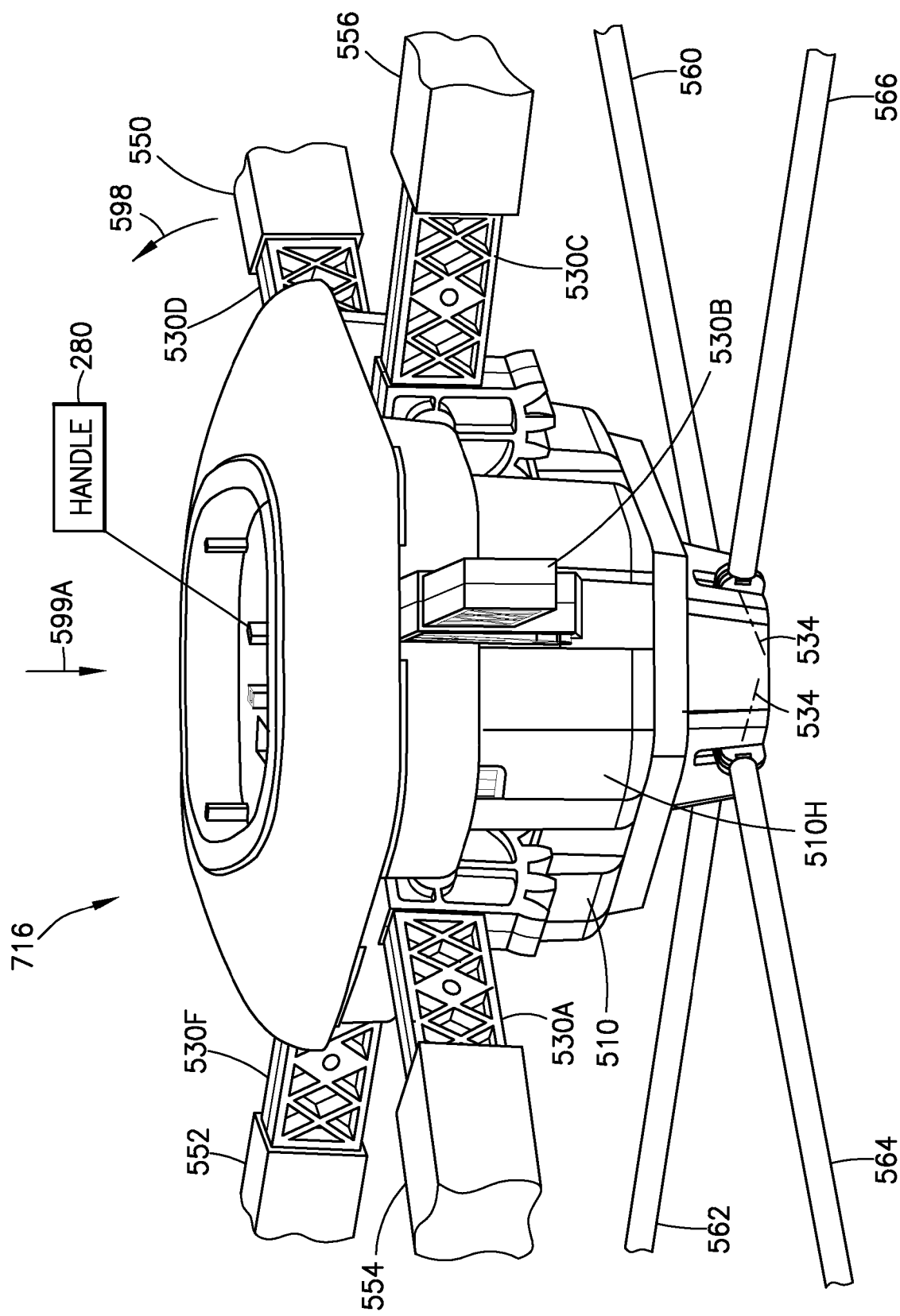
Figure 5C:
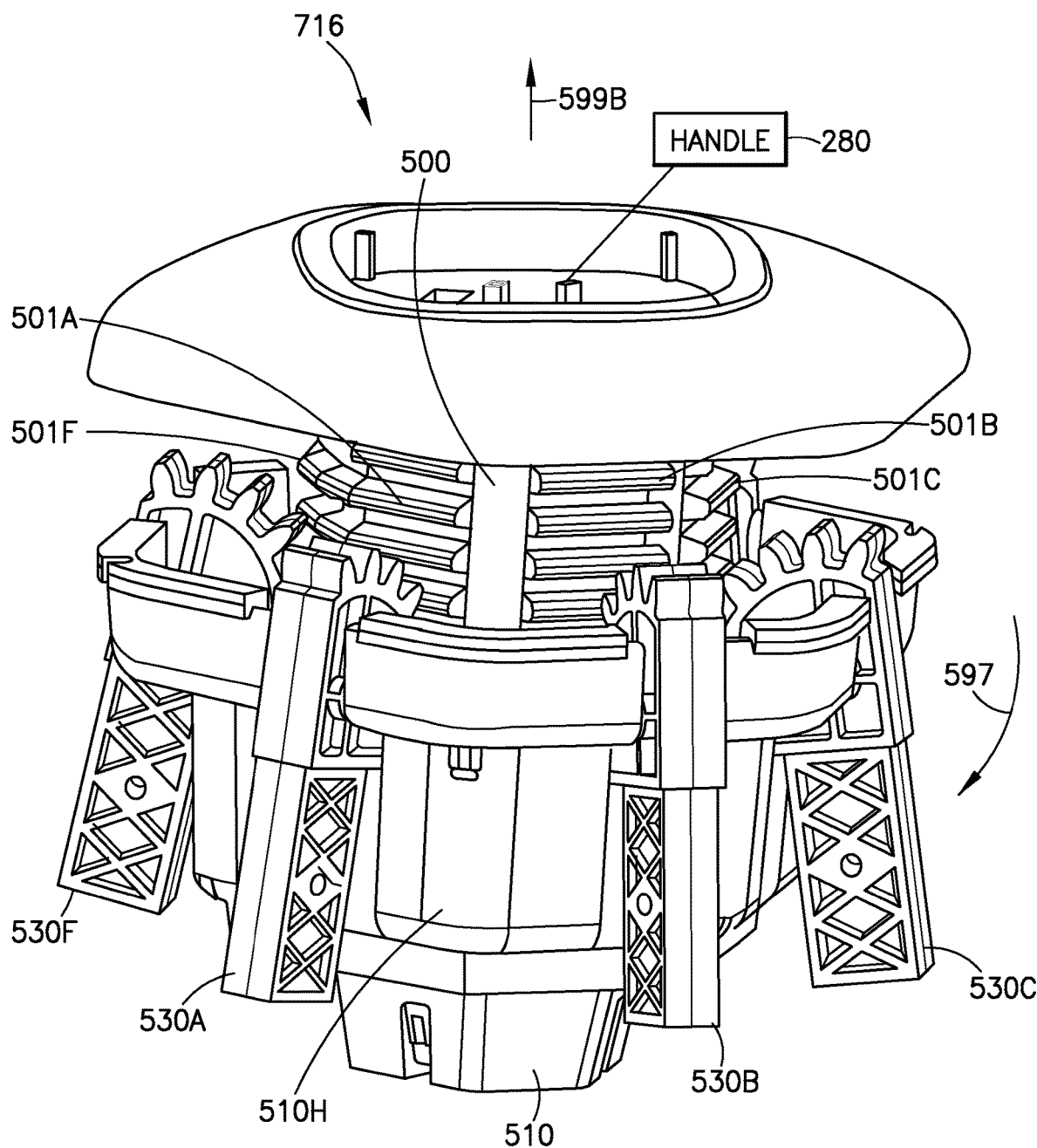

Referring now to FIGS. 5A-5C one example of the hub member 716 is illustrated in accordance with aspects of the present disclosure. In this aspect, the hub member 716 is configured as a rack and pinion hub. In this aspect the hub member 716 includes a frame or mounting structure 510 and a crank link 500. In one aspect, the mounting structure 510 may be covered in any suitable manner so as form a substantially enclosed or at least a partially enclosed housing 510H. The crank link 500 forms or is formed by one or more gear racks 501A-501F (noting that gear racks 501D and 501E are not shown and the gear racks 501A-501F are generally referred to as gear racks 501). The crank link 500 includes a frame 500F and the gear racks 501A-501F may be integrally formed with the frame 500F or coupled to the frame 500F in any suitable manner. In this aspect, the crank link 500 is illustrated as having six gear racks 501A-501F however in other aspects, any suitable number of gear racks may be provided. In one aspect, the number of gear racks may depend on the shape of the foldable enclosure apparatus 10.

The mounting structure 510 includes any suitable linear bearing 515 along which the crank link 500 reciprocates (e.g., in direction 599). Travel of the crank link 500 along the linear bearing 515 may be limited in the direction 599 to a predetermined range of motion in any suitable manner such as with stop members 520, 521 (e.g., pins, planar surfaces, etc.) that define ends of the range of motion. Any suitable handle 280 and or cover 511 (e.g., such as a cover of the mounting structure 510 may be coupled to the crank link 500, where the handle 280 effects user manipulation of the crank link 500 along the linear bearing 515 to fold and unfold the foldable enclosure apparatus 10 (FIG. 1) as described herein. The handle 280 may be pivotally coupled to the crank link 500 so as to fold substantially within the cover 511 (e.g., such as within recess 511R of the cover 511) to stow the handle 280, such as when the foldable enclosure apparatus 10 is in use or occupied.

A plurality of support members 530A-530F (noting that support members 530D and 530E are not shown and the support members 530A-530F are generally referred to as support members 530) are pivotally coupled to the mounting structure 510 so that each support member 530 is substantially aligned with a respective gear rack 501 so as to be rotationally driven by the respective gear rack 501 as described herein. Each of the support members 530 has a distal end 531 and a proximate end 532, where the proximate end 532 is coupled to the mounting structure 510 so as to pivot about a respective pivot axis 533 (e.g., axis of rotation). The proximate end includes a pinion gear 535 that meshingly engages the respective gear rack 501 so that linear movement of the crank link 500 along the linear bearing 515 folds the support members 530 (as shown in FIG. 5C) and unfolds the supports members 530 (as shown in FIG. 5B). In this aspect, pushing crank link 500 into the mounting structure 510 in direction 599A causes the gear racks 501 engage the pinion gears 535 so as to rotate the support members 530 in direction 598 to unfold or extend the support members 530 as shown in FIG. 5B (e.g., to unfold the foldable closure apparatus 10). Pulling the crank link 500 from the mounting structure 510 in direction 599B causes the gear racks 501 engage the pinion gears 535 so as to rotate the support members 530 in direction 597 to fold or retract the support members 530 as shown in FIG. 5C (e.g., to fold the foldable closure apparatus 10).

Referring to FIGS. 1C and 5A-5C, as described above, the hub member 716 is coupled to the plurality of substantially four bar articulated links 125 of the base structure 122. In this aspect, the mounting structure 510 forms one bar of each substantially four bar articulated link 125; a respective upright post 56, 58, 60, 62 forms one bar of each substantially four bar articulated link 125 (see FIGS. 7 and 8); and each substantially four bar articulated link 125 also includes an upper base leg 550, 552, 554, 556 and a lower base leg 560, 562, 564, 566 (see FIGS. 1C, 7, and 8) to complete the substantially four bar articulated link 125. Each of the upper base legs 550, 552, 554, 556 are coupled to a respective support member 530 in any suitable manner so that the upper base legs 550, 552, 554, 556 extend from the hub member 716 to a respective upright post 56, 58, 60, 62. The upper base legs 550, 552, 554, 556 are coupled to the respective support member 530 so as to be driven in rotation (e.g., in directions 598 and 597) with the respective support member 530 under impetus of the crank link 500. It is noted that, in the extended or unfolded configuration, the support members 530 and/or the upper base legs 550, 552, 554, 556 may provide support for the base pad or mattress 100. In some aspects, one or more pad support members 199 (FIG. 1C) may be coupled to respective support members 530 (e.g., such as support members 530B and 530E) in a manner similar to that described above with respect to the upper base legs 550, 552, 554, 556 so as to fold and unfold with the upper base legs 550, 552, 554, 556.

Figure 7:
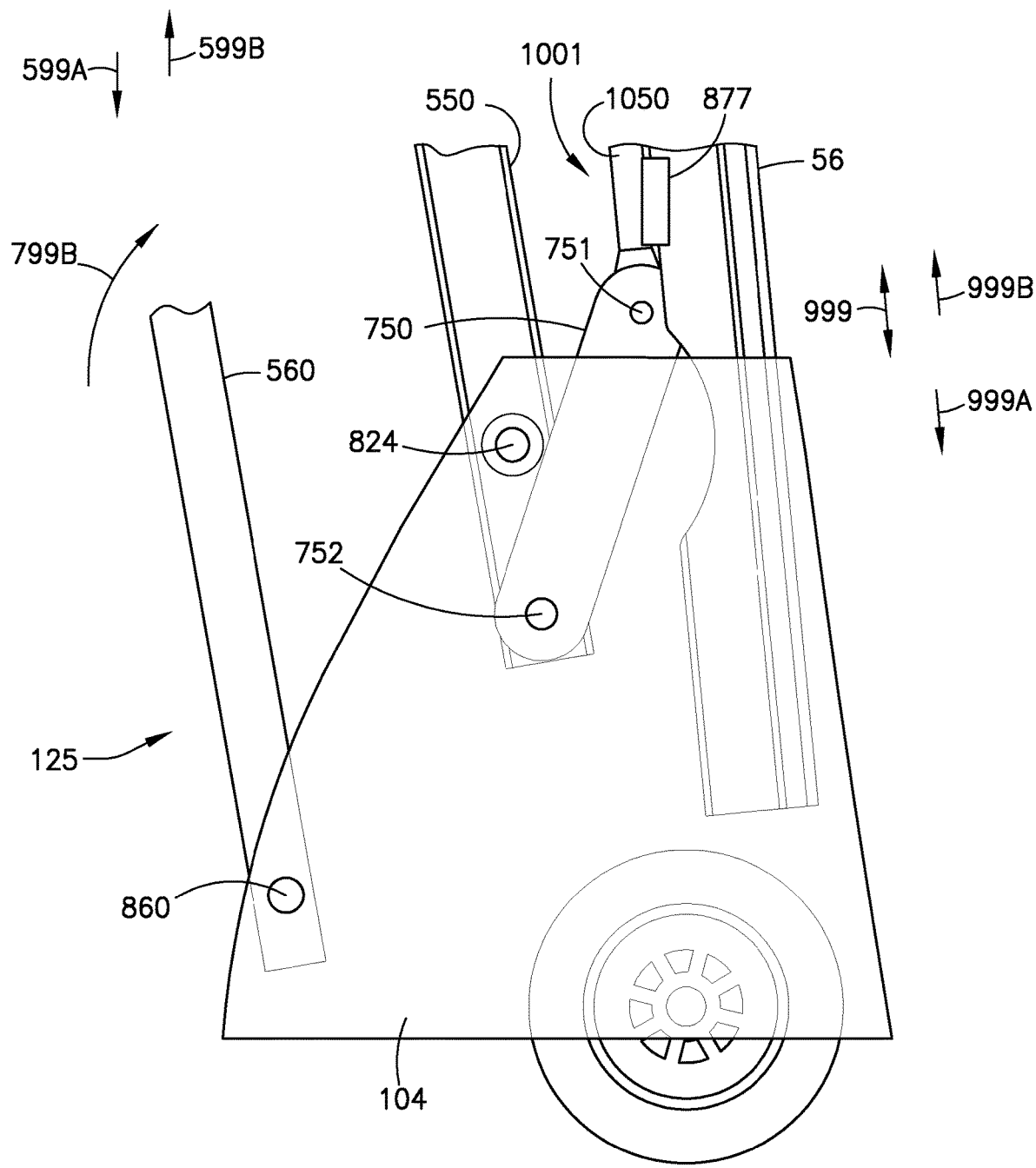
FIG. 7 is a schematic illustration of a portion a four bar actuation linkage and push rod system of the foldable enclosure apparatus of FIG. 1A in a folded configuration in accordance with aspects of the present disclosure.
Figure 8:
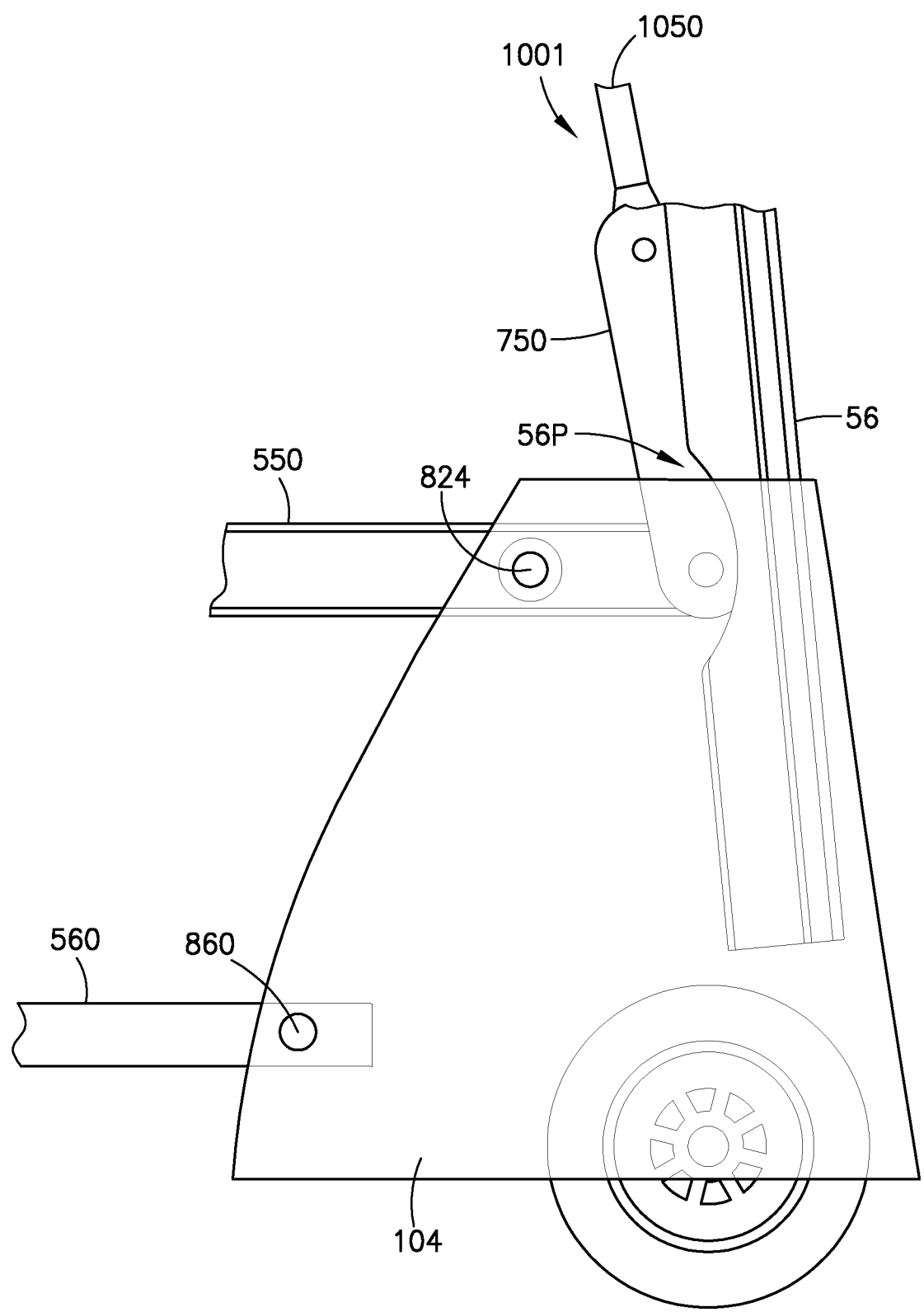
FIG. 8 is a schematic illustration of a portion the four bar actuation linkage and push rod system of the foldable enclosure apparatus of FIG. 7 in an unfolded configuration in accordance with aspects of the present disclosure.

Each lower base leg 560, 562, 564, 566 is pivotally coupled to the mounting structure 510 about a respective pivot axis 534 (e.g., axis of rotation) so as to extend, e.g., alongside a respective upper base leg 550, 552, 554, 556, from the hub member 716 to the respective upright post 56, 58, 60, 62 so as to form a respective substantially four bar articulated link 125 with the respective upper base legs 550, 552, 554, 556, the respective upright post 56, 58, 60, 62, and the mounting structure 510. Referring also to FIGS. 7 and 8, the upper base legs 550, 552, 554, 556 and the lower base legs 560, 562, 564, 566 are pivotally coupled to the respective upright post 56, 58, 60, 62 in any suitable manner, such as by a respective mechanical connections (as described above) that form respective pivot axes 824, 860 (noting that only upright post 56, upper base leg 550, and lower base leg 560 are shown in FIGS. 7 and 8 for illustrative purposes and that the other upper base legs 552, 554, 556 and the other lower base legs 562, 564, 566 are coupled to their respective upright posts 58, 60, 62 in a similar manner).

Figure 6B:
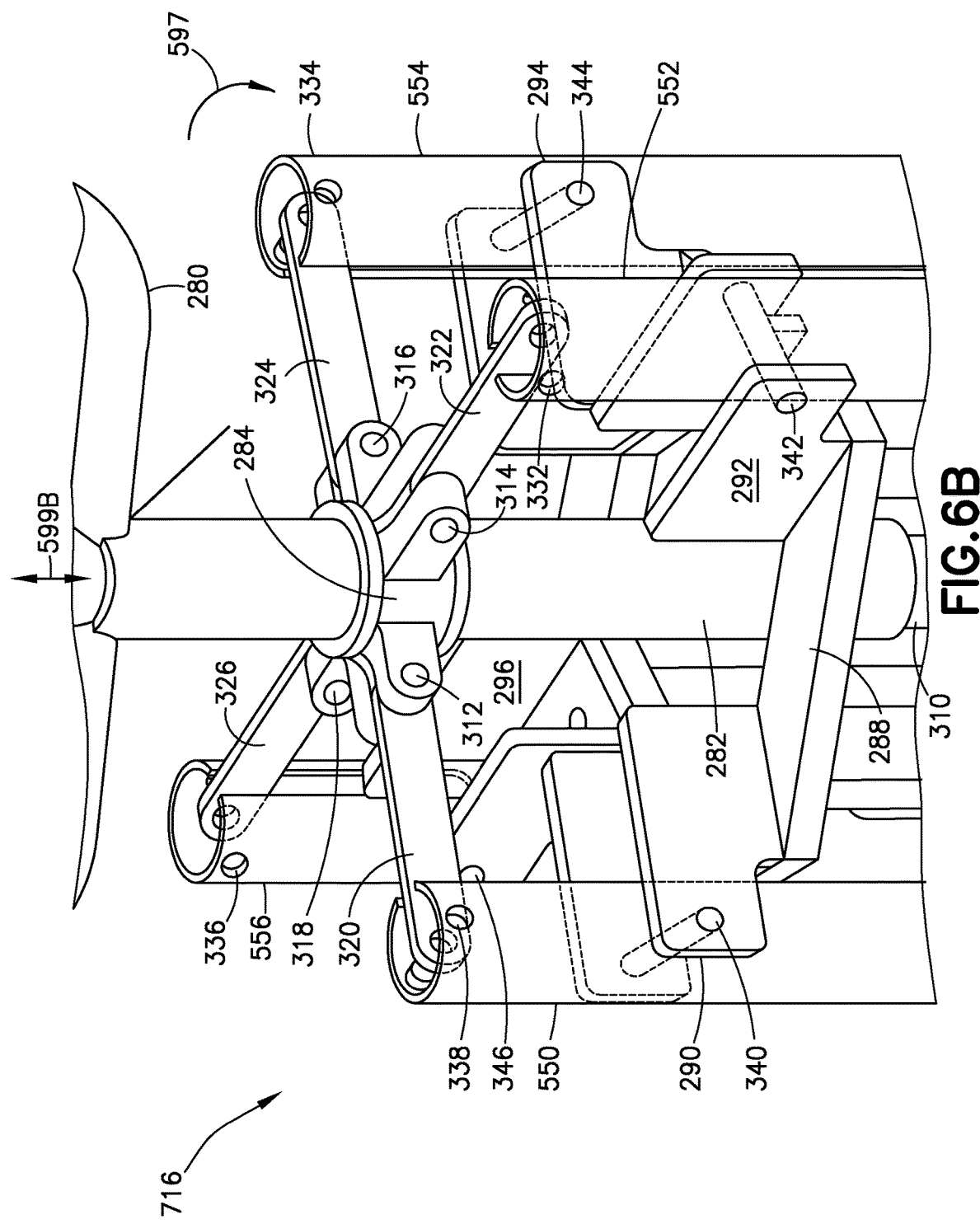
Figure 6C:
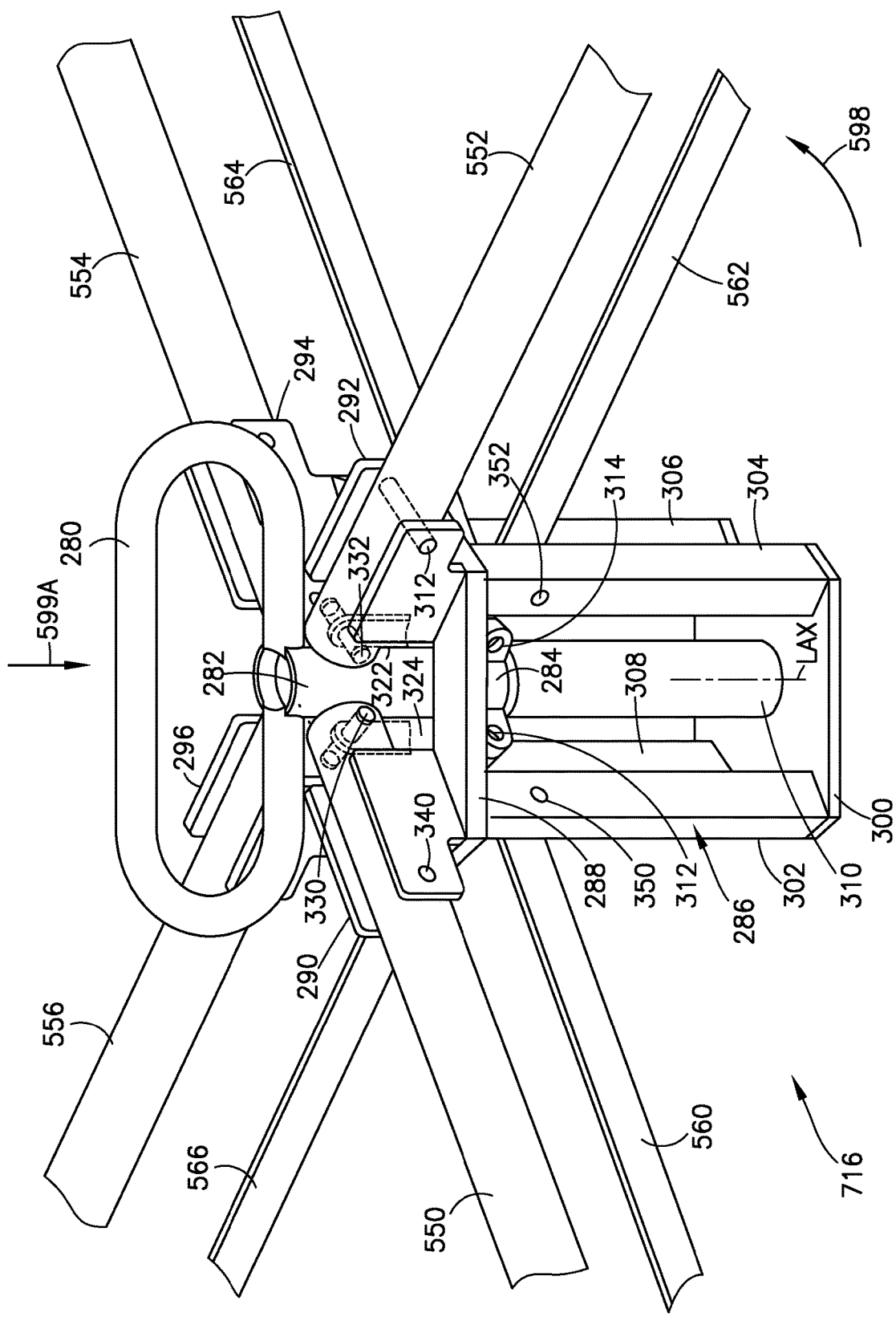

Referring now to FIGS. 6A-6C another example of the hub member 716 is illustrated in accordance with aspects of the present disclosure. In this aspect the hub member 716 includes a frame or mounting structure 286 and a crank link 282 that is movably coupled to the mounting structure 286 to reciprocate in direction 599. In this aspect the mounting structure 286 includes an upper ring support 288, four brackets 290, 292, 294, 296 mounted to the upper ring support 288 (the number of brackets may depend on the shape of the foldable enclosure apparatus 10 such that there is a bracket for each corner of the foldable enclosure apparatus), a lower support plate 300, four beams 302, 304, 306, 308 connecting the upper ring support 288 and the lower support plate 300, and a linear bearing 310 (e.g., such as a shaft or other linear guide along which the crank link 282 slides). It is noted that the configuration of the mounting structure 286 is exemplary and in other aspects the mounting structure may have any suitable configuration for coupling with the members of the frame as described herein. In one aspect, a cover may be provided over the mounting structure 286 and a cap to the cover may be provided on the crank link 282 (in a manner similar to that shown in FIGS. 5A-5C).

The crank link 282 is configured as a sleeve that sides along and whose movement is guided by the linear bearing 310 of the mounting structure 286. A handle 280 (substantially similar to that described above with respect to FIGS. 5A-5C) is coupled to the crank link 282 in any suitable manner so that a user may manipulate movement of the crank link 282 along the linear bearing 310 in direction 599. The crank link 282 includes a collar 284 that may be integrally formed with or coupled to the crank link 282 in any suitable manner so that the collar 284 reciprocates with the crank link 282 as a single unit along the linear bearing 310.

In this aspect, four links 320, 322, 324, 326 are pivotally coupled to the collar 284 by a respective mechanical connection 312, 314, 316, 318. It is noted that each of the four links correspond to and is substantially angularly aligned with a respective bracket 290, 292, 294, 296, where the number of links may depend on the shape of the foldable enclosure apparatus 10 as noted above. The four links 320, 322, 324, 326 are pivotally connected at their opposite ends by respective mechanical connections 330, 332, 334, 336 to a respective upper base leg 550, 552, 554, 556 so as to couple the upper base legs 550, 552, 554, 556 to the collar 284 of the crank link 282. Each of the upper base legs 550, 552, 554, 556 are further pivotally coupled to the four brackets 290, 292, 294, 296 by respective mechanical connections 340, 342, 344, 346 so as to extend, from the mounting structure 286 to a respective upright post 56, 58, 60, 62. Here, movement of the crank link 282 in direction 599 drives rotation of the upper base legs 550, 552, 554, 556 (e.g., through the respective link 320, 322, 324, 326) about a pivot axis (e.g., axis of rotation) defined by the respective mechanical connections 340, 342, 344, 346 to fold the upper base legs 550, 552, 554, 556 (as shown in FIG. 6B) and unfold the upper base legs 550, 552, 554, 556 (as shown in FIG. 6C).

Four corresponding lower base legs 560, 562, 564, 566 are pivotally connected to the four beams 302, 304, 306, 308 by respective mechanical connections 350, 352, 354, 356. In this aspect, referring also to FIGS. 7 and 8, the lower base legs 560, 562, 564, 566 extend, e.g., alongside a respective upper base legs 550, 552, 554, 556, from the mounting structure 286 to a respective upright post 56, 58, 60, 62 so as to form a respective substantially four bar articulated link 125 with the respective upper base legs 550, 552, 554, 556, the respective upright post 56, 58, 60, 62, and the mounting structure 286.

Referring also to FIGS. 7 and 8, the upper base legs 550, 552, 554, 556 and the lower base legs 560, 562, 564, 566 are pivotally coupled to the respective upright post 56, 58, 60, in any suitable manner, such as by a respective mechanical connection (as described above) that forms a respective pivot axis 824, 860 (noting that only upright post 56, upper base leg 550, and lower base leg 560 are shown in FIGS. 7 and 8 for illustrative purposes and that the other upper base legs 552, 554, 556 and the other lower base legs 562, 564, 566 are coupled to their respective upright posts 58, 60, 62 in a similar manner). In this example, pushing crank link 282 into the mounting structure 286 in direction 599A causes the collar 284, through the links 320, 322, 324, 326, to pivot the upper base legs 550, 552, 554, 556 about the brackets 290, 292, 294, 296 (e.g., the pivot axis formed by the respective mechanical connections) so as to rotate the upper base legs 550, 552, 554, 556 in direction 598 to unfold or extend the substantially four bar articulated links 125 as shown in FIG. 6C. Pulling the crank link 282 from the mounting structure 286 in direction 599B causes the causes the collar 284, through the links 320, 322, 324, 326, to pivot the upper base legs 550, 552, 554, 556 about the brackets 290, 292, 294, 296 (e.g., the pivot axis formed by the respective mechanical connections) so as to rotate the upper base legs 550, 552, 554, 556 in direction 597 to fold or retract the substantially four bar articulated links 125 as shown in FIG. 5C.

Figure 16A:
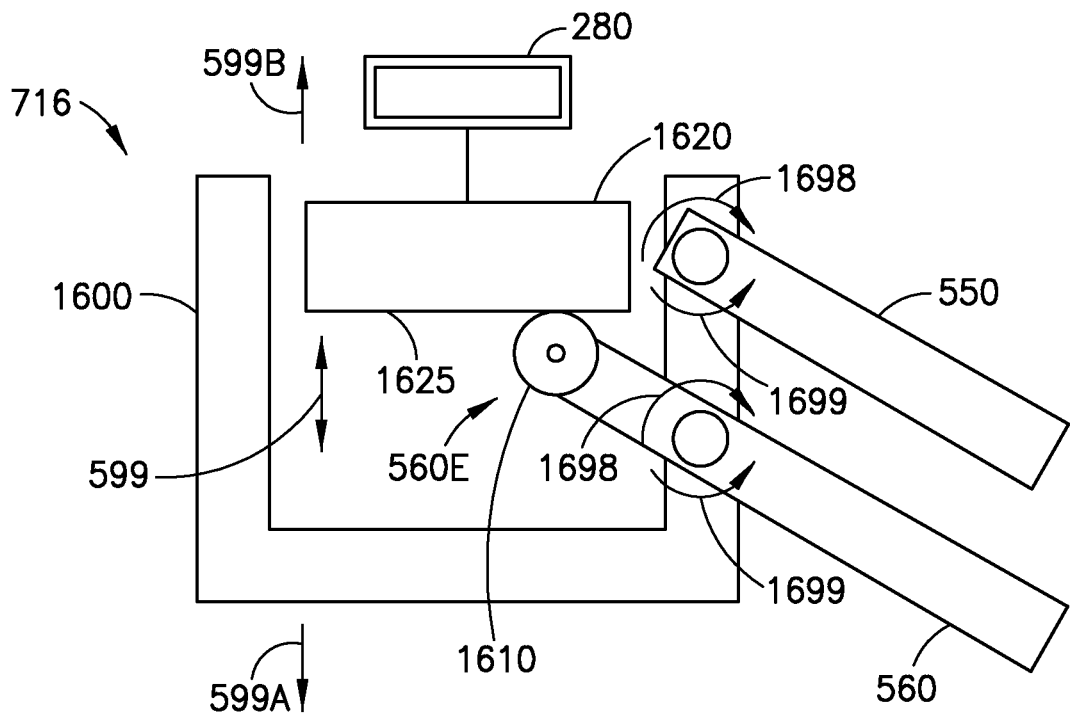
FIGS. 16A and 16B are
Figure 16B:
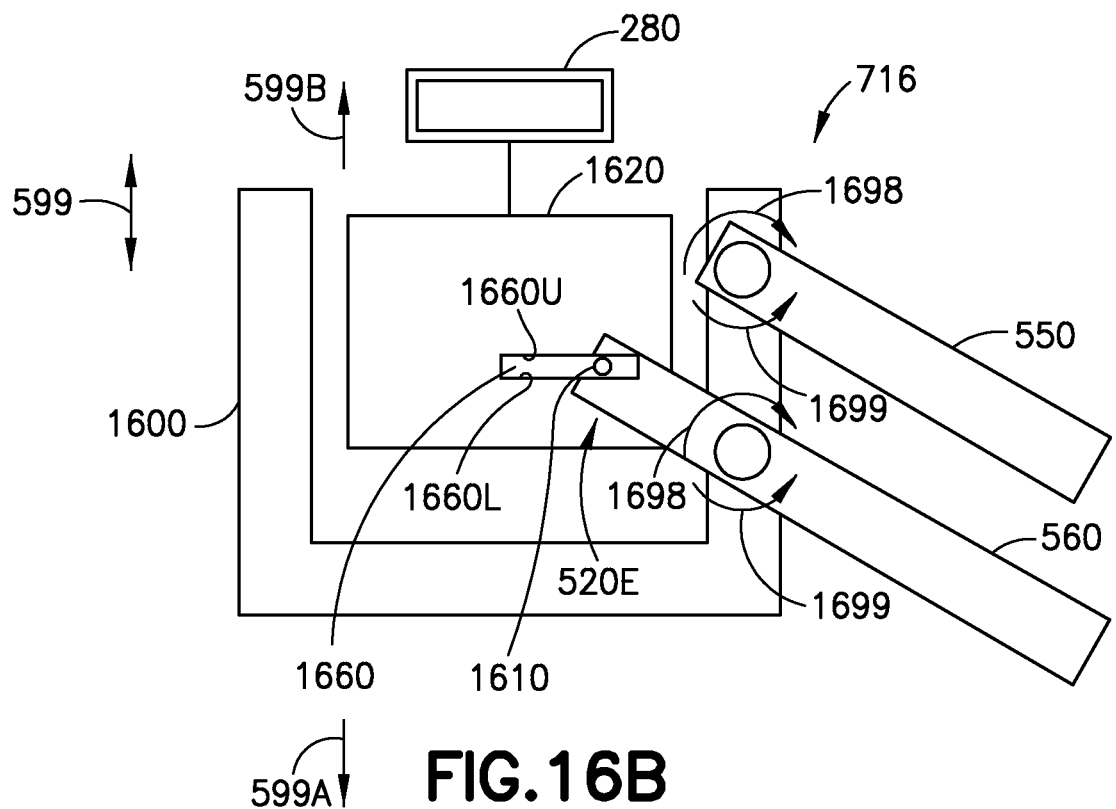

Referring to FIGS. 16A, and 16B in another example, the hub member 716 is configured with at least one cam surface for effecting folding and unfolding of the foldable enclosure apparatus 10 as described herein. For example, referring to FIG. 16A, the hub member 716 includes a housing 1600 (which may be substantially similar to housing 510H described above) to which the upper base legs 550, 552, 554, 556 and the lower base legs 560, 562, 564, 566 are respectively pivotally coupled. The lower base legs 560, 562, 564, 566 may extend into the housing 1600. Each of the lower base legs 560, 562, 564, 566 include a roller, pin or other cam surface (referred to herein as roller 1610 for convenience) that is rotatably coupled to the end 560E of the respective lower base legs 560, 562, 564, 566. The hub member 716 includes a push cam link 1620 that reciprocates within the housing 1600 in direction 599. The cam link 1620 includes any suitable handle 280 configured so that a user can move the cam link 1620 in direction 599. The cam link 1620 includes a cam surface 1625 that is configured to engage the rollers 1610 so that as the cam link 1620 is pushed in direction 599A the rollers 1610 are also moved in direction 599A causing rotation of a respective lower base leg 560, 562, 564, 566 in direction 1699 to unfold the foldable enclosure apparatus 10. As may be realized, the upper base legs 550, 552, 554, 556 are also rotated in direction 1699 with the lower base legs 560, 562, 564, 566 by virtue of the parallel link configuration of respective pairs of the upper base legs 550, 552, 554, 556 and the lower base legs 560, 562, 564, 566. To fold the foldable enclosure apparatus 10, the cam link 1620 is pulled in direction 599B, where the rollers 1610 are also allowed to move in direction 599B by, for example, a weight of the upper base legs 550, 552, 554, 556 and the lower base legs 560, 562, 564, 566 (as well as under a weight of the upright posts 56, 58, 60, 62 and all other parts of the foldable enclosure apparatus 10 dependent from the upright posts 56, 58, 60, 62) so that the respective lower base leg 560, 562, 564, 566 and upper base legs 550, 552, 554, 556 rotate in direction 1698 to effect folding of the foldable enclosure apparatus 10.

Referring to FIG. 16B, the hub member 716 is substantially similar to that described above with respect to FIG. 16A, however in this aspect the hub member 716 includes a push-pull cam link 1650 that reciprocates within the housing 1600 in direction 599. The cam link 1650 includes any suitable handle 280 configured so that a user can move the cam link 1650 in direction 599. The cam link 1650 includes a cam slot 1660 (e.g., having an upper cam surface 1660U and a lower cam surface 1660L) that is configured to engage the rollers 1610 so that as the cam link 1620 is pushed in direction 599A the rollers 1610 engage the upper cam surface 1660U and are also moved in direction 599A causing rotation of a respective lower base leg 560, 562, 564, 566 in direction 1699 to unfold the foldable enclosure apparatus 10. As may be realized, the upper base legs 550, 552, 554, 556 are also rotated in direction 1699 with the lower base legs 560, 562, 564, 566 by virtue of the parallel link configuration of respective pairs of the upper base legs 550, 552, 554, 556 and the lower base legs 560, 562, 564, 566. To fold the foldable enclosure apparatus 10, the cam link 1620 is pulled in direction 599B, where the rollers 1610 engage the lower cam surface 1660L and move in direction 599B causing rotation of the respective lower base leg 560, 562, 564, 566 and upper base legs 550, 552, 554, 556 in direction 1698 to effect folding of the foldable enclosure apparatus 10.

Figure 17:
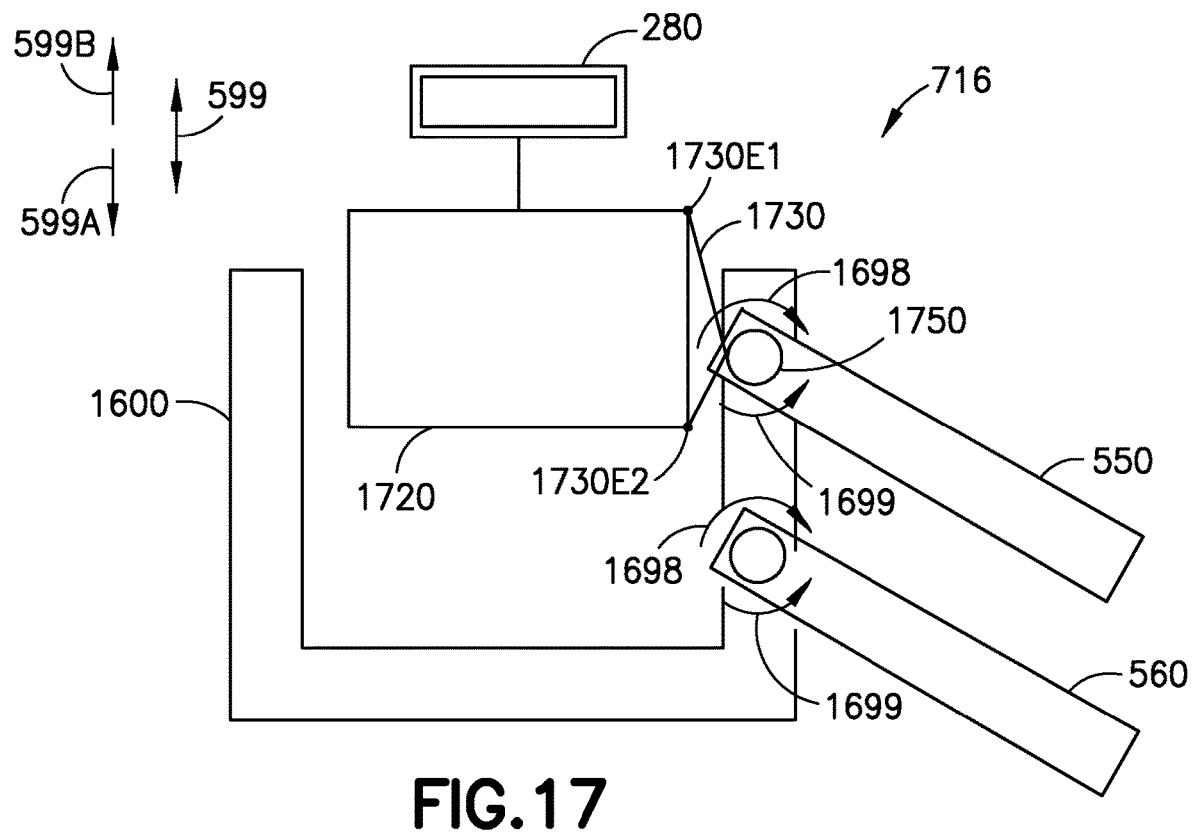
FIG. 17 is a schematic illustration of a central hub of the foldable enclosure apparatus of FIG. 1A in accordance with aspects of the present disclosure.
Figure 18:
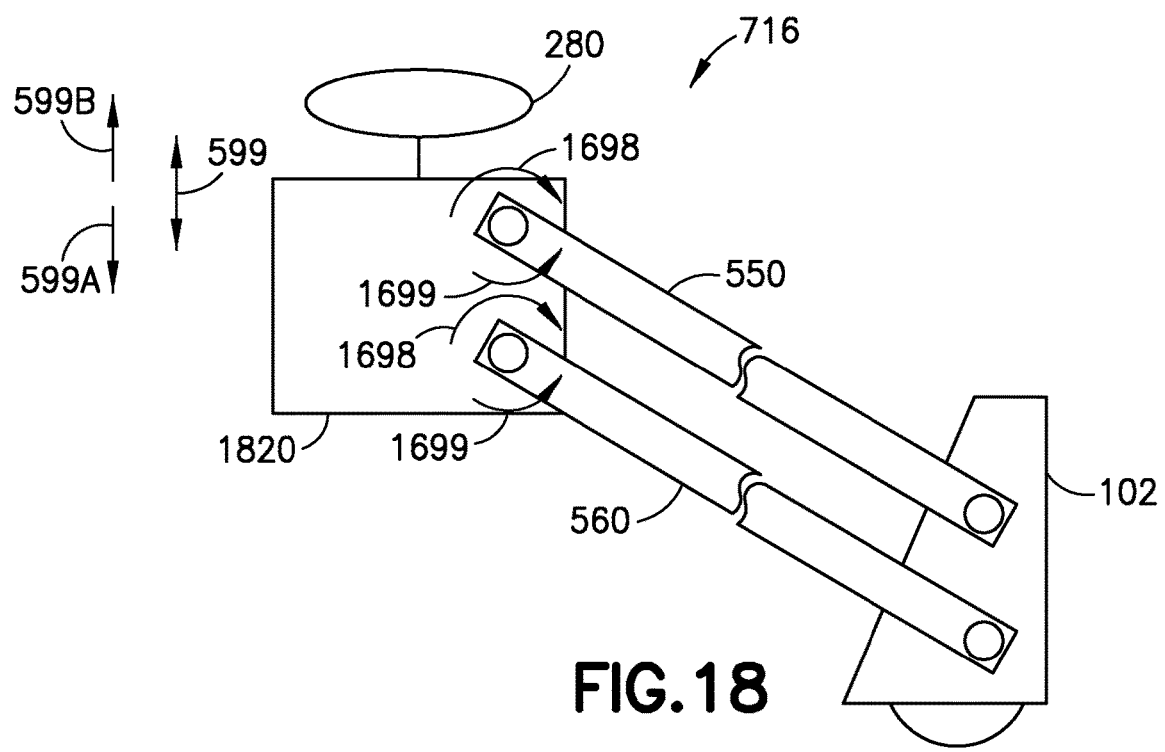
FIG. 18 is a schematic illustration of a central hub of the foldable enclosure apparatus of FIG. 1A in accordance with aspects of the present disclosure.

Referring to FIG. 17, in another example, the hub member 716 is configured to effect folding and unfolding of the foldable enclosure apparatus 10 (as described herein) in a push-pull manner using, for example, a cable and pulley system. For example, referring to FIG. 17, the hub member 716 includes the housing 1600 (which may be substantially similar to housing 510H described above) to which the upper base legs 550, 552, 554, 556 and the lower base legs 560, 562, 564, 566 are respectively pivotally coupled. In this aspect, the upper base legs 550, 552, 554, 556 each include a pulley 1750 coupled thereto. The pulley 1750 may be coupled to the respective upper base legs 550, 552, 554, 556 at an axis of rotation between the respective upper base legs 550, 552, 554, 556 and the housing 1600. In other aspects, the pulley 1750 may be disposed at any suitable location along the respective upper base legs 550, 552, 554, 556. In still other aspects the pulley 1750 may be disposed on each of the lower base legs 560, 562, 564, 566 in a manner substantially similar to that described herein. The hub member 716 includes a push-pull crank link 1720 that reciprocates within the housing 1600 in direction 599. Any suitable cable 1730 (e.g., wire, rope, tape, etc.) is coupled at one end 1730E1 to the crank link 1720 on one side (e.g., above) of a respective upper base leg 550, 552, 554, 556, and is coupled at the other end 1730E2 to the crank link 1720 on the opposite side (e.g., below) of the respective upper base legs 550, 552, 554, 556. The cable 1730 is wrapped around the pulley 1750 (e.g., in a manner similar to that of a bow drill) so that as the crank link 1720 moves in direction 599, the cable 1730 rotates the pulley 1750 for rotating the respective upper base legs 550, 552, 554, 556 in one of directions 1698, 1699. For example, as the crank link moves in direction 599A the pulleys 1750 are caused to rotate in direction 1699 (and the respective upper base leg 550, 552, 554, 556 rotates in direction 1699 with the pulley) to unfold the foldable enclosure apparatus 10. As the crank link moves in direction 599B the pulleys 1750 are caused to rotate in direction 1698 (and the respective upper base leg 550, 552, 554, 556 rotates in direction 1698 with the pulley) to fold the foldable enclosure apparatus 10.

In yet another aspect, the hub member 716 is configured to effect folding and unfolding of the foldable enclosure apparatus 10 (as described herein) in a push-pull manner substantially without any mechanical advantage mechanism (e.g., that may reduce a force necessary to fold and unfold the foldable enclosure apparatus 10). For example, the upper base legs 550, 552, 554, 556 and the lower base legs 560, 562, 564, 566 are respectively pivotally coupled are coupled to the hub member 716 and the wheel assemblies 102, 104, 106, 108 so as to form respective parallel link pairs. As the hub member 716 is pushed in direction 599A the upper base legs 550, 552, 554, 556 and the lower base legs 560, 562, 564, 566 are rotated in direction 1699 to unfold the foldable enclosure apparatus 10. As the hub member 716 is pushed in direction 599A the upper base legs 550, 552, 554, 556 and the lower base legs 560, 562, 564, 566 are rotated in direction 1699 to unfold the foldable enclosure apparatus 10. As the hub member 716 is pulled in direction 599B the upper base legs 550, 552, 554, 556 and the lower base legs 560, 562, 564, 566 are rotated in direction 1698 to fold the foldable enclosure apparatus 10.

Figure 19:
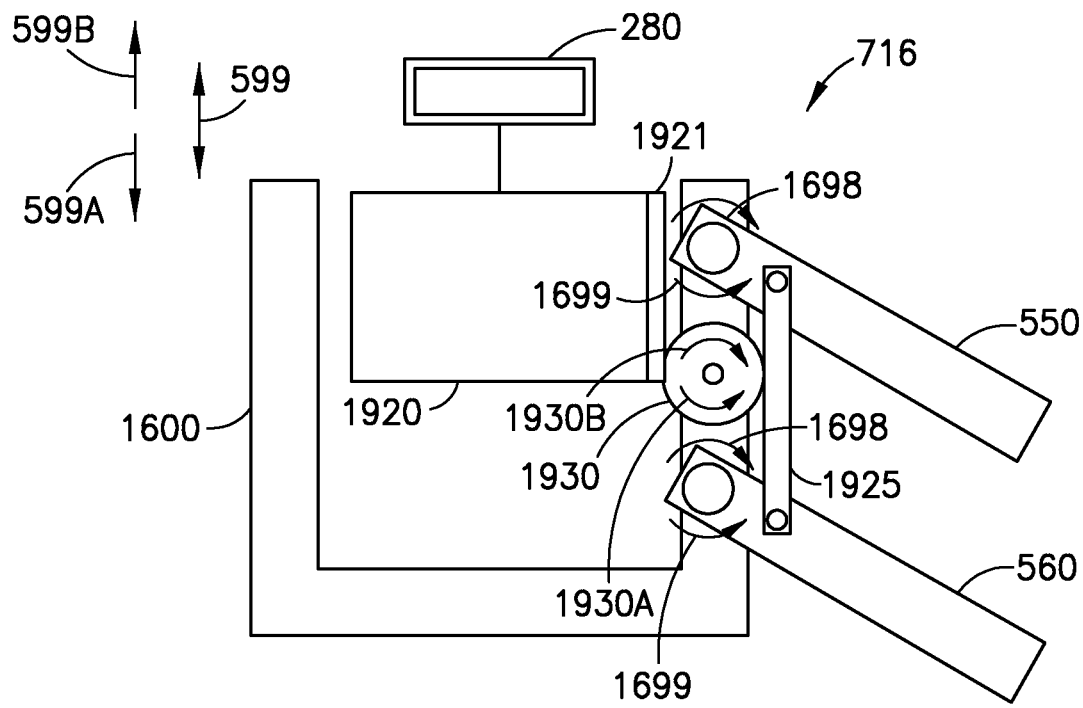
FIG. 19 is a schematic illustration of a central hub of the foldable enclosure apparatus of FIG. 1A in accordance with aspects of the present disclosure.
Figure 20:
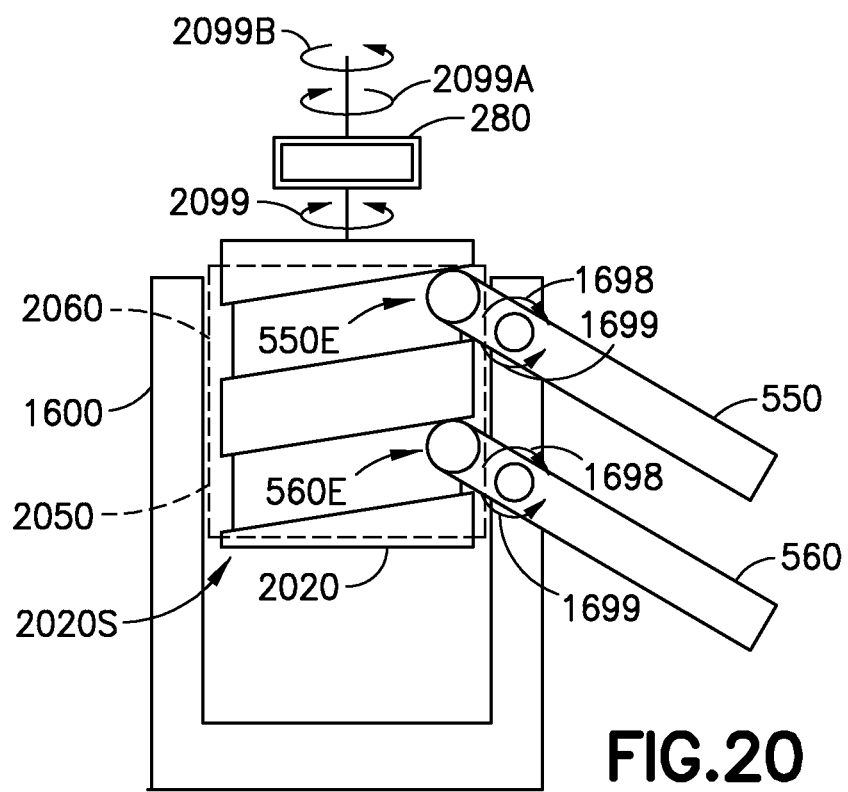
FIG. 20 is a schematic illustration of a central hub of the foldable enclosure apparatus of FIG. 1A in accordance with aspects of the present disclosure.

Referring to FIG. 19, in one aspect, the hub member 716 is configured with a gear train for effecting folding and unfolding of the foldable enclosure apparatus 10 (as described herein). For example, the hub member 716 includes a housing 1600 (which may be substantially similar to housing 510H described above) to which the upper base legs 550, 552, 554, 556 and the lower base legs 560, 562, 564, 566 are respectively pivotally coupled. The hub member 716 includes a rack link 1920 that includes a drive gear rack 1921 for each upper base leg/lower base leg pair (the pair have upper base leg 550 and lower base leg 560 are illustrated in FIG. 19 for exemplary purposes and the other pairs are similarly configured). A driven gear rack 1925 is pivotally coupled to a respective upper base leg/lower base leg pair (as illustrated in FIG. 19 driven gear rack 1925 is pivotally coupled at a first end to upper base leg 550 and pivotally coupled at a second end to lower base leg 560). In one aspect, the drive gear rack 1921 and the driven gear rack 1925 have a substantially parallel relationship to each other. A cluster gear 1930 is rotationally coupled to the housing so as to be disposed between a respective drive gear rack 1921 and a respective driven gear rack 1925 so that movement of rack link 1920 in direction 599A rotates cluster gear 1930 in direction 1930A so that driven rack 1925 moves in direction 599B. Movement of driven rack 1925 in direction 599B causes rotation of the respective upper base leg 550, 552, 554, 556 and the respective lower base leg 560, 562, 564, 566 in direction 1699 so as to unfold the foldable enclosure apparatus 10. Movement of rack link 1920 in direction 599*b* rotates cluster gear 1930 in direction 1930B so that driven rack 1925 moves in direction 599A. Movement of driven rack 1925 in direction 599A causes rotation of the respective upper base leg 550, 552, 554, 556 and the respective lower base leg 560, 562, 564, 566 in direction 1698 so as to fold the foldable enclosure apparatus 10.

Referring to FIG. 19, in one aspect, the hub member 716 is configured as a screw drive for effecting folding and unfolding of the foldable enclosure apparatus 10 (as described herein). For example, the hub member 716 includes a housing 1600 (which may be substantially similar to housing 510H described above) to which the upper base legs 550, 552, 554, 556 and the lower base legs 560, 562, 564, 566 are respectively pivotally coupled. The hub member 716 includes a screw link 2020 that forms a lead screw 2020S that rotates within the housing 1600 in direction 2099. The lower base legs 560, 562, 564, 566 may extend into the housing 1600 so that an end 560E of each lower base leg 560, 562, 564, 566 forms part (e.g., the threads) of a virtual nut 2050 that engages the lead screw 2020S. The upper base legs 550, 552, 554, 556 may extend into the housing 1600 so that an end 550E of each upper base leg 550, 552, 554, 556 forms part (e.g., the threads) of a virtual nut 2060 that engages the lead screw 2020S. In other aspects only the upper base legs 550, 552, 554, 556 engage the lead screw 2020S; while in still other aspects only the lower base legs 560, 562, 564, 566 engage the lead screw. As described herein, the lower base leg 560, 562, 564, 566 and the upper base legs 550, 552, 554, 556 have a parallel link arrangement. Here, rotation of screw link 2020 (e.g., through user rotation of the handle 280) in direction 2099B causes rotation of the upper base legs 550, 552, 554, 556 and the lower base legs 560, 562, 564, 566 in direction 1699 so as to unfold the foldable enclosure apparatus 10. Rotation of screw link 2020 in direction 2099A causes rotation of the upper base legs 550, 552, 554, 556 and the lower base legs 560, 562, 564, 566 in direction 1698 so as to fold the foldable enclosure apparatus 10.

Figure 21:
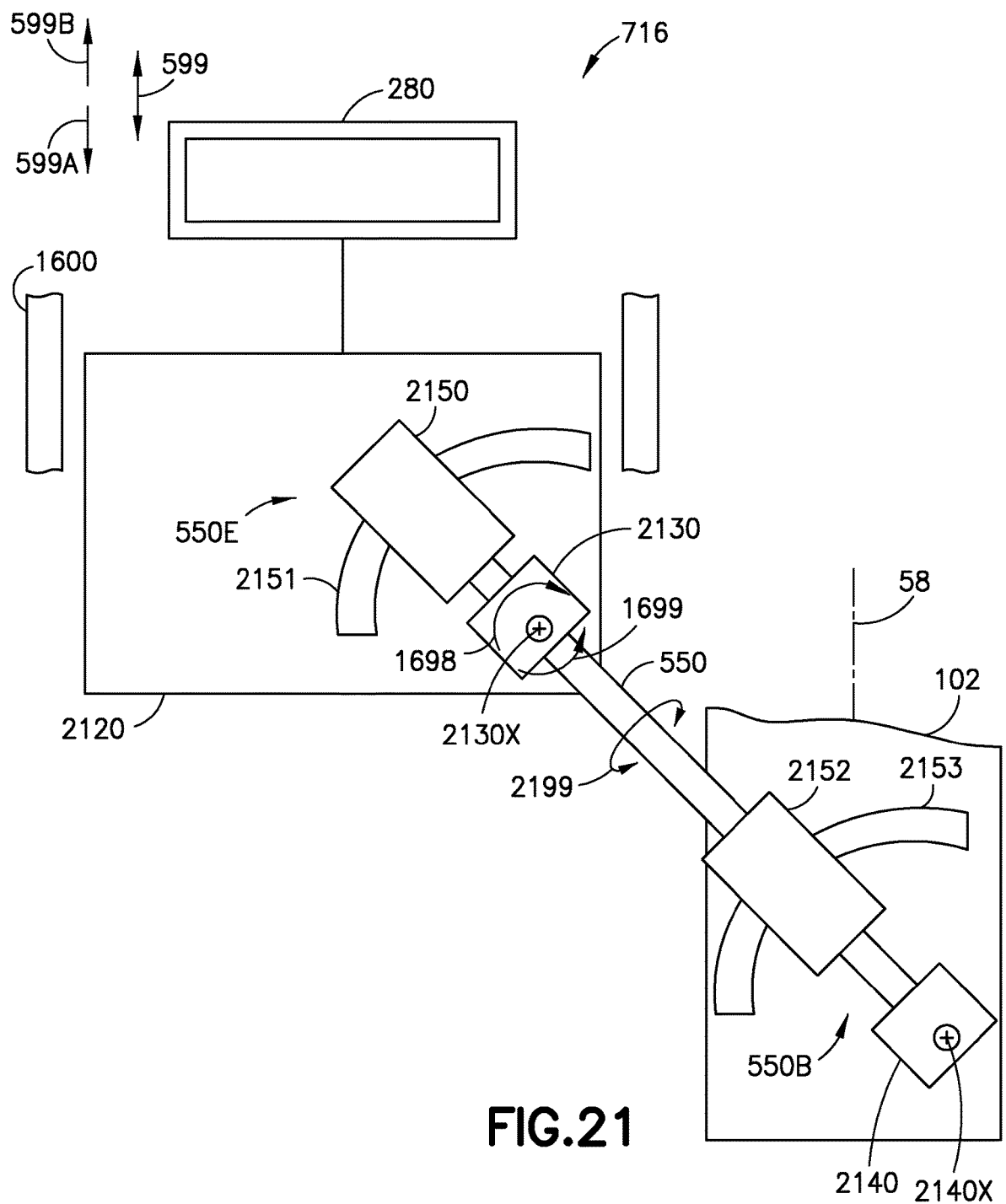
FIG. 21 is a schematic illustration of a central hub of the foldable enclosure apparatus of FIG. 1A in accordance with aspects of the present disclosure.

Referring to FIG. 21, in one aspect, the hub member 716 is configured as a torsion drive for effecting folding and unfolding of the foldable enclosure apparatus 10 (as described herein). For example, the hub member 716 includes a drive link 2120 that reciprocates within housing 1600 in direction 599. In this aspect, a first end 550A of the upper base legs 550, 552, 554, 556 and/or the lower base legs 560, 562, 564, 566 are respectively pivotally coupled to the drive link 2120 by a pivot block 2130 about axis 2130X so that the respective the upper base leg 550, 552, 554, 556 and/or the lower base leg 560, 562, 564, 566 rotate in direction 2199. A second end 550B of the upper base legs 550, 552, 554, 556 and/or the lower base legs 560, 562, 564, 566 are respectively pivotally coupled to the respective wheel assembly 102, 104, 106, 108 by a pivot block 2140 about axis 2140X so that the respective the upper base leg 550, 552, 554, 556 and/or the lower base leg 560, 562, 564, 566 rotate in direction 2199. The first end 550E includes a first pinion gear 2150 that engages a respective first gear rack 2151 of the hub member 716. The second end 550B includes a second pinion gear 2152 that engages a second gear rack 2153 on the respective wheel assembly 102, 104, 106, 108. It is noted that only upper base leg 550 is illustrated for exemplary purposes but upper base legs 552, 554, 556 and/or lower base legs 560, 562, 564, 566 are similarly configured. Here, as the hub member 716 is pushed in direction 599A, the upper base leg 550, 552, 554, 556 and/or the lower base leg 560, 562, 564, 566 pivot about axis 2130X in direction 1699 to unfold the foldable enclosure apparatus 10. As the hub member 716 is pulled in direction 599B, the upper base leg 550, 552, 554, 556 and/or the lower base leg 560, 562, 564, 566 pivot about axis 2130X in direction 1698 to fold the foldable enclosure apparatus 10. As the hub member 716 is pushed in direction 599A or pulled in direction 599B, the upper base leg 550, 552, 554, 556 and/or the lower base leg 560, 562, 564, 566 also rotate in direction 2199 to maintain a spatial relationship between the hub member 716 and the upright posts 56, 58, 60, 62 (e.g., the wheel assembly 102, 104, 106, 108 (and the respective upright post 56, 58, 60, 62) are substantially parallel with the axis of movement of the hub member 716 in direction 599). In one aspect, because the pivoting movement of the wheel assembly 102, 104, 106, 108 (and the respective upright post 56, 58, 60, 62) relative to the hub member 716 is constrained by the rack and pinion configuration of the upper base legs 550, 552, 554, 556, the lower base legs 560, 562, 564, 566 may be omitted (or vice versa).

Figure 22:
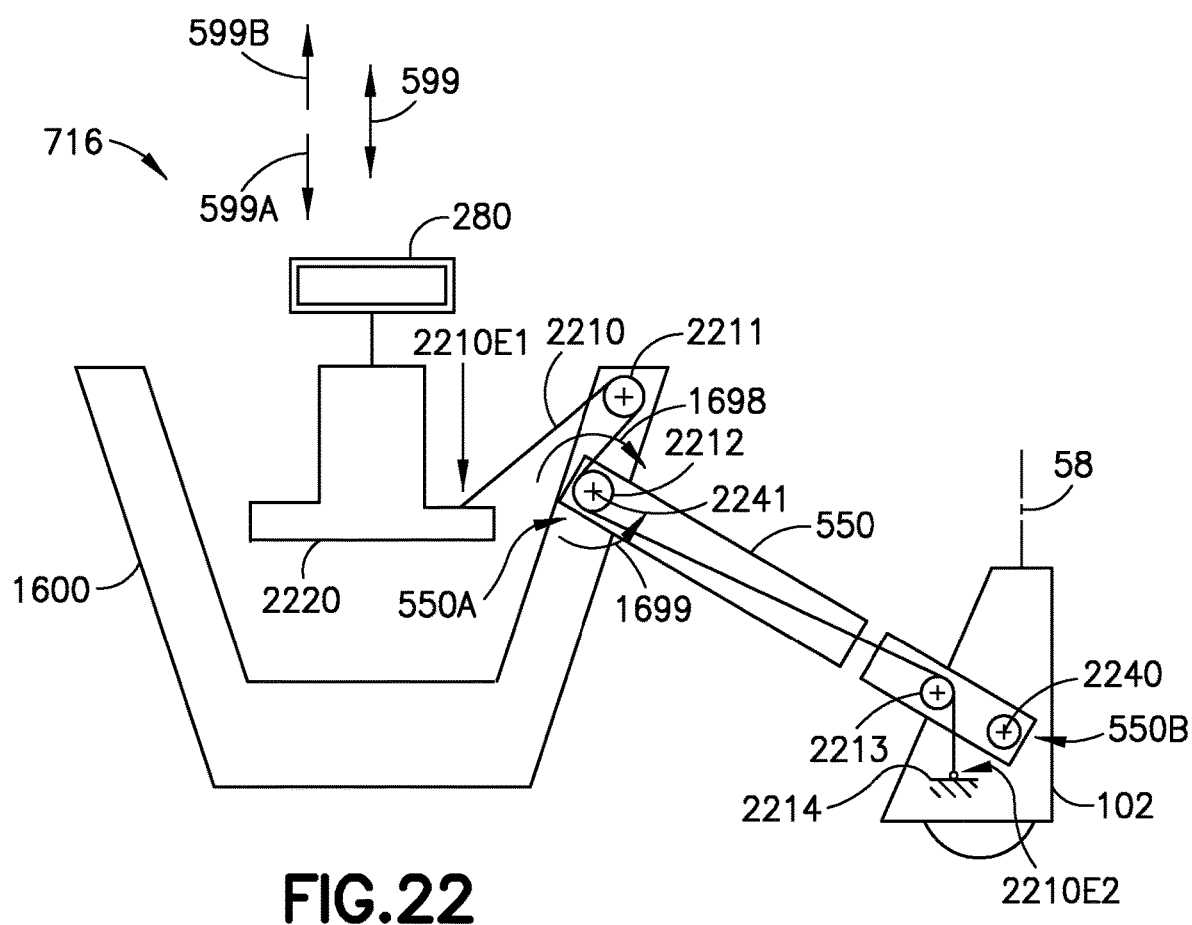
FIG. 22 is a schematic illustration of a central hub of the foldable enclosure apparatus of FIG. 1A in accordance with aspects of the present disclosure.

Referring to FIG. 22, the hub member 716 may be configured to maintain a spatial relationship between the hub member 716 and the upright posts 56, 58, 60, 62 (e.g., the wheel assembly 102, 104, 106, 108 (and the respective upright post 56, 58, 60, 62) are substantially parallel with the axis of movement of the hub member 716 in direction 599) with a cable system. For example, the hub member 716 includes a drive member 2220 that reciprocates in direction 599 within the housing 1600. In this aspect, a first end 550A of the upper base legs 550, 552, 554, 556 and/or the lower base legs 560, 562, 564, 566 are respectively pivotally coupled to the housing about a respective axis 2241. A second end 550B of the upper base legs 550, 552, 554, 556 and/or the lower base legs 560, 562, 564, 566 are respectively pivotally coupled to the respective wheel assembly 102, 104, 106, 108 about axis 2240. With respect to upper base leg 550 (noting that the other base legs are similarly configured), any suitable cable 2210 (such as those described herein) is routed from the drive member 2220 to the respective wheel assembly 102, 104, 106, 108 so as to maintain the spatial relationship between the hub member 716 and the upright posts 56, 58, 60, 62. For example, the housing 1600 includes a first pulley 2211 rotatably coupled to the housing 1600 above the upper base leg 550. A second pulley 2212 is pivotally coupled to the housing 1600 at, for example, axis 2241. A third pulley 2213 is pivotally coupled to the upper base leg 550. The cable 2210 is anchored at a first end 2210E1 to the drive member 2220 and wraps around the pulleys 2211, 2212, 2213 along a serpentine path so as to extend through (or along) the upper base leg 550. A second end 2210E2 of the cable is anchored to the wheel assembly 102 at any suitable location 2214. Here, as the hub member 716 and drive member 2220 are pushed in direction 599A, the upper base leg 550, 552, 554, 556 and/or the lower base leg 560, 562, 564, 566 pivot about the respective axis 2241 in direction 1699 to unfold the foldable enclosure apparatus 10. As the hub member 716 and the drive member 2220 are pulled in direction 599B, the upper base leg 550, 552, 554, 556 and/or the lower base leg 560, 562, 564, 566 pivot about the respective axis 2241 in direction 1698 to fold the foldable enclosure apparatus 10. In one aspect, because the pivoting movement of the wheel assembly 102, 104, 106, 108 (and the respective upright post 56, 58, 60, 62) relative to the hub member 716 is constrained by the cable 2210, the lower base legs 560, 562, 564, 566 may be omitted (or vice versa).

Referring now to FIGS. 1C, 7, 8, 9A-9E, and 10A-10C, and as described above, the push rod system 1000 couples the upper assembly 123 to the base structure 122 for actuation (e.g., folding and unfolding) of the upper arms 24, 26, 28, 30, 32, 34, 36 when the crank link 500 (FIG. 5A), 282 (FIG. 6A) is moved in direction 599. In accordance with aspects of the present disclosure, a push rod system 1000 may be disposed at each of the upright posts 56, 58, 60, 62 so that each of the upright posts has a respective push rod assembly 1001. Each push rod assembly 1001 (described herein with respect to upright post 56 but upright posts 58, 60, 62 have similar push rod assemblies 1001) includes a push rod 1050 that is slidingly coupled to the upright post 56 in any suitable manner so as to linearly reciprocate along the upright post 56. The push rod 1050 is connected to the substantially four bar articulated link 125 so that linear movement of the crank link 500 (FIG. 5A), 282 (FIG. 6A) effects, through the substantially four bar articulated link 125, a linear driving motion of the push rod 1050 in a direction 999 (FIG. 9A) along the length of the upright post 56.

In one aspect, referring to FIGS. 7 and 8, the substantially four bar articulated link 125 is coupled to the push rod 1050 by a connecting link 750 of the push rod assembly 1001. The connecting link 750 is pivotally coupled at one end of the connecting link 750 to the push rod 1050 at pivot axis 751 (e.g., axis of rotation) and is pivotally coupled at the other end of the connecting link 750 to the upper base leg 550 at pivot axis 752 (e.g., axis of rotation). The connecting link 750 is coupled to the upper base leg 550 on an opposite side of the pivot axis 824 than the hub member 716 so that as the hub member 716 moves in direction 599B the connecting link moves the push rod 1050 in direction 999A and vice versa (e.g., as the substantially four bar articulated link 125 is folded in direction 599B towards the respective upright post 56, the upper arms 22, 26 are folded in direction 799A towards the respective upright post 56 and vice versa). As can be seen in FIGS. 7 and 8 a portion 56P of the upright post 56 may be scalloped or cut away so as to form a recess in which the pivot axis 752 (e.g., axis of rotation) between the upper base leg 550 and the connecting link 750 is disposed when the push rod assembly 1001 is in an extended configuration (the extended configuration of the push rod assembly 1001 corresponding to the unfolded configuration of the foldable enclosure apparatus 10).

In the aspects illustrated in FIGS. 7-8, any suitable bearing member 877 (lubricious sliding pads, rollers, etc.) (shown in FIG. 7) may be provided between the push rod 1050 and the upright post 56 so as to, at least in part, guide reciprocating movement of the push rod 1050 against the upright post 56 as the connecting link 750 pivots to cause reciprocating movement of the push rod 1050 in direction 999.

Figure 9A:
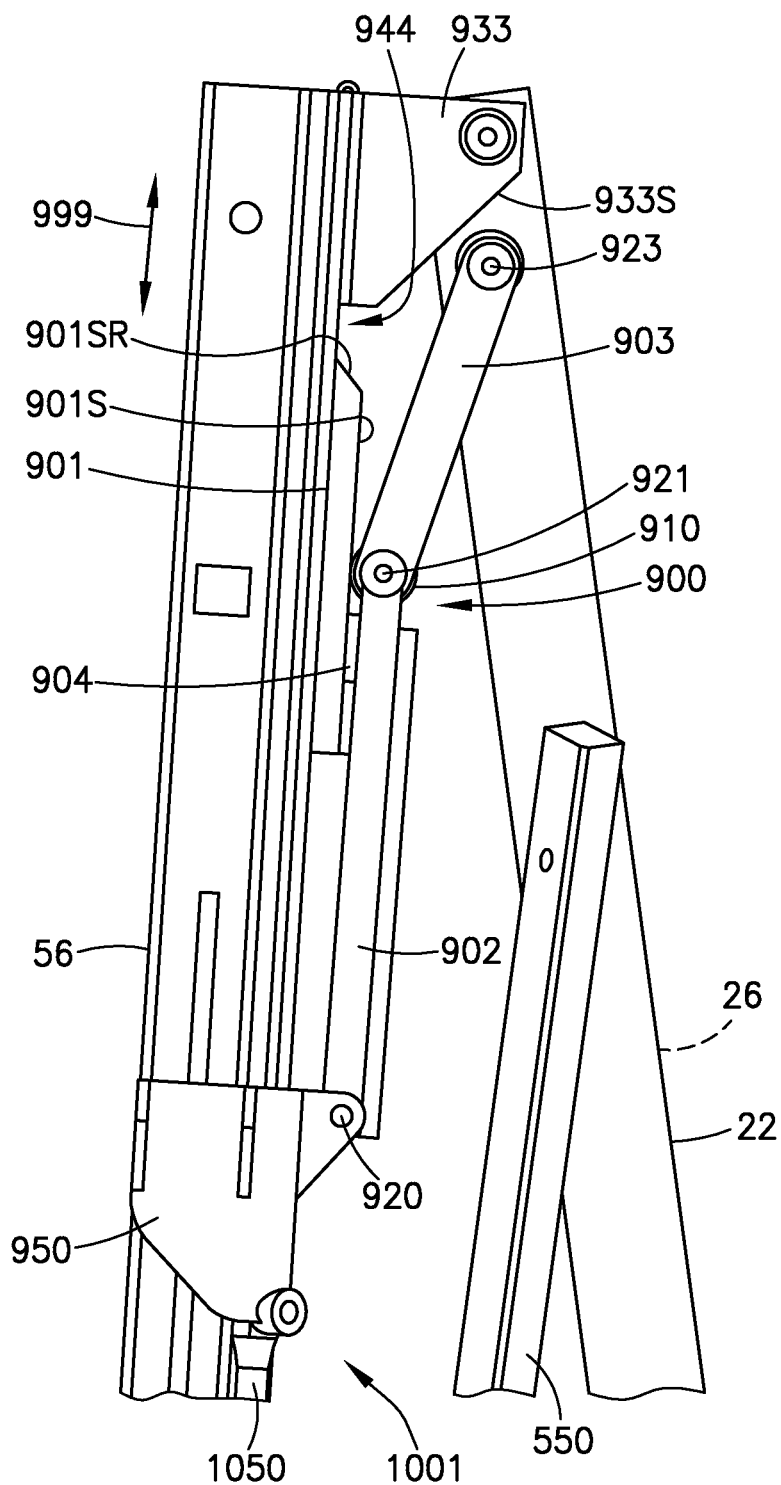
FIGS. 9A, 9B, 9C, 9D, and 9E are schematic illustrations of a portion of a push rod system of the foldable enclosure apparatus of FIG. 1A respectively shown in a folded configuration, a partially extended configuration, and a locked configuration in accordance with aspects of the present disclosure.
Figure 9B:
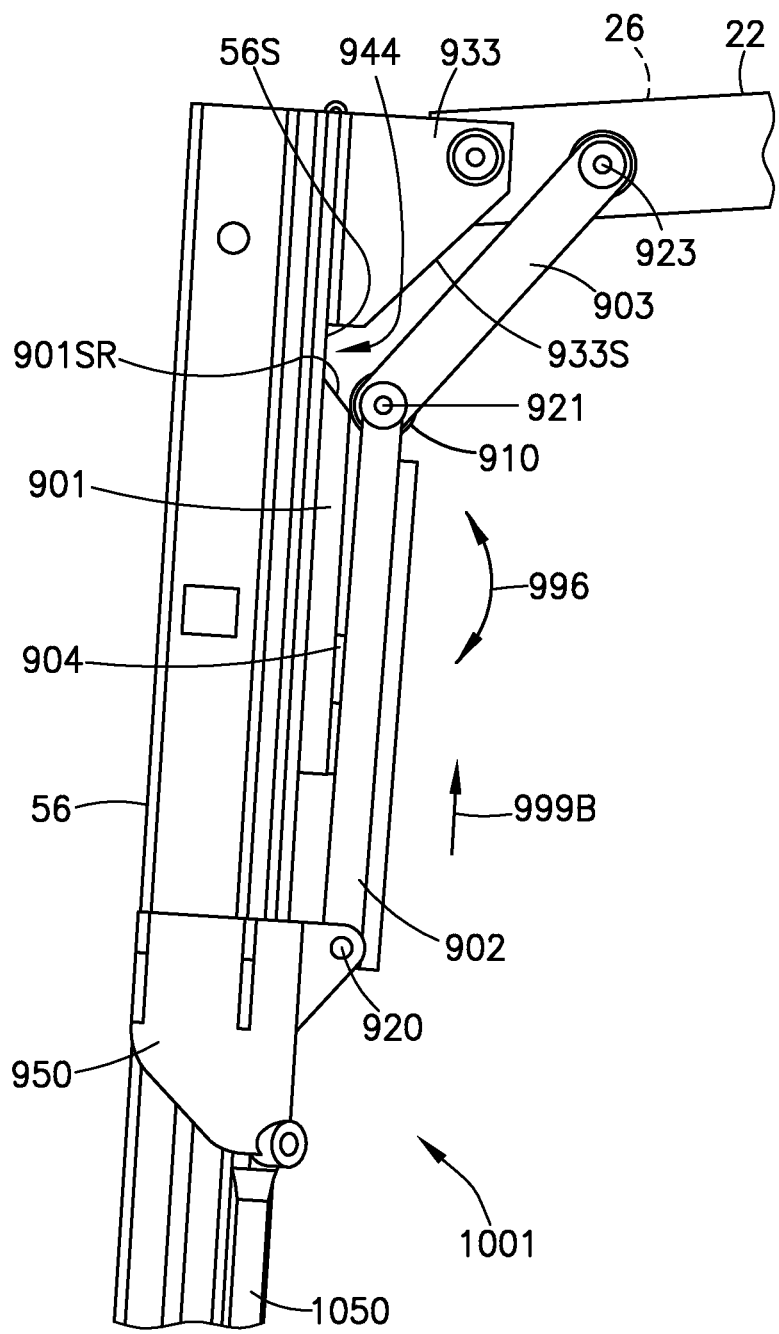
Figure 9C:
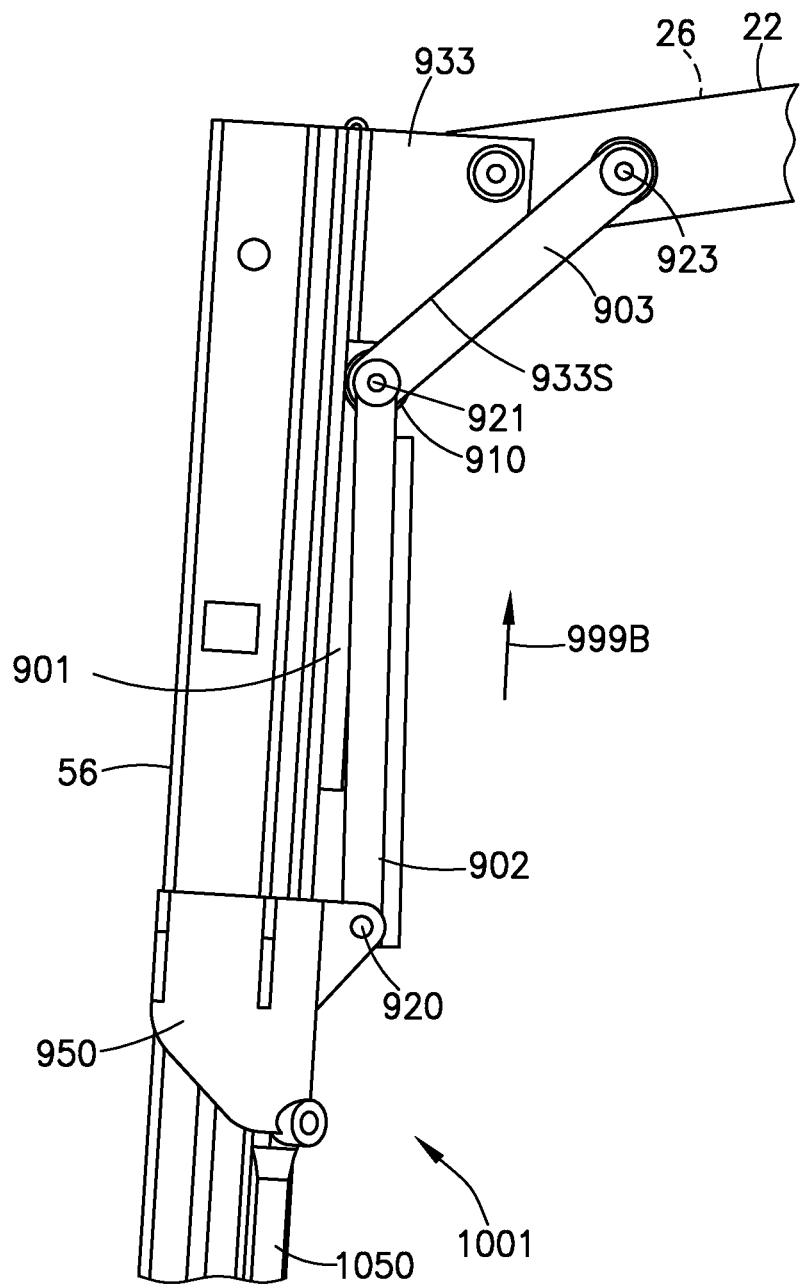
Figure 9D:
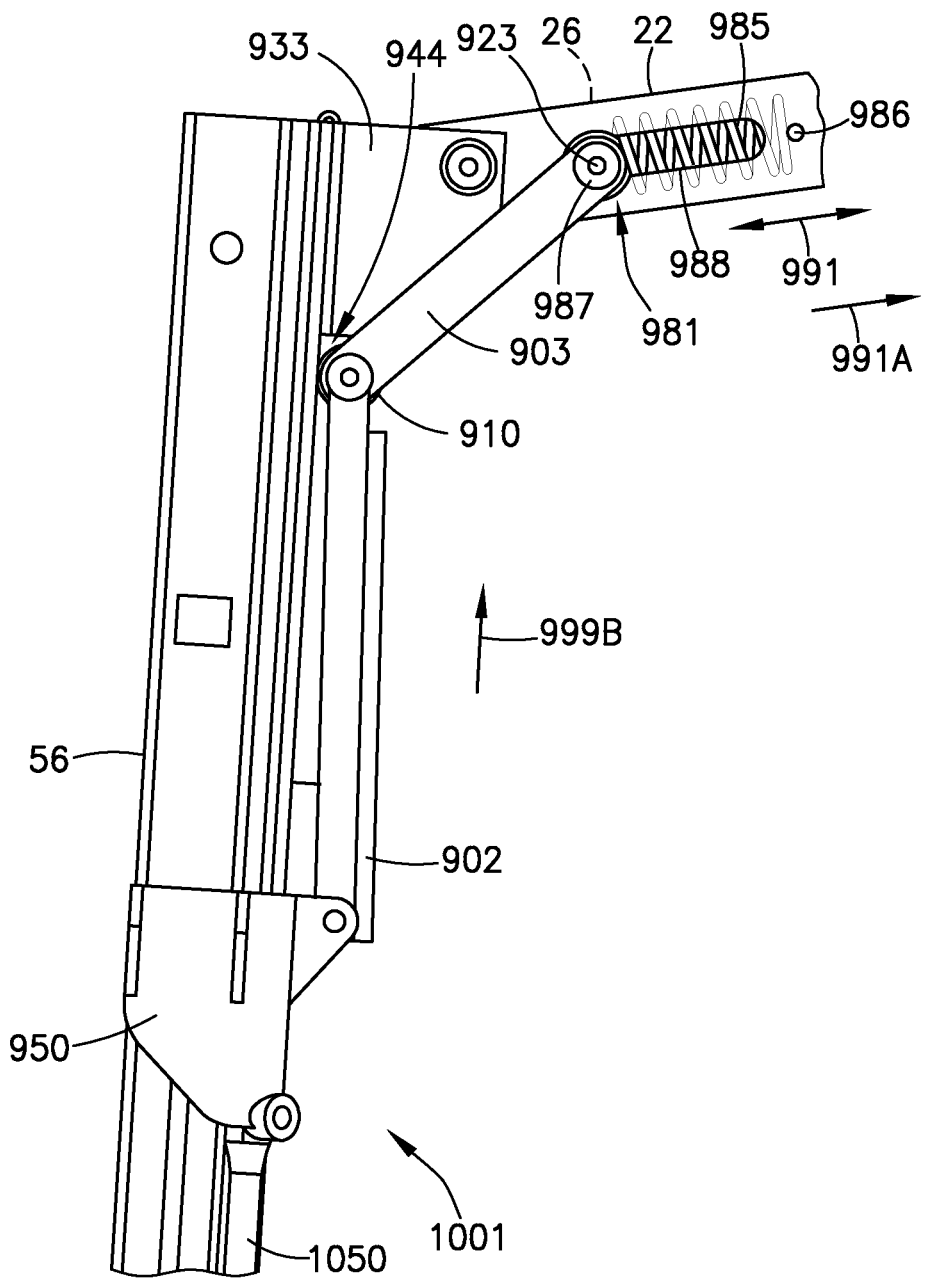
Figure 9E:
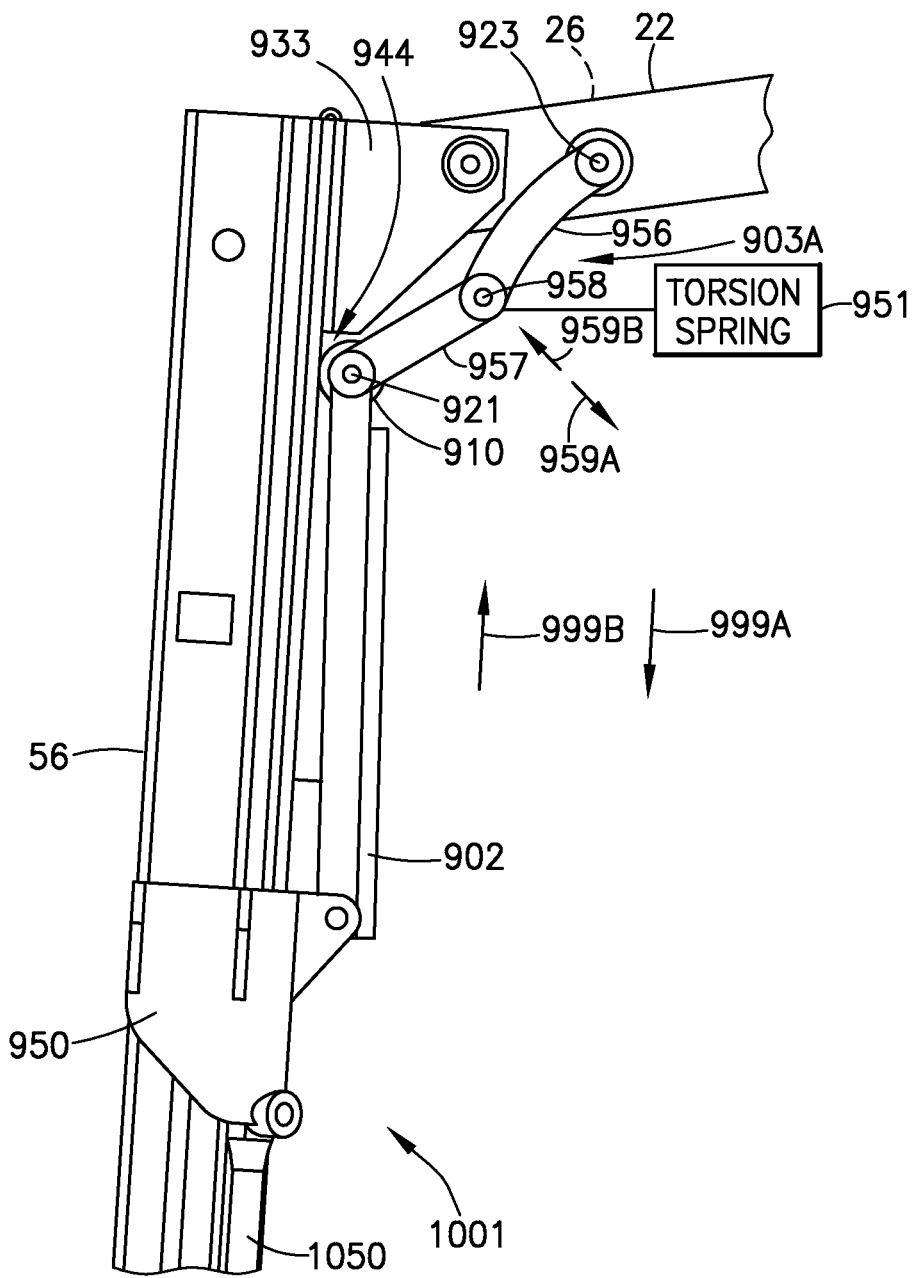
Figure 10A:
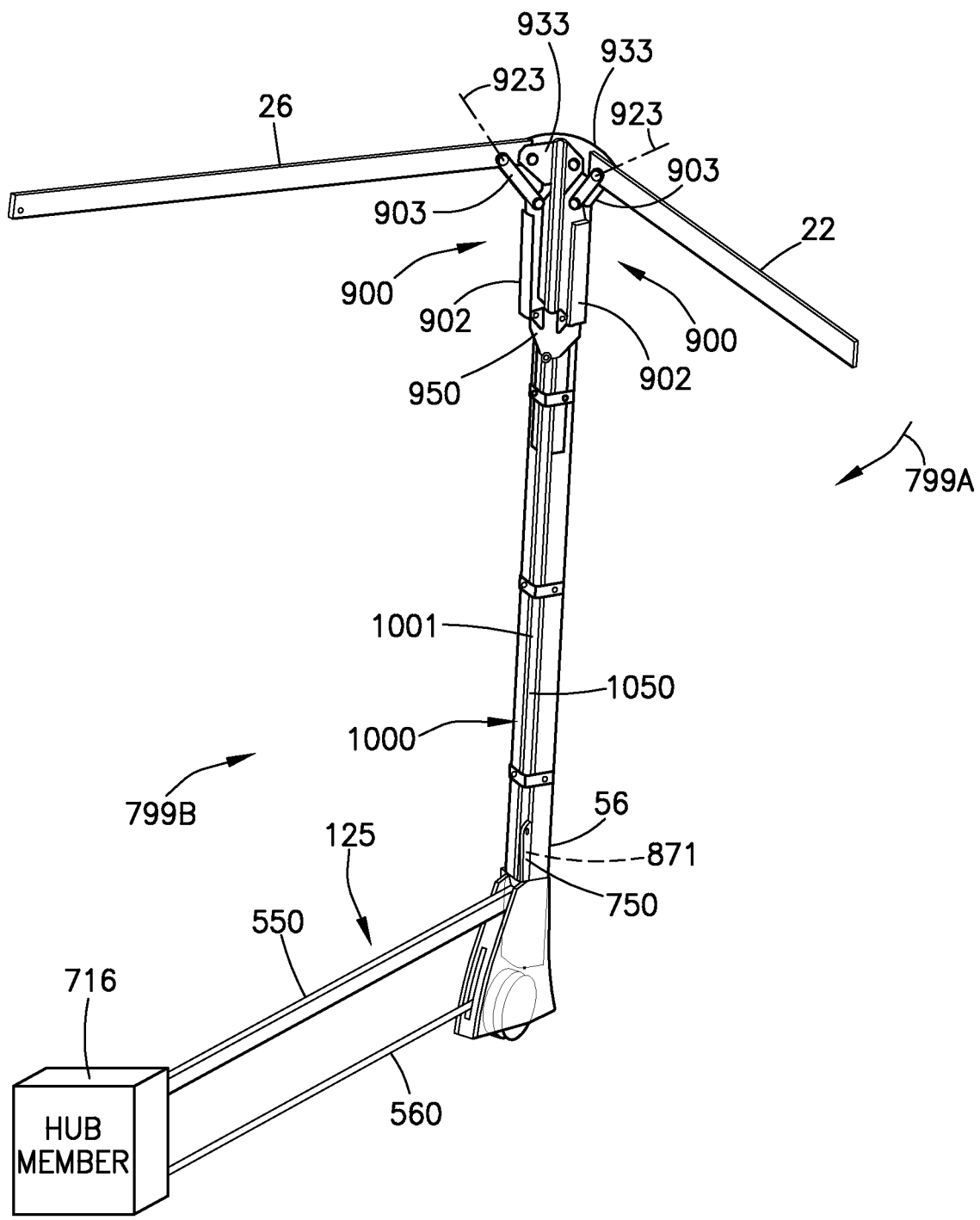
FIGS. 10A-10C schematically illustrate a portion of the frame of the foldable enclosure apparatus of FIG. 1A including the central hub, the four bar linkage, and push rod system in accordance with aspects of the present disclosure.
Figure 10B:
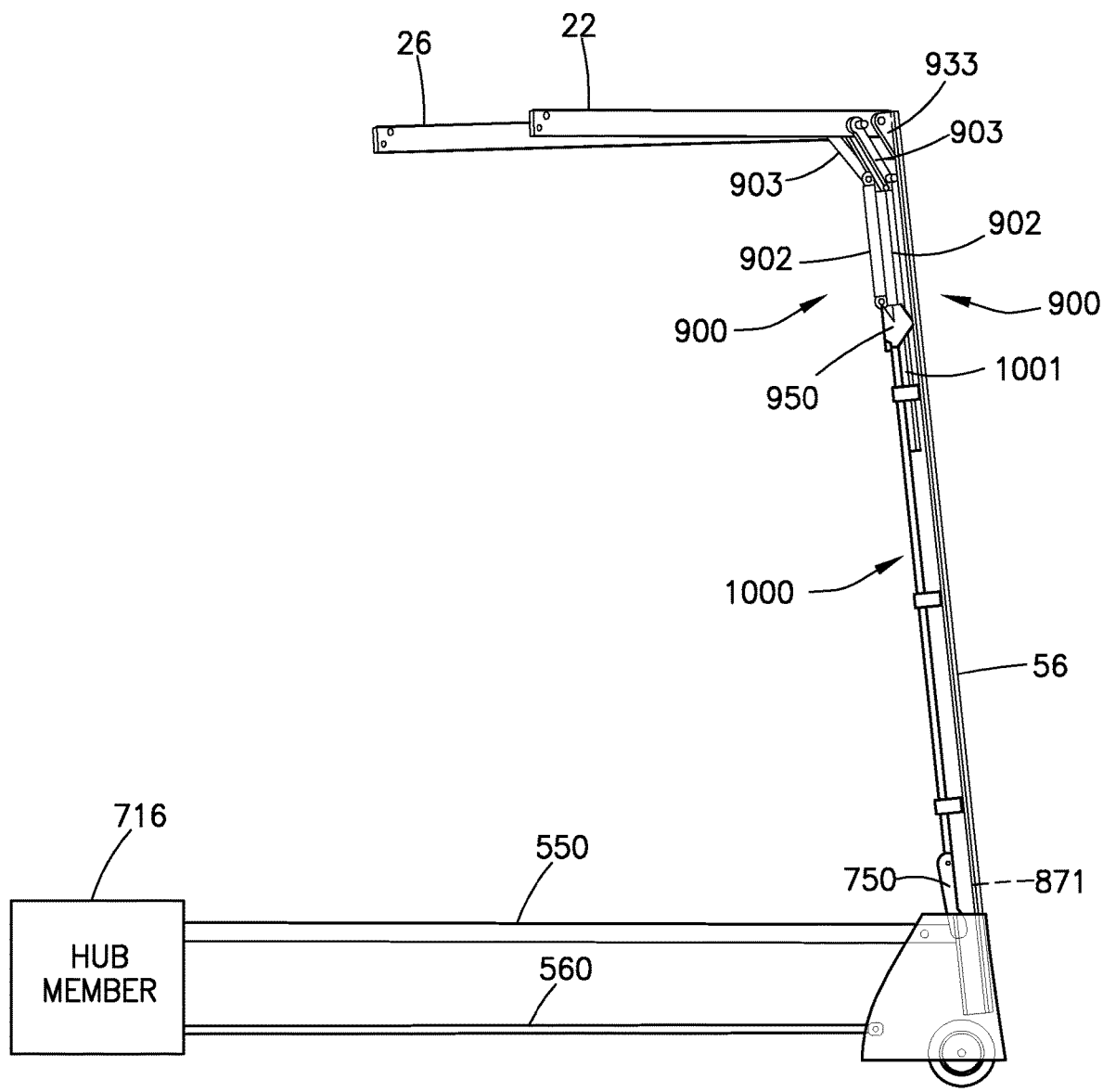
Figure 10C:
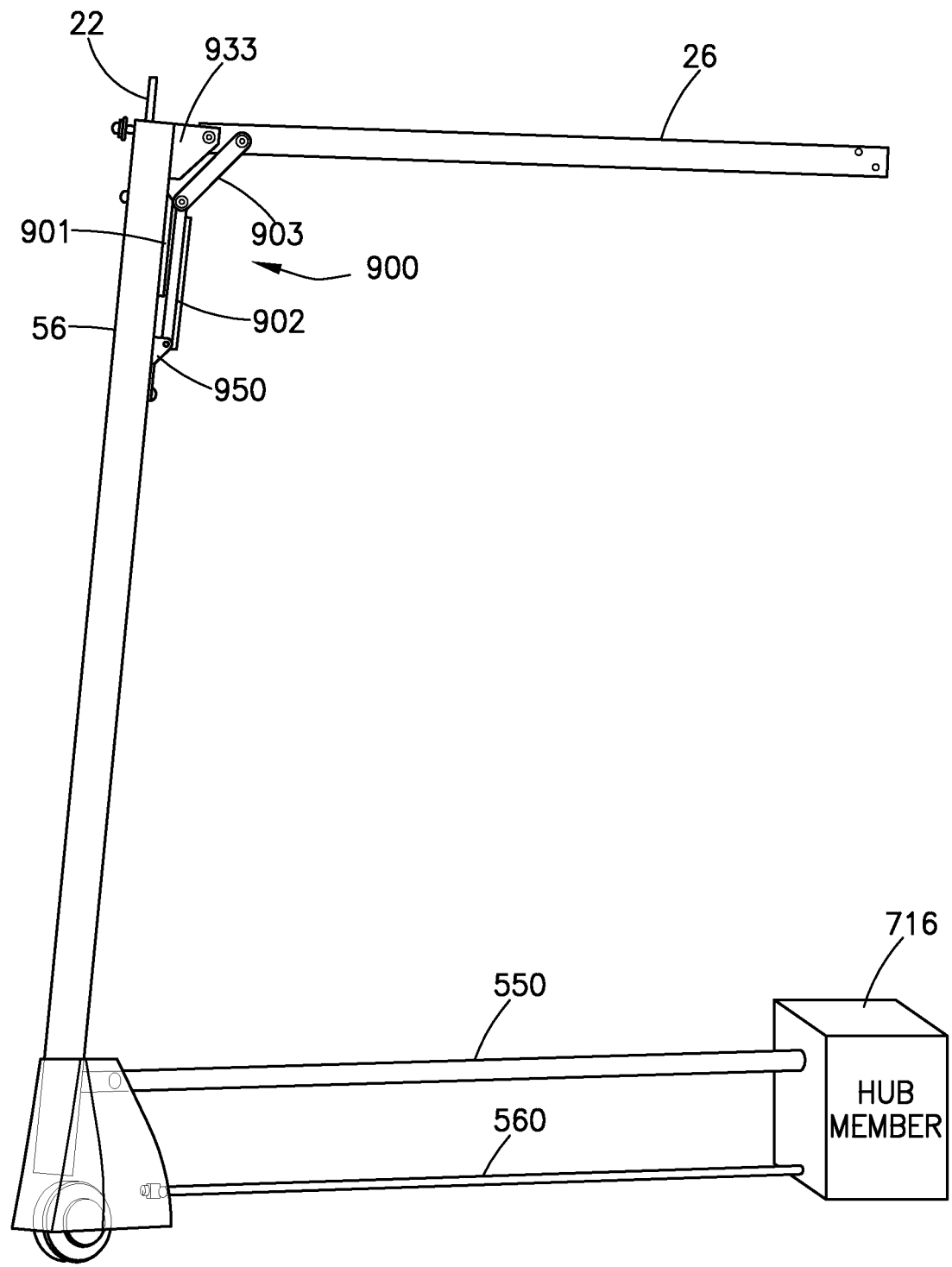

In one aspect, referring to FIGS. 1C, 9A-9E, and 10A-10C, each push rod assembly 1001 includes a slide wedge 900 that is coupled to the push rod 1050. For example, the push rod 1050 may terminate in or otherwise be coupled to a carriage 950 that is slidingly coupled to the upright post 56 in any suitable manner so as to reciprocate along the upright post 56. The carriage 950 couples the push rod 1050 to the upper arms 22, 26 of the respective upright post 56 as shown in FIGS. 10A-10C. The push rod assembly 1001 includes a slide wedge 900 for each of the upper arms 22, 26. Each slide wedge 900 includes a wedge 901, a slider 902, and at least one connecting link 903. The wedge 901 is fixedly coupled to the upright post 56 so as to be in a stationary position relative to the upright post 56. The wedge 901 includes any suitable guiding members 904 (e.g., pins, ball joint, etc.) for guiding reciprocal movement of the slider 902 in a direction 999 that generally extends along a length of the upright post 56. The guiding members 904 may also form respective pivot surfaces that bias the respective slider 902 transverse to a linear driving motion of the respective push rod 1050 and provide for pivoting of the respective slider 902 in direction 996 (FIG. 9B) relative to the respective wedge 901, where such pivoting can be seen when comparing FIGS. 9A-9C and, at least in part, effects locking of the upper arms 22, 26 in the extended configuration.

The slider 902 is pivotally coupled at one end to the carriage 950 about pivot axis 920 (e.g., axis of rotation). The slider 902 is pivotally coupled at the other end to the connecting link 903 about pivot axis 921 (e.g., axis of rotation). A roller 910 or other suitable bearing member may also be coupled at pivot axis 921 where the roller 910 rides along a camming surface 901S of the wedge 901. The connecting link 903 extends from the slider 902 and pivotally couples with the respective upper arm 22, 26 about pivot axis 923 (e.g., axis of rotation).

It is noted that FIG. 9A shows the upper arms 22, 26 in a substantially folded configuration. In the manner described above with respect to FIGS. 5A, 5B, 6C, 7, and 8, movement of the crank link 282, 500 in direction 599A rotates the connecting link 750 so that the push rod 1050 moves substantially linearly in direction 999B along the upright post as shown in FIG. 9B. Movement of the push rod 1050 in direction 999B continues until the crank link 282, 500, 500 and the hub member 716 are at their lowermost position relative to the upper corner assemblies 38, 40, 42, 44, e.g., such as when the upper base legs 550, 552, 554, 556 are disposed substantially perpendicular to a longitudinal axis LAX (FIGS. 5A and 6C) of the linear bearing 310, 515.

The movement of the push rod 1050 in direction 999B causes the roller 910 to ride along a ramped surface 901SR of the camming surface 901S so that the roller 910 substantially contacts and/or rides along a surface 56S of the upright post 56 and is disposed within a recess 944. The recess 944 is formed or otherwise defined by the ramped surface 901SR of the wedge 901 and an upper corner bracket 933 that couples the upper arm 22, 26 to the upright post 56. In one aspect, movement of the push rod 1050 in direction 999B also causes, as shown in FIG. 9C, the connecting link 903 to contact a stop surface 933S of the upper corner bracket 933 which places at least one of the connecting link 903, the slider 902, the carriage 950, the push rod 1050, and any of the mechanical connections there between in compression. The placement of the roller 910 within the recess 944 up against the ramped surface 901SR, the fixed extended position of the push rod 1050 (as effected by the locked downward position of the hub member 716), and/or the compression of the push rod assembly 1001 components effects an over-center locking of the slider 902 and connecting link 903. The over-center locking of the slider 902 and connecting link 903 at least in part holds the upper arms 22, 26 in the unfolded or extended configuration.

In one aspect, the upper arms 22, 24, 26, 28, 30, 32, 34, 36 may be provided with at least some compliance where movement of the upper arms 22, 24, 26, 28, 30, 32, 34, 36 during, e.g., unfolding of the foldable enclosure apparatus 10 is blocked or otherwise obstructed. For example, referring to FIG. 9D, a compression spring 985 or other biasing member (which, in one aspect, may act in tension rather than compression) may be disposed within each of the upper arms 22, 24, 26, 28, 30, 32, 34, 36 (upper arms 22, 26 are shown for exemplary purposes) where the compression spring 985 is retained between a retaining member 986 (such as a pin) and a mechanical connection 987 that forms pivot axis 923. A slot 988 may be provided in the upper arm 22, 26, in which slot 988 the pivot axis 923 moves linearly in direction 991 (e.g., along a length of the upper arm 22, 26) against the bias of the compression spring 985. As the upper arm 22,26 is unfolded and its movement is blocked, the push rod assembly 101 may continue to extend so that the pivot axis 923 moves from a predetermined base position 981 (in which the upper arm 22, 26 is fully unfolded) in direction 991A against the bias of the compression spring 985. Once the obstruction is removed, the compression spring 985 returns the pivot axis 923 to the predetermined base position so that the upper arm 22, 26 fully unfolds and is locked into the unfolded configuration as described above.

In another aspect, referring to FIG. 9E, compliance of the upper arm may be provided by an articulated connecting link 903A that includes at least links 956, 957. The links 956, 957 are pivotally coupled to each other at pivot axis 958 (e.g., axis of rotation). Link 956 is coupled to the upper arm at pivot axis 923 and link 957 is coupled to the slider 902 at pivot axis 921. One or more of the links 956, 957 may be curved (in the aspect shown link 956 is curved) so as to induce a predetermined folding movement of the articulated connecting link 903A. In this aspect the pivot axis 958 of the articulated connecting link is induced to move in direction 959A when the upper arm 22, 26 is folded and in direction 959B when the upper arm 22, 26 is unfolded.

In one aspect, any suitable biasing member, such as a torsion spring 951 may be disposed at one or more of pivot axes 921, 923, 958 (e.g., axes of rotation) so as to bias the articulated connecting link 903A in an extended position at which the upper arm 22, 26 is fully unfolded. In this aspect, as the upper arm 22, 26 is unfolded and its movement is blocked, the push rod assembly 101 may continue to extend so that the extension of the articulated connecting link 903A stops or reverses (i.e., remains folded or is folded further where the pivot axis 958 moves in direction 959A relative to the upright post 56) against the bias of the torsion spring 951. Once the obstruction is removed, the torsion spring 951 causes extension (e.g., unfolding) of the articulated connecting link 903A so that the upper arm 22, 26 fully unfolds and is locked into the unfolded configuration as described above. In other aspects, the articulated connecting link 903A may be employed with the compression spring 985 of FIG. 9D.

Figure 11A:
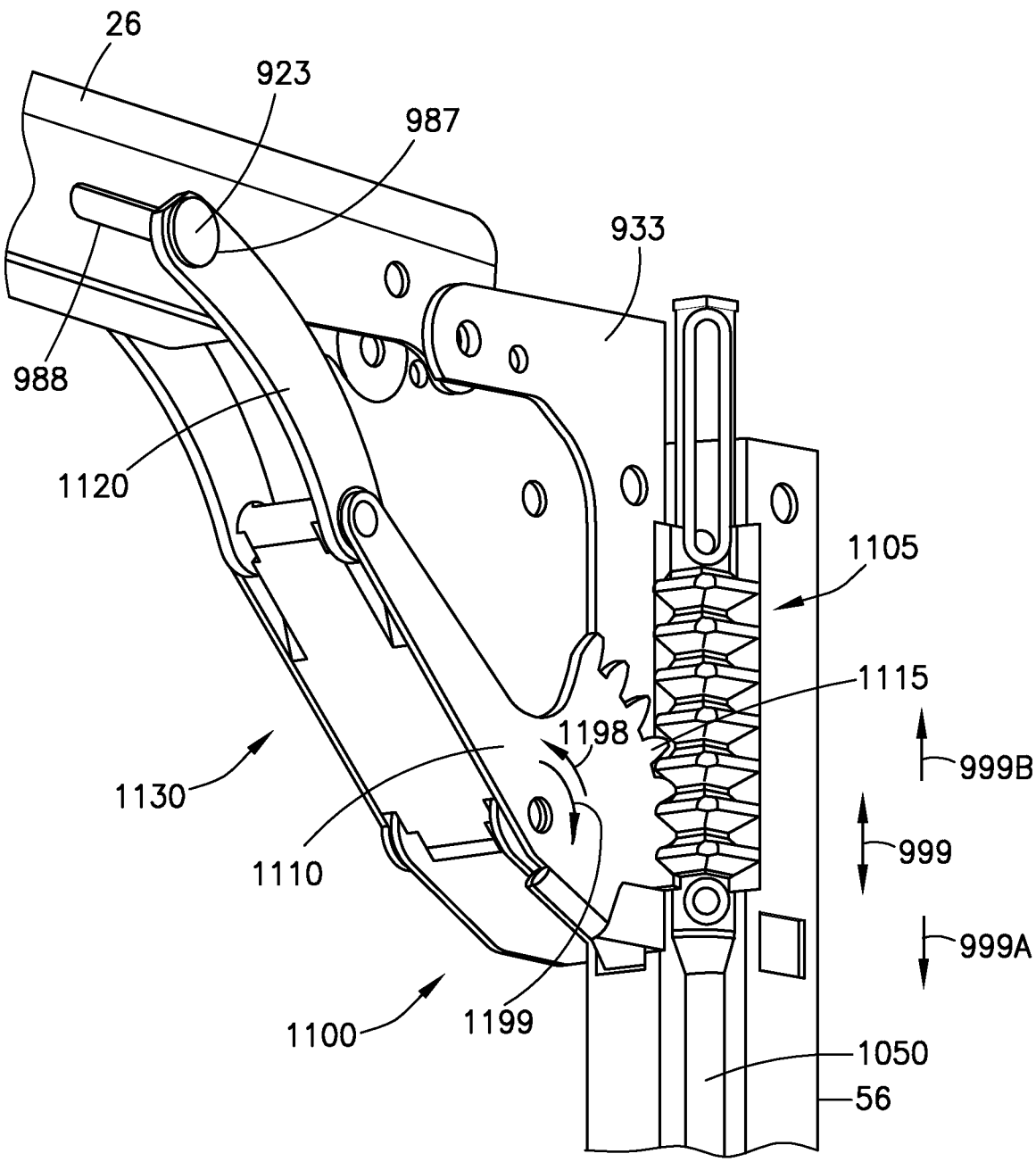
FIGS. 11A and 11B are schematic illustrations of a portion of a push rod system of the foldable enclosure apparatus of FIG. 1A in accordance with aspects of the present disclosure.
Figure 11B:
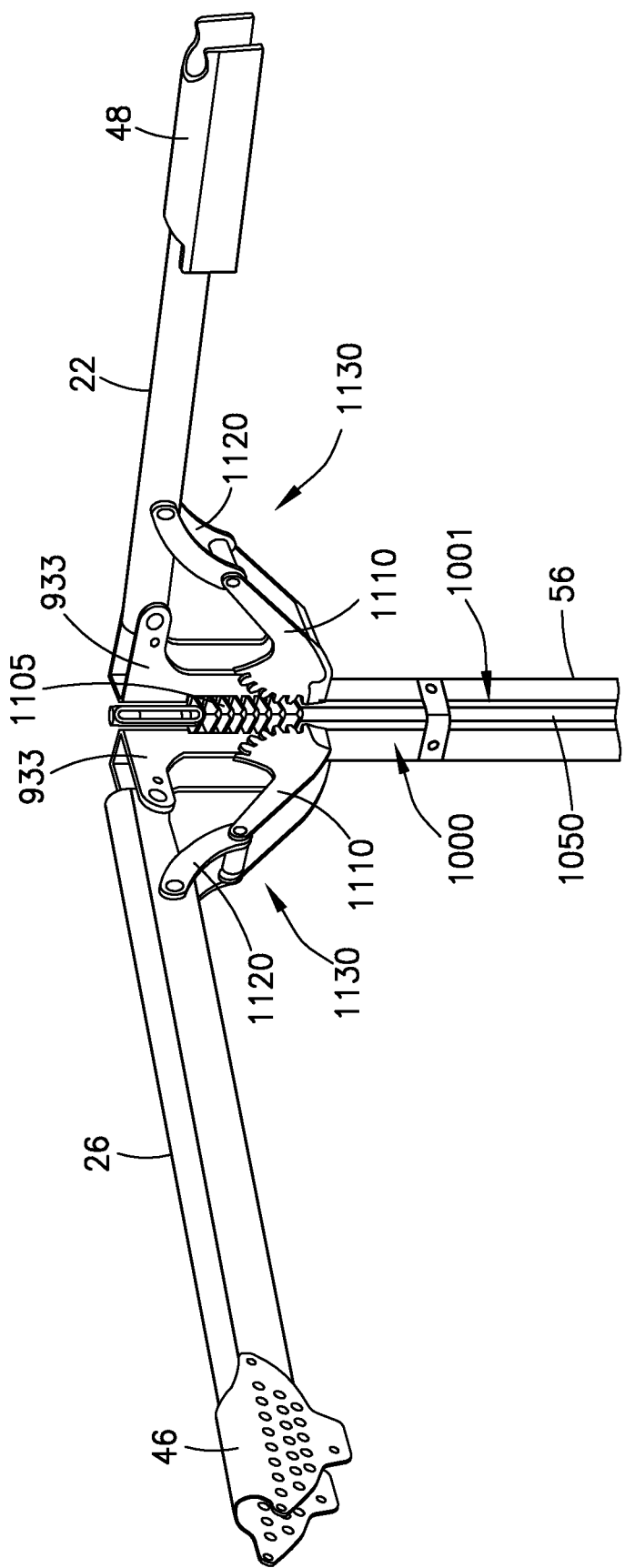

In one aspect, referring to FIGS. 1C, 11A and 11B, each push rod assembly 1001 includes a rack assembly 1100. The rack assembly 1100 includes a gear rack 1105 that is coupled to or formed integral with an upper end of the push rod 1050 (e.g., adjacent the respective upper corner assembly 38, 40, 42, 44) so as to reciprocate in direction 999 with the push rod 1050. The rack assembly 1100 also includes an articulated driven link 1130 that includes a pinion link 1110 and a connecting link 1120. The pinion link 1110 is rotatably coupled at a first end 1110E1 to, for example, bracket 933 by any suitable mechanical connection. The first end 1110E1 of the pinion link 1110 has integrated therewith or coupled thereto a pinion gear 1115 that meshingly engages with the gear rack 1105 so that the gear rack 1105 drive rotation of the pinion link 1110. The connecting link 1120 is rotatably coupled to a second end 1110E2 of the pinion link 1110 and to the upper arm 22, 26 by any suitable mechanical connections. In one aspect, the connecting link 1120 may be coupled to the upper arm 22, 26 so that the coupling is a compliant coupling as described above with respect to FIG. 9D; while in other aspects the coupling may be non-compliant. In this aspect, as the push rod 1050 moves in direction 999A, the corresponding movement of the gear rack 1105 causes the pinion link 1110 to rotate in direction 1199 so as to fold the articulated driven link 1130 and lower the upper arm 22, 26 to the folded configuration illustrated in FIGS. 2A-2C. As the push rod 1050 moves in direction 999B, the corresponding movement of the gear rack 1105 causes the pinion link 1110 to rotate in direction 1198 so as to unfold the articulated driven link 1130 to the configuration illustrated in FIG. 11A and raise or unfold the upper arm 22, 26 to the unfolded configuration illustrated in FIGS. 1C and 11B. The upper arm 22, 26 is locked into the unfolded position by the respective push rod assembly 1001 (e.g., the meshed engagement between the gear rack 1105 and the pinion gear 1115 prevents folding of the upper arm 22, 26 until the hub member 716 is lifted or moved in direction 599B to fold the foldable enclosure apparatus 10).

Figure 14A:
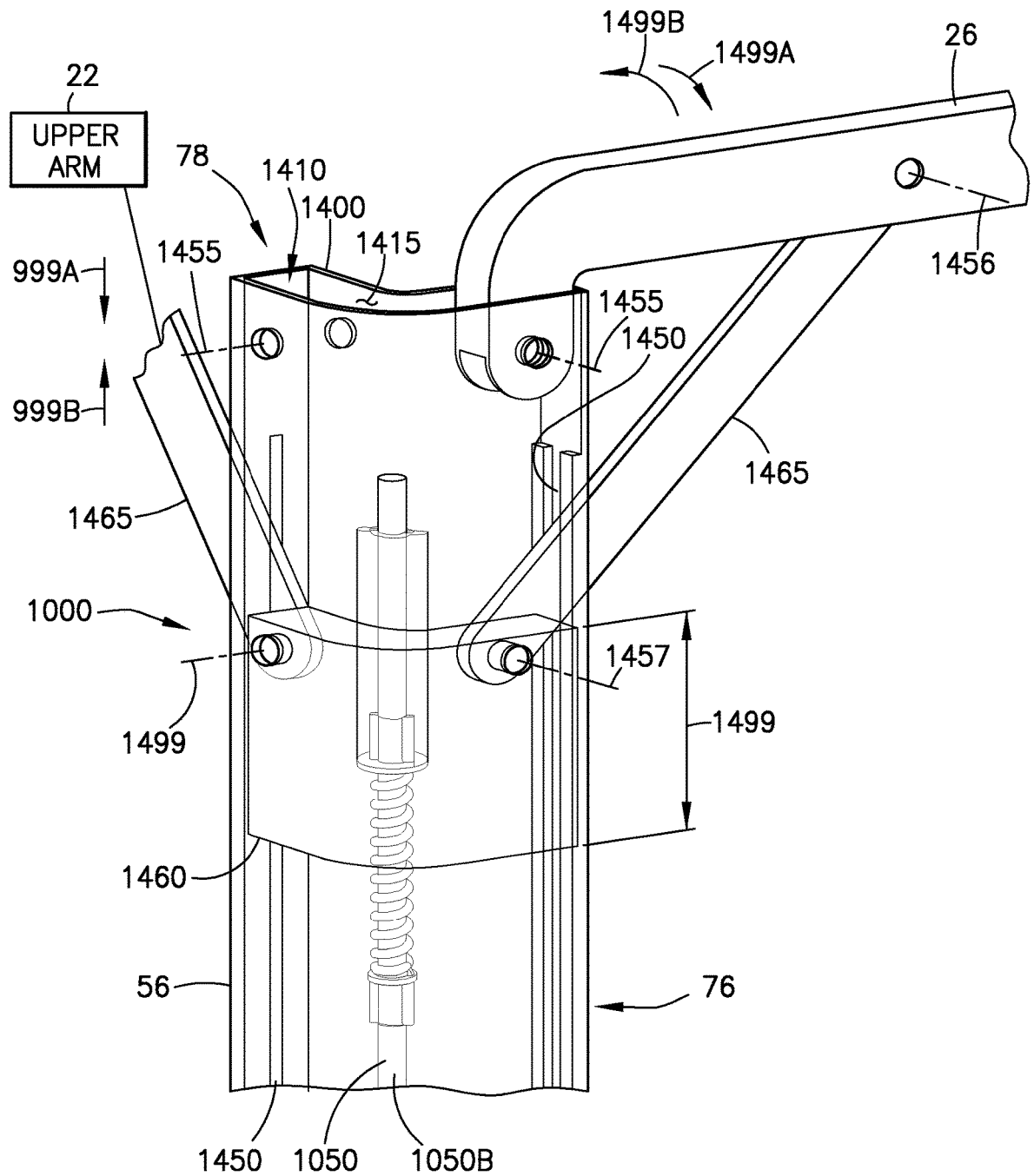
FIGS. 14A, 14B, and 14C are schematic illustrations of a portion of a push rod system of the foldable enclosure apparatus of FIG. 1A in accordance with aspects of the present disclosure.
Figure 14B:
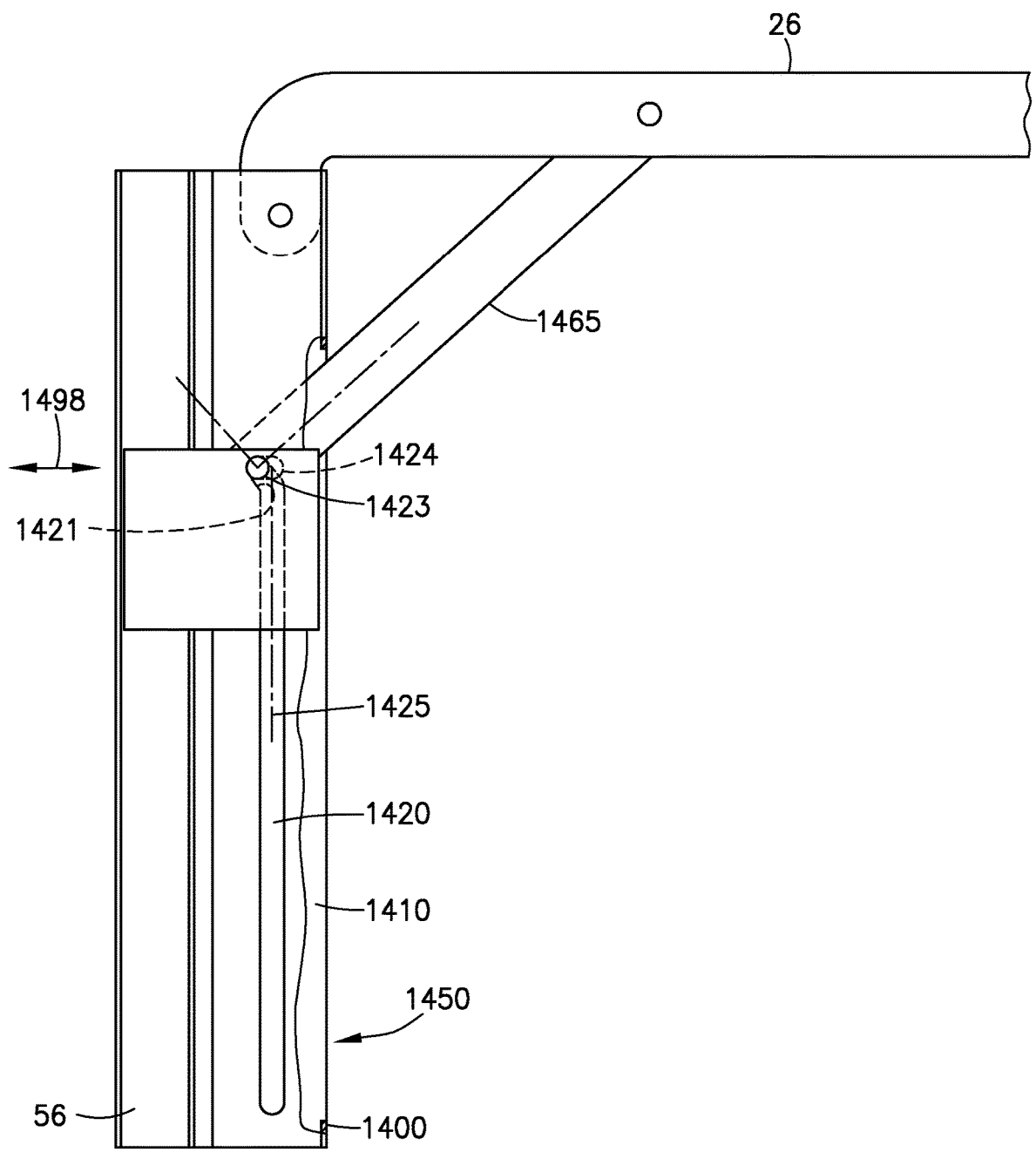
Figure 14C:
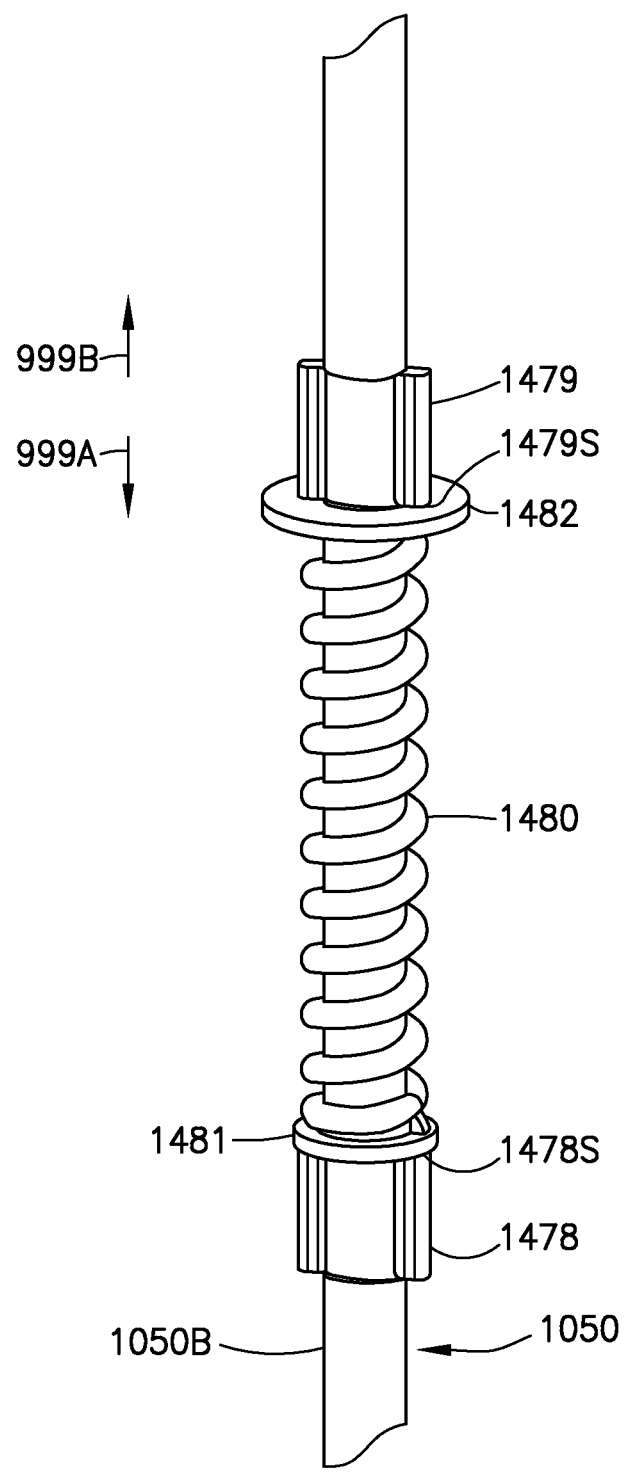

Referring to FIGS. 14A-14C, the stanchion 56S, 58S, 60S, 62S of the respective upright posts 56, 58, 60, 62 (upright post 56 is illustrated so as to be transparent in FIGS. 14A-14C for exemplary purposes only but upright posts 58, 60, 62 are similarly configured) includes walls 1400 that form an internal space 1410 with an elongated guide surface 1415. A slot 1450 is formed at least of the walls 1400 and extends along the elongated internal guide space 1410. In this aspect, the push rod system 1000 includes a slide member 1460, the push rod 1050, and a drive link 1465.

The slide member 1460 is disposed within the internal space 1410 so as to reciprocate in directions 999A, 999B within the internal space 1410. Movement of the slide member 1460 is guided within the internal space 1410 by the elongated guide surface 1415. For example, the slide member 1460 is shaped and sized to conform to a cross section of the internal space 1410 and has a predetermined length 1499 that provides for stable free sliding movement (i.e., substantially unhindered movement) of the slide member 1460 within the internal guide space 1410. The push rod 1050 is disposed within the internal space 1410 so as to be hidden from a view of a user.

The push rod 1050 is coupled at one end to the substantially four bar articulated link 125 in a manner similar to that described above with respect to FIGS. 7 and 8. The other end of the push rod 1050 is coupled to the slide member 1460 for effecting a linear driving motion of the slide member in directions 999A, 999B to reciprocate the slide member within the internal space 1410.

The upper arm 26 (only upper arm 26 is illustrated in FIGS. 14A-14C but upper arms 22, 24, 28, 30, 32, 34, 36 are similarly configured). In a manner similar to that described above, an end of the upper arm 26 is pivotally coupled to the upright post 56 at for example pivot axis 1455. On end of the drive link 1465 is coupled to the upper arm 26 at pivot axis 1456 and the other end of the drive link 1465 is coupled to the slide member 1460 at pivot axis 1457. In this aspect, reciprocation of the slide member 1460 within the frame effects, through the respective drive link 1465, folding and unfolding of the upper arm relative to the respective upright post 56. For example, as the push rod 1050 is driven, as described above, in direction 999B the push rod 1050 drives the slide member 1460 in direction 999B. Movement of the slide member 1460 in direction 999B causes drive link 1465 to push on upper arm 26 and rotates the upper arm 26 in direction 1499B about pivot axis 1455 so as to unfold the upper arm 26 relative to the upright post 56. Folding of the upper arm occurs in a substantially opposite manner. For example, as the push rod 1050 is driven in direction 999A the push rod 1050 drives the slide member 1460 in direction 999A. Movement of the slide member 1460 in direction 1499A causes drive link 1465 to pull on the upper arm 26 so that the upper arm rotates in direction 1499A about pivot axis 1455 to fold the upper arm 26 relative to the upright post 56.

In this aspect, the upper arms 22, 24, 26, 28, 30, 32, 34, 36 may be provided with at least some compliance where movement of the upper arms 22, 24, 26, 28, 30, 32, 34, 36 during, e.g., unfolding of the foldable enclosure apparatus 10 is blocked or otherwise obstructed. For example, the push rod 1050 has an elongated body 1050B. The elongated body 1050B is crimped (see crimp 1478) to form a support surface 1478S for a resilient member 1480. In other aspects, the support surface 1478S may be any suitable clamp, washer, compression fitting, etc. that is fixed on the elongated body 1050B and provides a surface or shelf for retaining the resilient member 1480. In one aspect, a washer 1481 may be disposed on the push rod 1050 between the support surface 1478S and the resilient member 1480. The resilient member 1480, such as a coil spring, is placed over the push rod 1050 (e.g., the push rod 1050 extends through a center of the coil spring so as to guide compression of the coil spring). The resilient member 1480 is compressed to preload the resilient member 1480 (e.g., so that the resilient member 1480 is under a predetermined amount of compression). A carrier 1482 is placed over the push rod 1050 so as to move in direction 999A, 999B along the push rod 1050. The push rod 1050 is crimped in a second location (see crimp 1479) so as to form a stop surface 1479S so that the resilient member 1050 and the carrier 1482 (and washer 1481 when provided) are captured between the support surface 1478S and the stop surface 1479S with the resilient member 1480 under the preload.

The push rod 1050 extends through the slide member 1460 so that the carrier 1482 contacts and supports the slide member 1460 while allowing relative movement between the push rod 1050 and the slide member 1460 in directions 999A, 999B. For example, as an obstruction is encountered during a deploying rotation of the of the upper arm 26 in direction 1499B under impetus of the push rod moving in direction 999B, the rotation of the upper arm 26 may be stopped by the obstruction while the push rod 1050 continues to move in direction 999B against resistance of the resilient member 1480 (i.e., the resilient member 1480 compresses as the push rod 1050 moves in direction 999B relative to the slide member 1460). Once the obstruction is removed, the resilient member decompresses to move the slide member 1460 in direction 999B until the carrier 1482 encounters stop surface 1479S allowing the upper arm 26 to rotate in direction 1499B to the deployed configuration. In other aspects, any suitable resilient member may be coupled to the push rod 1050 in any suitable manner (such as to and end of the push rod, in an offset parallel relationship with the push rod, etc.) to effect relative movement between the push rod 1050 and the slide member 1460 providing compliance to the upper arm 26.

In one aspect, the walls 1400 also include a cam slot 1420. The cam slot extends along a length of the upright post and includes a cam surface 1421 that is at least substantially perpendicular to an angle of the drive link 1465 (see FIG. 14B) in the deployed configuration. In other aspects the cam surface 1421 may form an obtuse angle with drive link 1465 with the drive link 1465 in the deployed configuration. One or more of the slide member 1460 and the drive link 1465 are configured to engage the cam slot 1420 to, at least in part, lock the drive link 1465 in an extended position (i.e., lock the drive link 1465 in the deployed configuration). For example, the drive link 1465 is pivotally coupled to the slid member 1460 about axis 1457. A hinge pin 1423 (FIG. 14B) extends through both the slide member 1460 and the drive link 1465 at the axis 1457 to pivotally couple the slide member 1460 and the drive link 1465. The hinge pin 1423 may extend into the cam slot 1420 so as to engage the cam surface 1421 when the upper arm 26 is in the deployed configuration so as to, at least in part, substantially prevent undesired folding of the upper arm 26 relative to the upright post 56. The slide member 1460 includes an elongated slot 1424 (FIG. 14B) at the axis 1457 to provide movement of the drive link 1465 in direction 1498 to offset the hinge pin 1421 from an hinge pin traverse axis 1425 defined by the cam slot 1420. The hinge pin traverse axis 1425 guides movement, in conjunction with the slide member 1460, of the drive link 1465 during extension (movement of hinge pin 1421 in direction 999B) of the drive link 1465 from and retraction (movement of hinge pin 1421 in direction 999A) of the drive link 1465 into the upright post 56. Movement of the slide member 1460 in direction 999A pulls the hinge pin 1423 from the cam surface 1421 so that the upper arm 26 may be folded.

Figure 23:
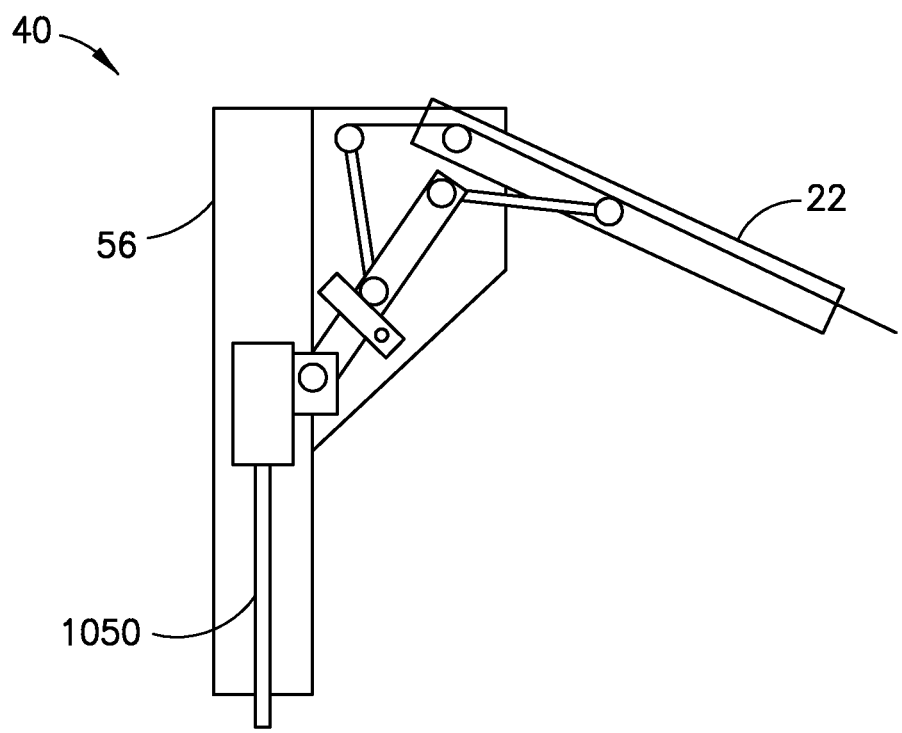
FIG. 23 is a schematic illustration of a portion of a push rod system of the foldable enclosure apparatus of FIG. 1A in accordance with aspects of the present disclosure.

Referring to FIGS. 23-34 the upper corner assemblies 38, 40, 42, 44 will be described in accordance with other aspects of the present disclosure. It is noted that the description of the upper corner assemblies 38, 40, 42, 44 will be made herein with respect to upper corner assembly 40 and it should be understood that the other upper corner assemblies are similarly configured. Referring to FIG. 23, upper corner assembly 40 may be configured so as to fold and unfold upper arm through actuation of one or more linkages in a manner substantially similar to that described in United States pre-grant patent publication number 2018/0168365 published on Jun. 21, 2018 (entitled "Connecting Rod Folding Mechanism and Cot Having Same"), the disclosure of which is incorporated herein by reference in its entirety.

Figure 24:
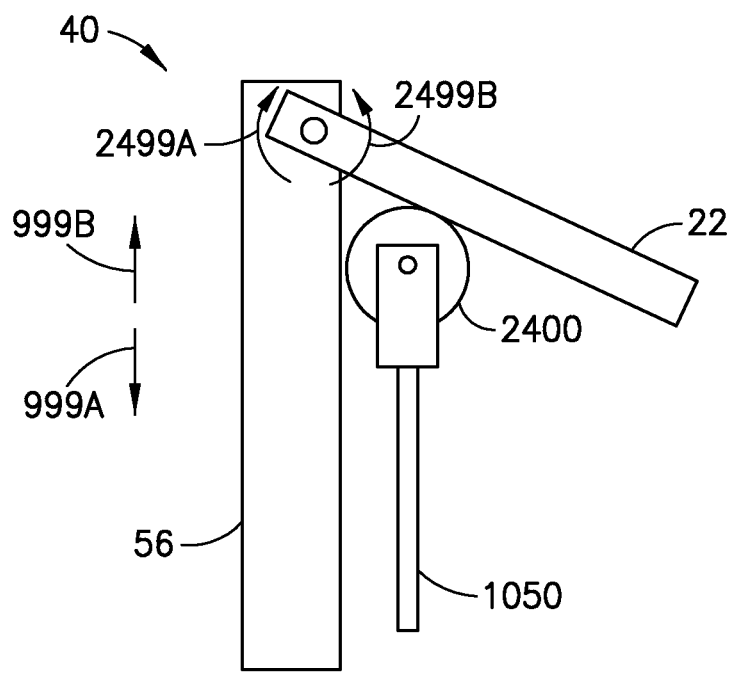
FIG. 24 is a schematic illustration of a portion of a push rod system of the foldable enclosure apparatus of FIG. 1A in accordance with aspects of the present disclosure.
Figure 25:
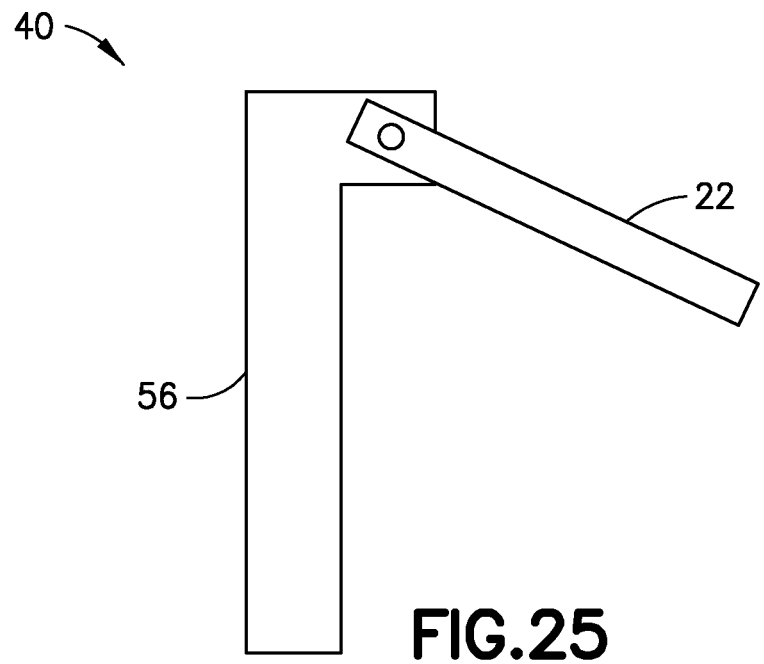
FIG. 25 is a schematic illustration of a portion of an upper corner assembly of the foldable enclosure apparatus of FIG. 1A in accordance with aspects of the present disclosure.

Referring to FIG. 24, the upper corner assembly 40 may be configured so as to fold and unfold upper arm 22 with a push rod/roller mechanism. For example, push rod 1050 (similar to that described herein) includes a roller 2400 rotatably coupled to an end of the push rod 1050. The roller 2400 is configured to engage and ride along the upper arm 22 so that as the push rod 1050 moves in direction 599B the roller pushes against the upper arm 22 so as to unfold the upper arm 22 in direction 2499B relative to the upright post 56. As the push rod 1050 moves in direction 599A, retraction of the roller 2400 in direction 999A allows the upper arm to rotate in direction 2499A so as to fold the upper arm 22 relative to the upright post 56.

Referring to FIG. 24 the upper corner assembly 40 may include a freely pivoting upper arm 22. The freely pivoting upper arm may be locked in an unfolded position, relative to the upright post 56, by the stiffening member 48 in any suitable manner or with a locking cross-pin as described herein with respect to FIGS. 31A-31C.

Figure 26:
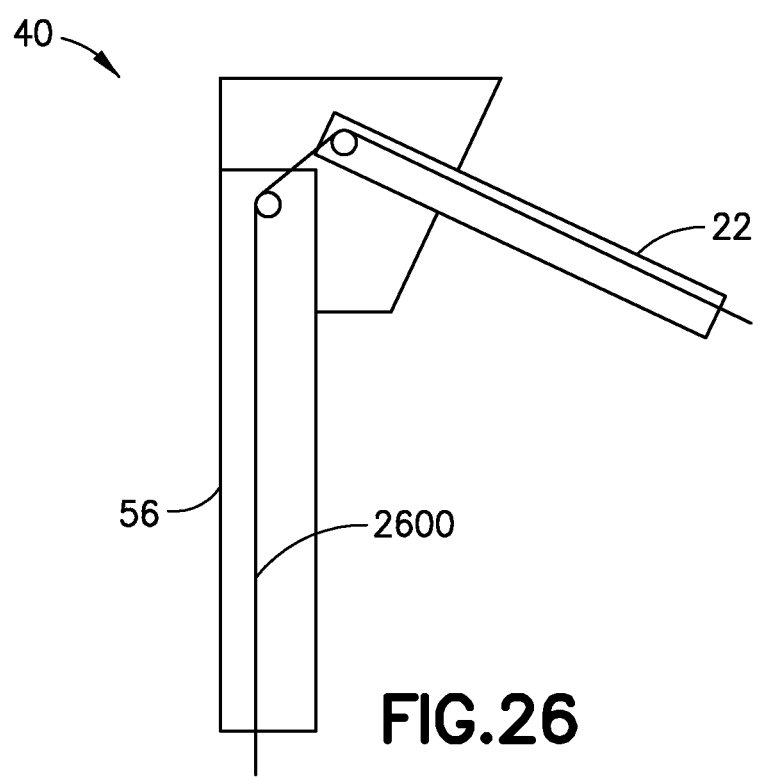
FIG. 26 is a schematic illustration of a portion of an upper corner assembly of the foldable enclosure apparatus of FIG. 1A in accordance with aspects of the present disclosure.

Referring to FIG. 26, the upper arm 22 may be folded and unfolded relative to the upright post 56 using a cable system 2600 such as that described in U.S. Pat. No. 7,836,530 issued on Nov. 23, 2010 (entitled "Foldable Child Enclosure"), the disclosure of which is incorporated herein by reference in its entirety.

Figure 27:
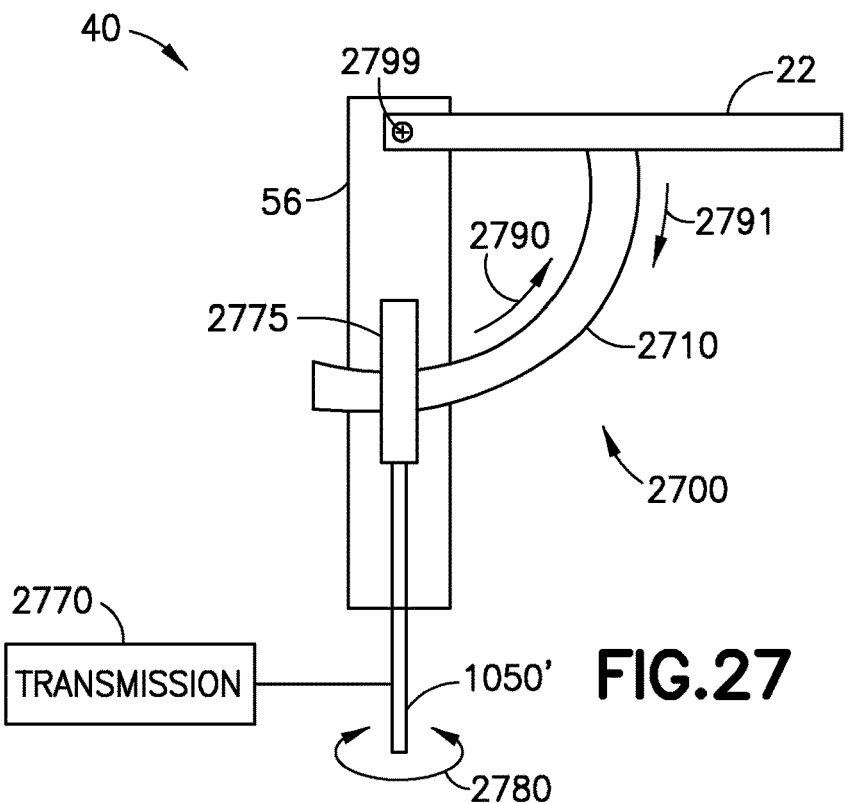
FIG. 27 is a schematic illustration of a portion of an upper corner assembly of the foldable enclosure apparatus of FIG. 1A in accordance with aspects of the present disclosure.

Referring to FIG. 27, the upper arm 22 may be folded and unfolded relative to the upright post 56 with a rack and pinion system 2700. For example, upper arm 22 is pivotally coupled to upright post 56 about axis 2799. A gear rack 270 is coupled to the upper arm 22 so as to pivot with the upper arm 22 as a unit about axis 2799. A torque rod 1050' is rotatably coupled to the upright post 56 and may be driven in rotation direction 2780 in any suitable manner. The torque rod 1050' includes a pinion gear 2775 configured to engage the gear rack 2710. For example, any suitable transmission 2770 is connected to the upright post 56 and may be configured to translate linear/pivoting movement of the a respective upper base leg 550, 552, 554, 556 and/or a respective lower base leg 560, 562, 564, 566 into a rotational movement for rotating the torque rod 1050' in direction 2780. As the upper base legs 550, 552, 554, 556 and/or a lower base legs 560, 562, 564, 566 are unfolded, the transmission 2770 drives rotation of the torque rod 1050' in direction 2780 so that the pinon gear 2775 drives the gear rack 2710 in direction 2490 for unfolding the upper arm 22 relative to the upright post 56. As the upper base legs 550, 552, 554, 556 and/or a lower base legs 560, 562, 564, 566 are folded, the transmission 2770 drives rotation of the torque rod 1050' in direction 2780 so that the pinon gear 2775 drives the gear rack 2710 in direction 2491 for folding the upper arm 22 relative to the upright post 56.

Figure 28:
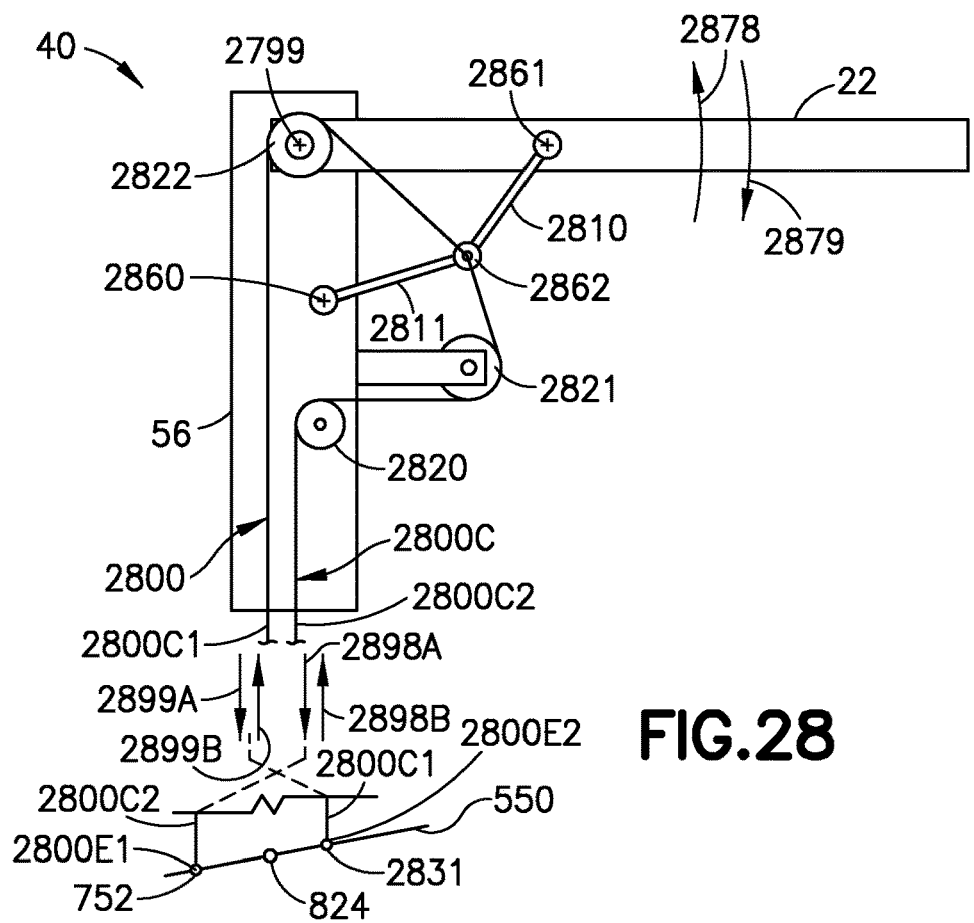
FIG. 28 is a schematic illustration of a portion of an upper corner assembly of the foldable enclosure apparatus of FIG. 1A in accordance with aspects of the present disclosure.

Referring to FIG. 28, the upper arm 22 may be folded and unfolded relative to the upright post 56 with a closed loop cable system 2800. For example, the upper arm 22 is pivotally coupled to the upright post 56 about axis 2799. An articulated linkage having a first link 2811 and a second link 2810 is coupled to both the upper arm 22 and to the upright post 56. For example, the first link 2811 is pivotally coupled to the upright post 56 at axis 2860 and the second link 2810 is pivotally coupled to the upper arm 22 at axis 2861. The first link 2811 and the second link 2810 are pivotally coupled to each other at axis 2862. A first pulley 2822 is mounted to the upright post 56, such as for rotation about axis 2799. The first pulley may rotate independent of or as a unit with the upper arm 22. A second pulley 2821 is mounted to the upright post so as to be disposed adjacent the axis 2862. A third pulley 2820 is mounted to the upright post 56 so as to direct the cable 2800C of the closed loop cable system 2800 from/to the second pulley 2821. The cable 2800C includes a first leg 2800C1 having a first end 2800E1 that is coupled to, for example, the upper base leg 550 on a first side of pivot axis 824 (see also FIG. 7) such as at point 2831. A second leg 2800C2 of the cable 2800C has a second end 2800E2 coupled to the upper base leg 550 on a second, opposite, side of the pivot axis 824, such as at point 752. As may be realized, the cable legs may cross one another so as to be coupled to the upper base leg 550 as described above. In other aspects, cable 2800C may be coupled to the lower base leg 560. The cable 2800C may also be coupled to the axis 2862 so that the axis 2862 moves with the cable 2800C. Here as the upper base leg 550 is unfolded cable leg 2800C1 moves in direction 2899A while cable leg 2800C2 moves in direction 2898B so as to unfold linkages 2811, 2810 relative to each other and unfold the upper arm 22 relative to the upright post 56. As the upper base leg 550 is folded cable leg 2800C1 moves in direction 2899B while cable leg 2800C2 moves in direction 2898A so as to fold linkages 2811, 2810 relative to each other and fold the upper arm 22 relative to the upright post 56.

Figure 29:
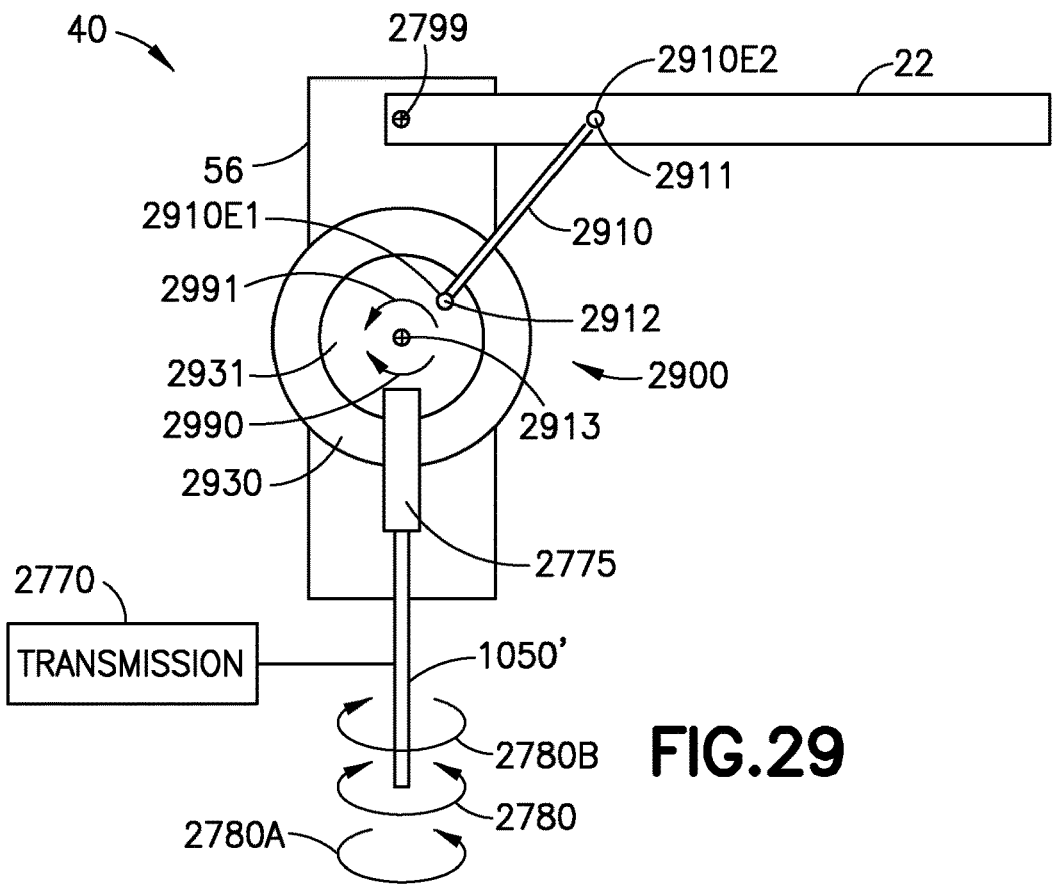
FIG. 29 is a schematic illustration of a portion of an upper corner assembly of the foldable enclosure apparatus of FIG. 1A in accordance with aspects of the present disclosure.
Figure 30:
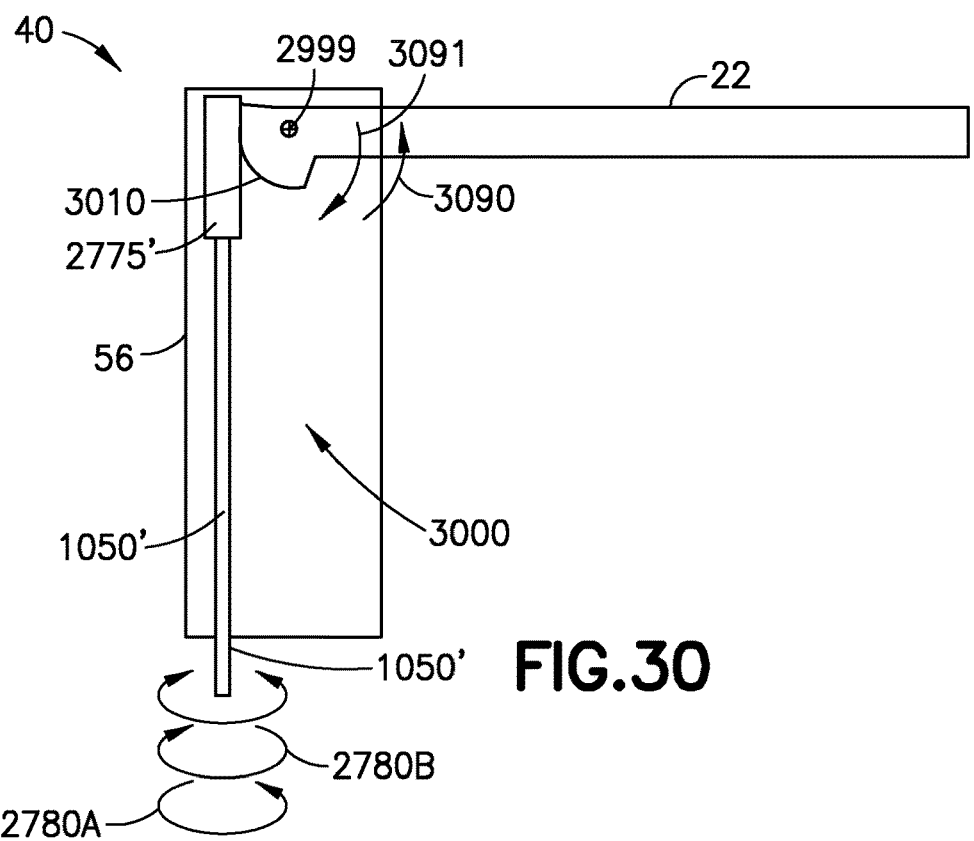
FIG. 30 is a schematic illustration of a portion of an upper corner assembly of the foldable enclosure apparatus of FIG. 1A in accordance with aspects of the present disclosure.

Referring to FIG. 29, in one aspect, the upper arm 22 may be folded and unfolded relative to the upright post 56 by a rack and pinion system 2900. Here the rack and pinion system may be substantially similar to that described above with respect to FIG. 27; however, the gear rack 2830 is rotatably coupled to the upright post 56 about axis 2913. A crank link 2910 is pivotally coupled at one end 2910E1 to the gear rack 2830 (such as to a hub 2831 or other suitable portion of the gear rack 2830) about pivot axis 2912. The crank link 2910 is pivotally coupled at the other opposite end 2910E2 to the upper arm 22 about pivot axis 2911. Here, as the pinion gear 2775 rotates in direction 2780B, the gear rack 2930 rotates in direction 2991. As the gear rack 2930 rotates in direction 2991, the end 2910E1 of the crank link 2910 also rotates in direction 2991 about axis 2913 so that the crank link 2910 pushes on the upper arm 22 to unfold the upper arm 22 relative to the upright post 56. As the pinion gear 2775 rotates in direction 2780A, the gear rack 2930 rotates in direction 2990. As the gear rack 2930 rotates in direction 2990, the end 2910E1 of the crank link 2910 also rotates in direction 2990 about axis 2913 so that the crank link 2910 pulls on the upper arm 22 to fold the upper arm 22 relative to the upright post 56.

Referring to FIG. 29, in one aspect, the upper arm 22 may be folded and unfolded relative to the upright post 56 by a worm gear system 3000. Here the worm gear system may be substantially similar to that described above with respect to FIG. 27; however, instead of pinion gear 2775, the torque rod 1050' includes worm gear 2775' and the gear rack 3010 is integral or otherwise coupled to an end of the upper arm 22. Here, as the worm gear 2775' rotates in direction 2780B, the gear rack 2930 rotates in direction 3090 so as to pivot the upper arm 22 about axis 2999 in direction 3090 to unfold the upper arm 22 relative to the upright post 56. As the worm gear 2775' rotates in direction 2780A, the gear rack 2930 rotates in direction 3091 so as to pivot the upper arm 22 about axis 2999 in direction 3091 to fold the upper arm 22 relative to the upright post 56.

Referring to FIGS. 31A-31C, a locking cross-pin 3100 is illustrated and may be used alone (e.g., with the upper arm being directly manually rotated rather than driven in rotation by a linkage or cable) or with any of the aspects of the present disclosure described herein. In this aspect, the upper arm 22 is pivotally coupled to the upright post 56 about axis 2799. The upright post 56 includes an aperture 3110 extending therethrough and located so as to be disposed under the upper arm 22 with the upper arm 22 in a fully unfolded/extended position (see FIG. 31A). The locking cross-pin 3100 includes a pin 3120 having a head 3120H and a shaft 3120S. The shaft 3120S includes a protrusion 3121 (or any other suitable locking member) configured to pass through a corresponding slot 3110S extending from the aperture 3110, where the locking cross-pin 3100 is rotates to cause misalignment between the protrusion 3121 and the slot 3110S so as to lock the locking cross-pin in a locked position (see FIG. 31B) underneath the upper arm 22 so that the upper arm rests on the locking cross-pin 3100 or is otherwise prevented from folding by the locking cross-pin 3100. In one aspect, a biasing member 3150 (either compression or tension biasing member) is disposed between the head 3120H and the upright post 56 so as to bias the locking cross-pin in the locked position (see FIG. 31B) or the unlocked position (see FIG. 31C), where in the unlock position the upper arm 22 is allowed to fold and move passed the locking cross-pin 3100. The locking cross-pin 3100 may be held captive by the upright post 56 in any suitable manner (clips, misalignment of the protrusion 3121, etc.) to substantially prevent complete removal of the locking cross-pin 3100 from the upright post when in the unlocked position.

Referring to FIG. 32, the upper arm 22 may be driven in rotation (e.g., to fold and unfold the upper arm 22) by converting pushing movement of the push rod 1050 to a pulling movement of, e.g., a cable 3220. For example, the upper arm 22 is pivotally coupled to the upright post 56 at axis 2799. A first pulley 3211 is pivotally coupled to the upright post 56 at a location that is, for example, below a top of the push rod 1050. A second pulley 3210 is pivotally coupled to the upright post 56 at, for example, axis 2799. A cable anchor 3240 (such as a cross pin) is disposed within the upper arm 22. The cable 3220 is anchored at one end to the cable anchor 3240 within the upper arm 22 and is wrapped around the first and second pulleys 3211, 3210 along a serpentine path so that an opposite end of the cable 3220 is anchored to the push rod 1050 at a point above the first pulley 3211 (i.e., so that the cable effectively reverses the direction of movement of the push rod). Here as the push rod is moved in direction 999B, the push rod 1050 pulls on the cable 3220 so that the cable 3220, in turn, pulls on the cable anchor 3240 to rotate the upper arm 22 in direction 2878 to unfold the upper arm 22 relative to the upright post 56. As the push rod is moved in direction 999A, the push rod 1050 pushes on (e.g., relaxes) the cable 3220 so that the upper arm is allowed to rotate in direction 2879 to unfold the upper arm 22 relative to the upright post 56.

Figure 33:
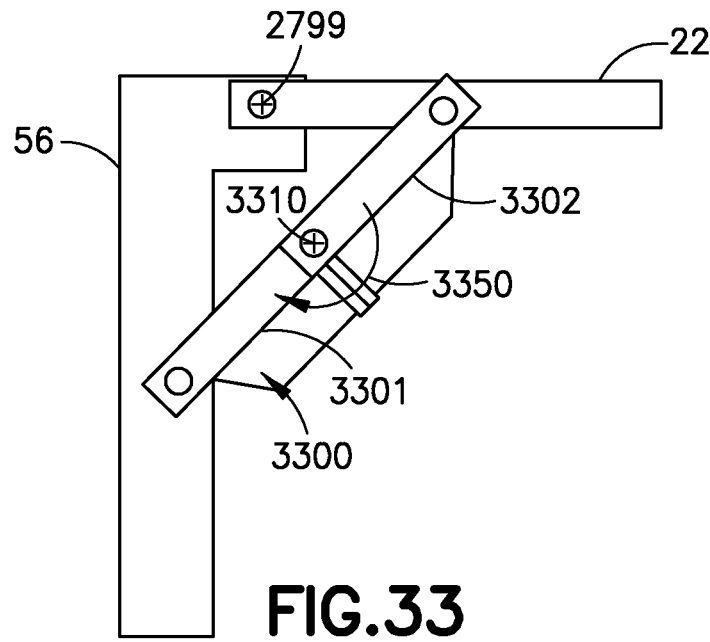
FIG. 33 is a schematic illustration of a portion of an upper corner assembly of the foldable enclosure apparatus of FIG. 1A in accordance with aspects of the present disclosure.

Referring to FIG. 33, the upper arm 22 may be pivotally coupled to the upright post 56 about pivot axis 2799, where a folding leaf hinge 3300 is coupled to both the upper arm and the upright post 56. The folding leaf hinge 3300 may support and lock the upper arm 22 in the unfolded or extended position.

Figure 34:
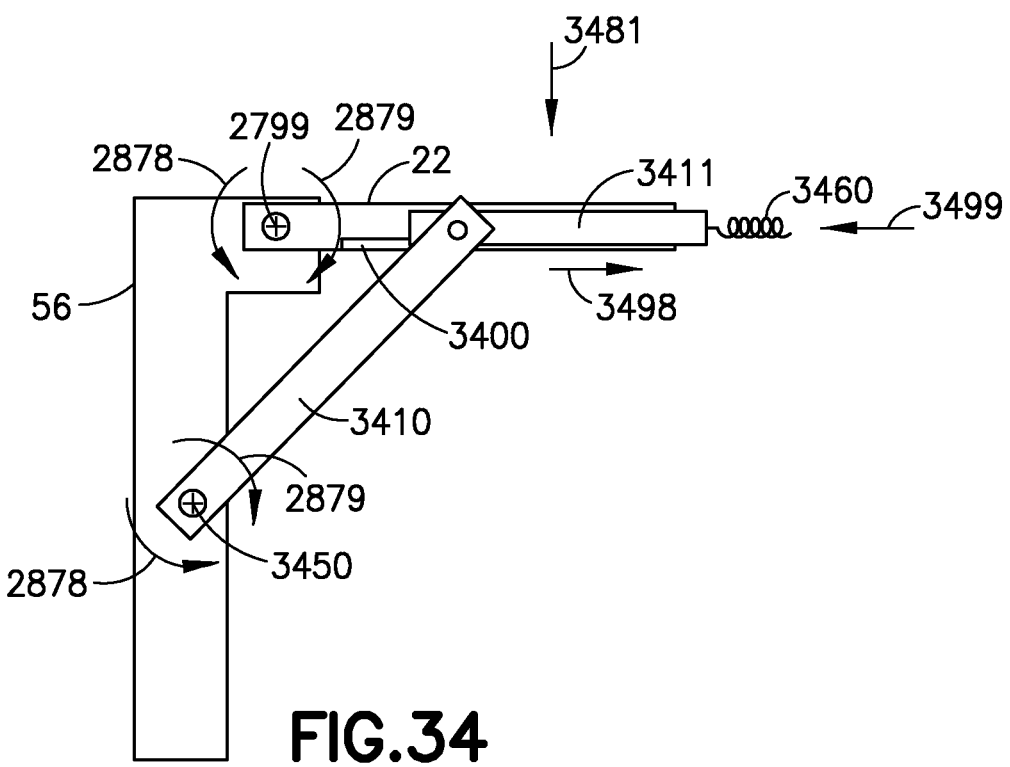
FIG. 34 is a schematic illustration of a portion of an upper corner assembly of the foldable enclosure apparatus of FIG. 1A in accordance with aspects of the present disclosure.

Referring to FIG. 34, the upper arm 22 may be pivotally coupled to the upright post 56 about pivot axis 2799. Here the upper arm includes a slot 3400 (i.e., is a slotted upper arm) along a length of the upper arm 22. A pivoting link 3410 is pivotally coupled to the upright post 56 about axis 3450 and pivotally coupled to a sliding link 3411 disposed within the upper arm 22. A biasing member 3460 may be disposed in the upper arm 22 for biasing the sliding link 3411 in direction 3499 so that the pivoting link 3410 is biased in rotation direction 2878 for holding the upper arm 22 in the unfolded/extended position (e.g., fully rotated in direction 2878 about axis 2799). The sliding link 2411 may be actuated in any suitable manner (such as by providing sufficient force in direction 3481) to move in direction 3498 so that the pivoting link 3410 rotates in direction 2879. Rotation of pivoting link 3410 in direction 2879 causes rotation of the upper arm 22 in direction 2879 folding the upper arm 22 relative to the upright post 56. As may be realized, the locking cross-pin 3120 may be employed to positively lock the upper arm 22 in the unfolded/extended position.

Figure 12:
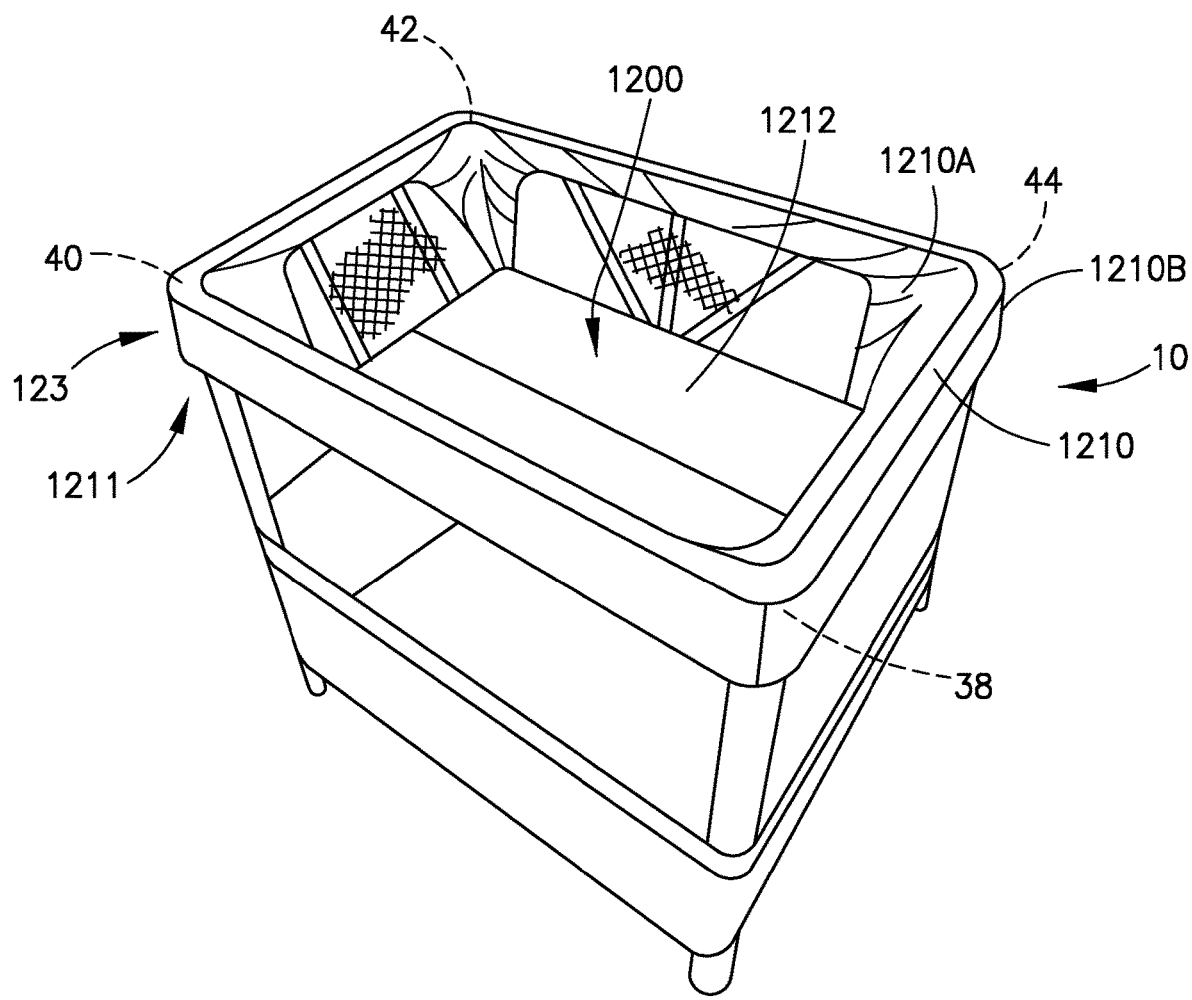
FIG. 12 is a schematic illustration of a bassinet of the foldable enclosure apparatus of FIG. 1A in accordance with aspect of the present disclosure.

Referring now to FIG. 12, the foldable enclosure apparatus 10 may include a bassinet 1200. The bassinet 1200 may be removably coupled to the upper assembly 123. The bassinet 1200 includes a flexible frame 1210 (made of any suitable flexible fabric such as those noted above) that has an interior portion 1210A and an exterior portion 1210B that form a pocket 1211 there between. The pocket 1211 is configured so that the interior portion 1210A is inserted into the foldable enclosure apparatus 10 so as to be disposed between and circumscribed by the upper arms 22, 24, 26, 28, 30, 32, 34, 36. The pocket 1211 is also configured so that the exterior portion 1210B is surrounds the upper arms 22, 24, 26, 28, 30, 32, 34, 36 so that the upper arms 22, 24, 26, 28, 30, 32, 34, 36 and corner assemblies 38, 40, 42, 44 are disposed within the pocket 1211 and the bassinet 1200 is supported by or hangs from the upper assembly 123. The bassinet 1200 includes a bassinet base mattress 1212 that is disposed within the foldable enclosure apparatus 10 so that the walls 16, 18, 20, 21 of the foldable enclosure apparatus 10 also form walls of the bassinet 1200 where the walls 16, 18, 20, 21 are covered by the interior portion 1210A of the flexible frame 1210.

Figure 15A:
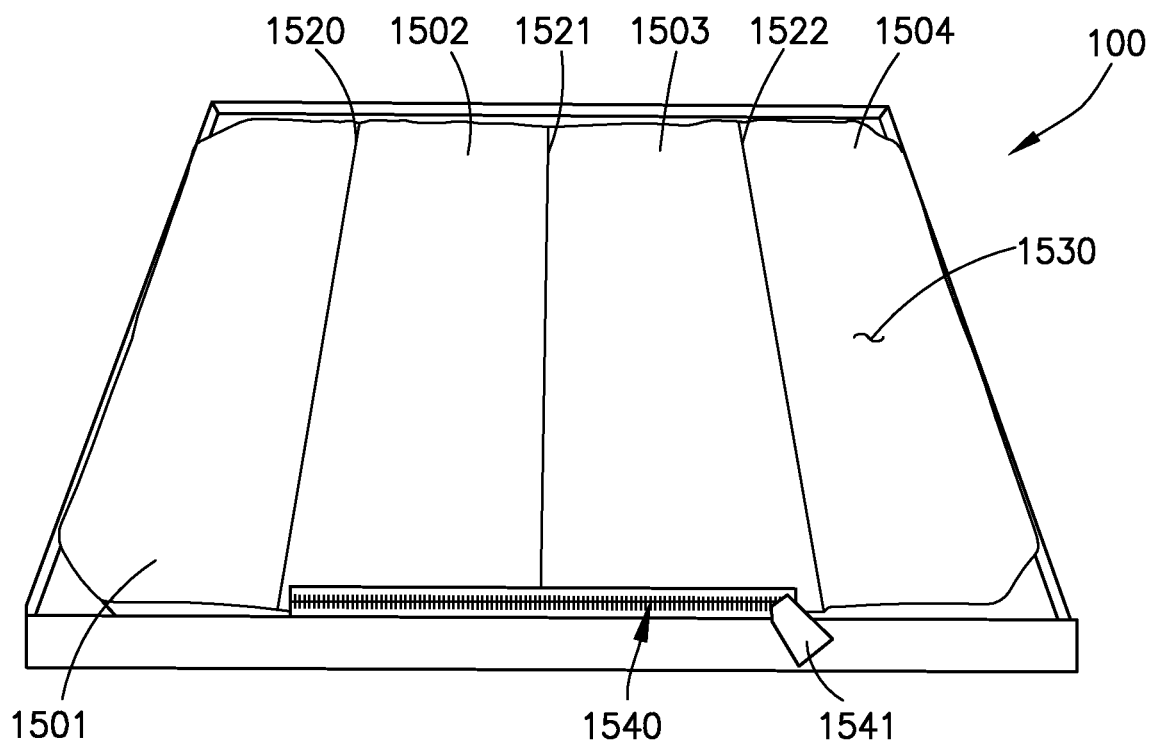
FIGS. 15A-15C are schematic illustrations of a mattress system of the foldable enclosure apparatus of FIG. 1A in accordance with aspects of the present disclosure.
Figure 15B:
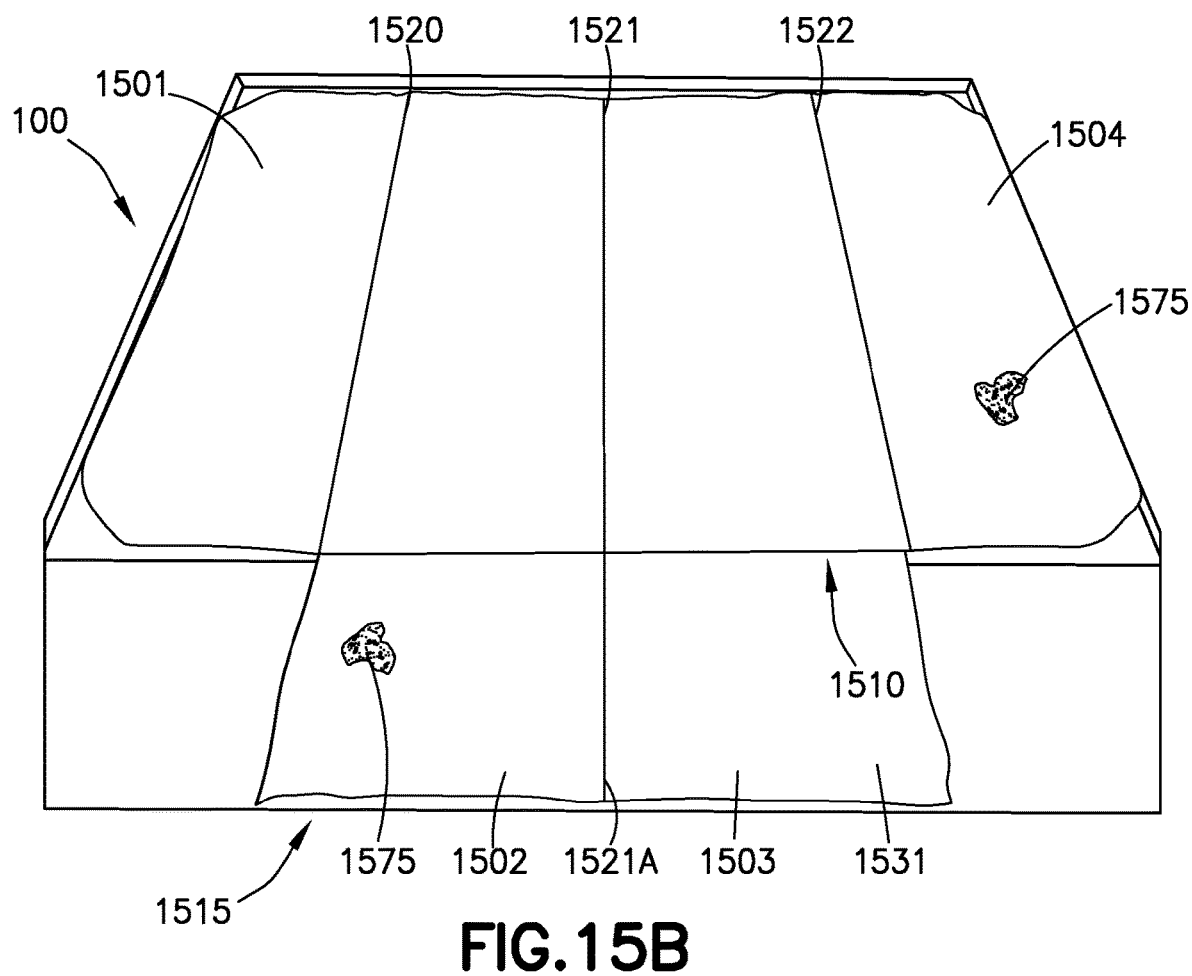
Figure 15C:
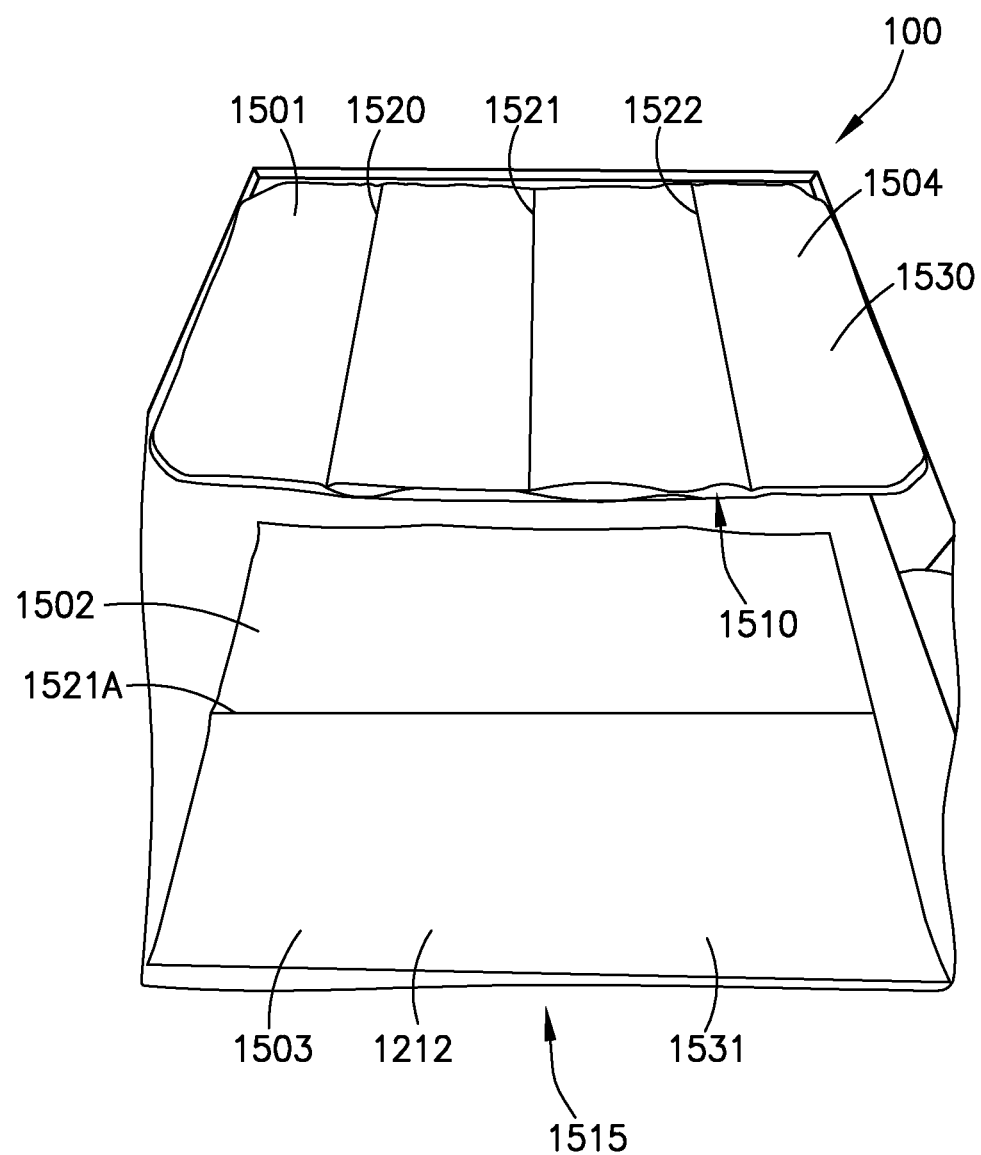

In one aspect, the bassinet base mattress 1212 may be substantially similar to and/or formed by at least a portion of the base pad or mattress 100. For example, referring also to FIGS. 15A-15C, the mattress 100 includes sections 1501-1504 that are pivotally coupled to each other so as to effect folding and unfolding of the mattress 100. Here the pivotal coupling between adjacent sections 1501-1504 is a fabric (e.g., woven cloth, vinyl, etc.) or other flexible material hinge 1520-1522 (such as waterproof fabric-like materials including plastic sheets) formed by the mattress cover 1530. The mattress cover 1530 forms the hinges 1520-1522 and encases the mattress padding 1575 of each of the sections 1501-1504. At least one mattress section 1501-1504 is configured as a mattress insert 1515 and is constructed in a manner similar to that of the remaining sections 1501-1504. For example, referring to FIG. 15B sections 1502, 1503 form the mattress insert 1515 where the sections are pivotally coupled to each other by a fabric or other flexible material hinge formed by sub-mattress cover 1531 where the sub-mattress cover 1531 is of the same or different material as the mattress cover 1530. The sub-mattress cover 1531 encases mattress padding 1575 of the sections 1502, 1503 and forms the hinge 1521A between the sections 1502, 1503.

The mattress cover 1530 of the mattress 100 includes a pocket 1510 shaped and sized to removably receive the mattress insert 1515 so that, with the mattress insert 1515 within the pocket 1510, the hinge 1521A of the sub-mattress cover 1531 is aligned with the hinge 1521 of the mattress cover 1530 (e.g., the hinge 1521A forms a recess in which the hinge 1521 is received). Here the mattress cover 1530 forms a unitary member with sections 1501, 1504 and pocket 1510. The sub-mattress cover 1531 forms a unitary member with the sections 1502, 1503. In one aspect, the pocket 1510 includes a closure 1540 configured to contain the mattress insert 1515 within the pocket 1510. The closure 1540 may be any suitable closure such as a zipper 1541, hook and loop fasteners, snaps, clips, etc.

While the pocket 1510 and the mattress insert 1515 are illustrated as being disposed between sections 1501, 1504, in other aspects, the mattress insert 1515 may be formed by sections 1501, 1502 or sections 1503, 1504. In still other aspects, the mattress insert 1515 may be formed by a single section 1501-1504 or any number of sections that is less than the total number of sections of the mattress 100 (e.g., in the example shown the mattress includes four sections so that the mattress insert 1515 may include one section, two sections, or three sections). The mattress insert 1515 is sized and shaped for insertion into the bassinet 1200 so as to form a child support surface of the bassinet 1200.

Figure 13A:
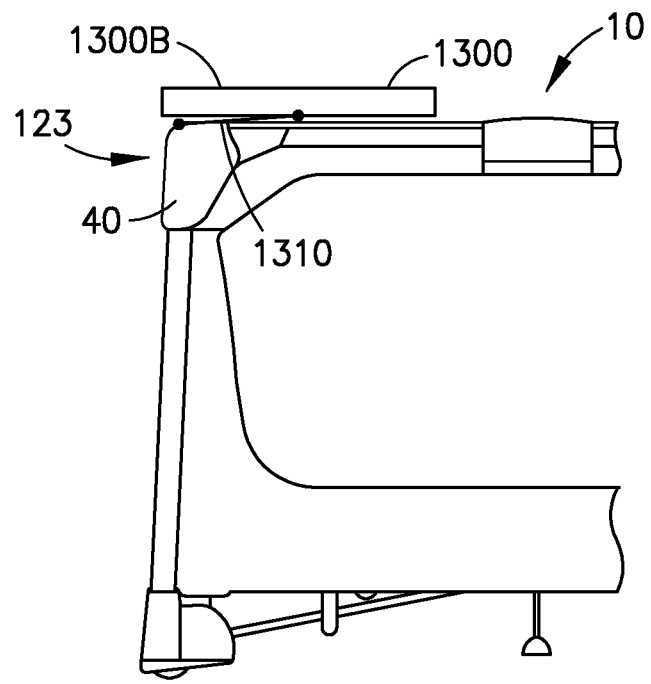
FIGS. 13A and 13B are schematic illustrations of a changing station of the foldable enclosure apparatus respectively in deployed and stowed configurations in accordance with aspects of the present disclosure.
Figure 13B:
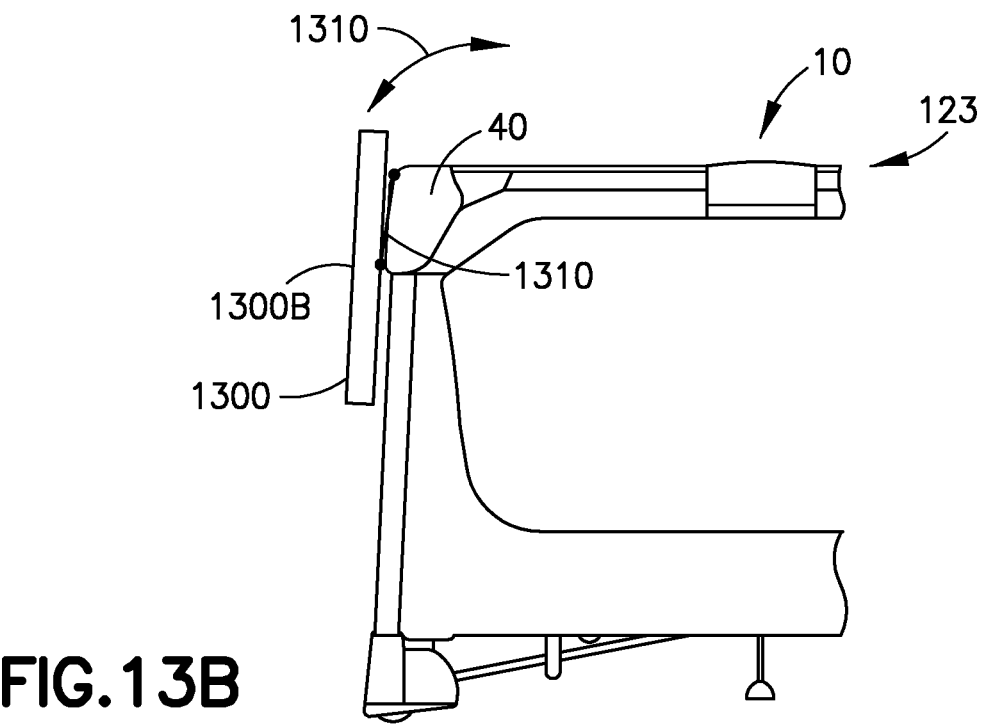

Referring to FIGS. 13A and 13B, the foldable enclosure apparatus 10 may include a changing station 1300 on which, for example, a child's diaper may be changed. The changing station 1300 may have a substantially rigid base 1300B (which may have side walls to prevent egress off of the changing structure). The base 1300B may be pivotally coupled to the upper assembly 123 of the foldable enclosure apparatus 10 in any suitable manner (such as through any suitable articulated linkage 1310) so as to be pivoted in direction 1310 between a deployed configuration as shown in FIG. 13A and a stowed configuration as shown in FIG. 13B.

Referring also to FIGS. 35A-35G, another exemplary changing station 35000 of the foldable enclosure apparatus 10 is illustrated in accordance with aspects of the present disclosure. In this aspect the changing station 35000 includes a substantially rigid base 35000B and a peripheral wall 35010 extending from the substantially rigid base 35000B so as to form a substantially rigid tub in which an occupant may be placed. The peripheral wall includes a first wall section 35010A, a second wall section 35010B, a third wall section 35010C, and a fourth wall section 35010D. While the changing station 35000 and its peripheral wall 35010 are illustrated as described as having a rectangular shape with outwardly slanting walls sections 35010A-35010D; in other aspects, the changing station and its peripheral wall may have any suitable shape and configuration. One or more articulated hinges 35030A, 35030B are coupled to, for example, both the first wall section 35010A and the upper assembly 123 for pivotally coupling the changing station 35000 to the foldable enclosure apparatus 10. In a manner similar to that described above with respect to FIG. 13A an d13B, the articulated hinge(s) 35030A, 35030B provide for a pivoting movement of the changing station 35000 in direction 1310 from a folded/stowed configuration/position shown in FIG. 35A to an unfolded/deployed configuration/position shown in FIG. 35B. The substantially rigid base 35000B may include locating members 35020 coupled to a bottom of the substantially rigid base 35000B (i.e., a side of the substantially rigid base 35000B that is opposite an occupant seating surface 3500BS of the substantially rigid base 35000B). The locating members 35020 are configured to engage, for example, upper arms 26, 36 with the changing station 35000 in the deployed configuration so as to substantially prevent movement of the changing station in direction 35050.

The changing station 35000 is provided to a user as a substantially flat sheet 35200 (see FIG. 35C) where each of the first wall section 35010A, the second wall section 35010B, the third wall section 35010C, and the fourth wall section 35010D are hinged to the substantially rigid base 35000B by a respective hinge 35201-35204. The hinges 35201-35204 may be fabric hinges, piano hinges, or any other suitable hinge that provides for folding the first wall section 35010A, the second wall section 35010B, the third wall section 35010C, and the fourth wall section 35010D in respective directions 35210-35213 to transform the substantially flat sheet 35200 into the tub illustrated in FIGS. 35A and 35B. The first wall section 35010A, the second wall section 35010B, the third wall section 35010C, and the fourth wall section 35010D may each be substantially rigid members that, when folded and fastened together (as will be described below), form the (substantially rigid) peripheral wall 35010. In other aspects, the wall sections 35010A-35010D may be pliable so as to form a (compliant) peripheral wall 35010 (substantially similar to the walls of the foldable enclosure apparatus 10) configured to retain an occupant within the changing station 35000.

In one aspect, at least two of the first wall section 35010A, the second wall section 35010B, the third wall section 35010C, and the fourth wall section 35010D include fastening flaps 35060 (FIGS. 35A and 35B) for joining/fastening the first wall section 35010A, the second wall section 35010B, the third wall section 35010C, and the fourth wall section 35010D together to form the peripheral wall 35010. For example, the first wall section 35010A includes a fastening flap 35060 at each end, where the each fastening flap 35060 is hinged to the first wall member 35010A by a respective hinge similar to hinges 35201-35204. The third wall section 35010A is similar configured with fastening flaps 35060. The fastening flaps 35060 of the first and third wall section 35010A, 35010C may be folded around and fasten to a respective one of the second wall section 35010B and fourth wall section 35010D in any suitable manner so as to form the tub. In this aspect, the fastening flaps 35060 may be fastened to the second wall section 35010B and fourth wall section 35010D by hook-and-loop fasteners, snaps, clips, or any other suitable fastener.

In another aspect, each of the first wall section 35010A, the second wall section 35010B, the third wall section 35010C, and the fourth wall section 35010D include fastener apertures 35070 adjacent respective ends. Here tub corner assemblies 35100 (FIGS. 35D-35G) are employed to couple the ends of adjacent ones of the first wall section 35010A, the second wall section 35010B, the third wall section 35010C, and the fourth wall section 35010D to each other. For example, each tub corner assembly 35100 includes an outer portion 35102 and an inner portion 35101. The outer portion 35102 includes fastening members 35103. The inner portion 35101 includes mating fastening members 35104 configured to mate with fastening members 35103 for coupling the outer portion 35102 to the inner portion 35101. Referring to FIGS. 35E-35G and the first and second wall sections 35010A, 35010B for exemplary purposes only (the other wall sections may be coupled to each other in a similar manner), with the first wall section 35010A and the second wall section 35010B folded in respective directions 35210, 35211 the fastening members 35103, 35104 of one or more of the outer portion 35102 and inner portion 35101 of the tub corner assembly 35100 extend through the fastener apertures 35070 of the adjacent wall sections (i.e., in this examples adjacent wall sections 35010A, 35010B). The fastening members 35103 engage mating fastener members 35104 to couple the outer portion 35102 to the inner portion 35101 and thereby couple the adjacent ends of the first wall section 35010A and the second wall section 35010B so as to form a corner of the tub as shown in FIGS. 35F and 35G. The outer portion 35102 and inner portion 35101 may be shaped and configured to form a rounded snag-free/smooth corner that substantially prevent materials from being caught by/grabbed by/stuck on the tub corner assembly 35100.

Referring also to FIGS. 37A-37E, another exemplary changing station 37500 of the foldable enclosure apparatus 10 is illustrated in accordance with aspects of the present disclosure. In this aspect, the changing station 37500 includes a frame 37100, a hinge that couples the frame 37100 to the upper assembly 123, and at least one retention member 37010, 37020 that releasably couples the frame 37100 to the upper assembly 123. The frame 37100 is configured to couple with any suitable occupant support/retention device such as the rigid base 1300B and/or a substantially rigid tub described above. In this aspect, the hinge 37000 includes an upper assembly coupling portion (lower hinge portion) 37000A and a frame retainer portion 37000B (upper hinge portion). The lower hinge portion 37000A that, in one aspect, at least partially houses at least one of the stiffening members 46, 48, 50, 52 and includes clamps 37300 that snap onto (or otherwise engage so as to couple with) one or more of the upper arms 22, 24, 26, 28, 30, 32, 34, 36. In other aspects, the lower hinge portion 37000A may not house the at least one stiffening members 43, 48, 50, 52. The upper and lower hinge portions 37000A, 37000B form an aperture 37666 in which the frame 37100 is disposed. For example, the frame 37100 is disposed between and retained by the upper and lower hinge portions 37000A, 37000B (see FIG. 37C) so as to be rotatably coupled to the hinge 37000. Here the frame 37000 pivots in direction 37777 relative to frame in a manner substantially similar to that described above with respect to FIGS. 13A, 13B, and 35A-35G.

In one aspect, the frame 37100 is a multi-part frame that includes first frame portion 37100A and second frame portion 3700B. Each frame portion 37100A, 37100B includes ends with detents 37199 extending therefrom. Each of the at least one retention member 37010, 37020 (FIG. 37D) includes an aperture 37333 into which the ends of the first frame portion 37100A and the second frame portion 37100B are inserted. The aperture 37333 includes retention features 37198 (which in one aspect are holes, recesses, etc.), each retention feature 37198 engages a respective detent 37199 so as to retain the first frame portion 37100A and second frame portion 3700B within the aperture 37333. It is noted that the configuration of the frame 37100 is exemplary in nature and in other aspects the frame 37100 may be a one piece (unitary member) and the at least one retention member 37010, 37020 may be coupled to the frame in any suitable manner (such as in a manner similar that of the hinge 37000 coupling with the frame 37100). Each of the at least one retention member 37010, 37020 includes a releasable clamp 37310 (such as a snap, clip, etc.) configured to releasably engage one or more of the upper arms 22, 24, 26, 28, 30, 32, 34, 36.

Figure 35A:
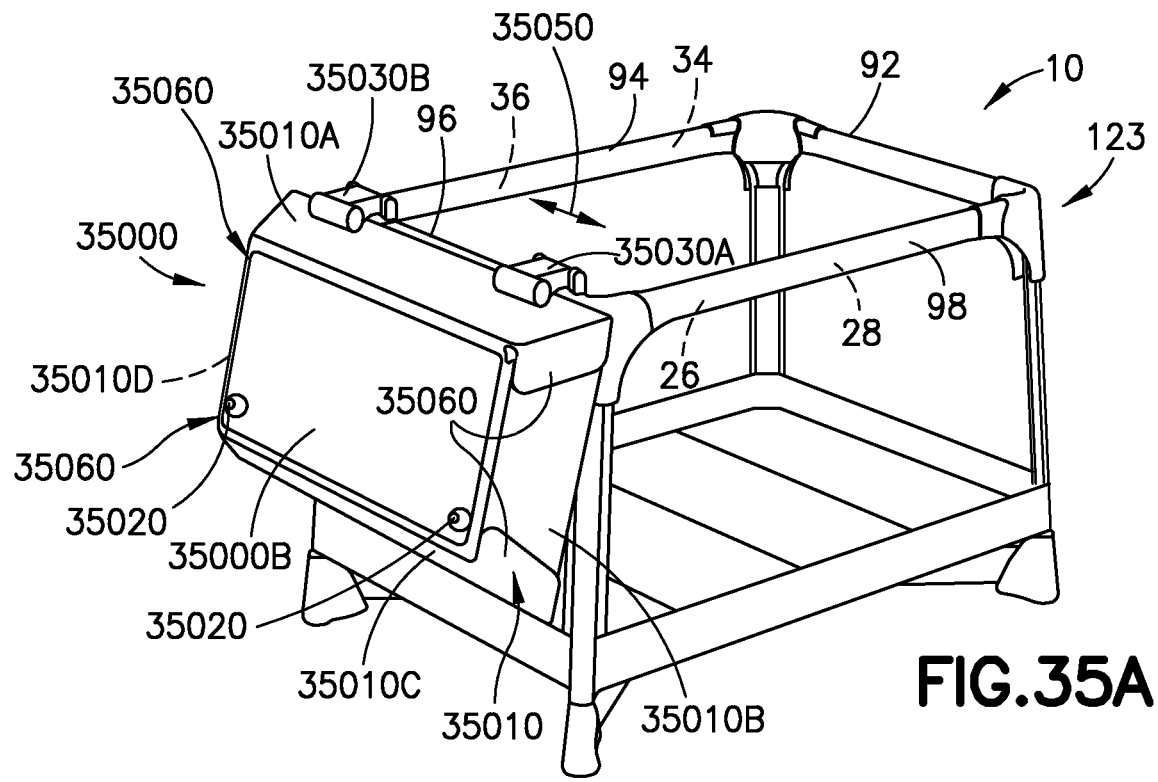
Figure 35B:
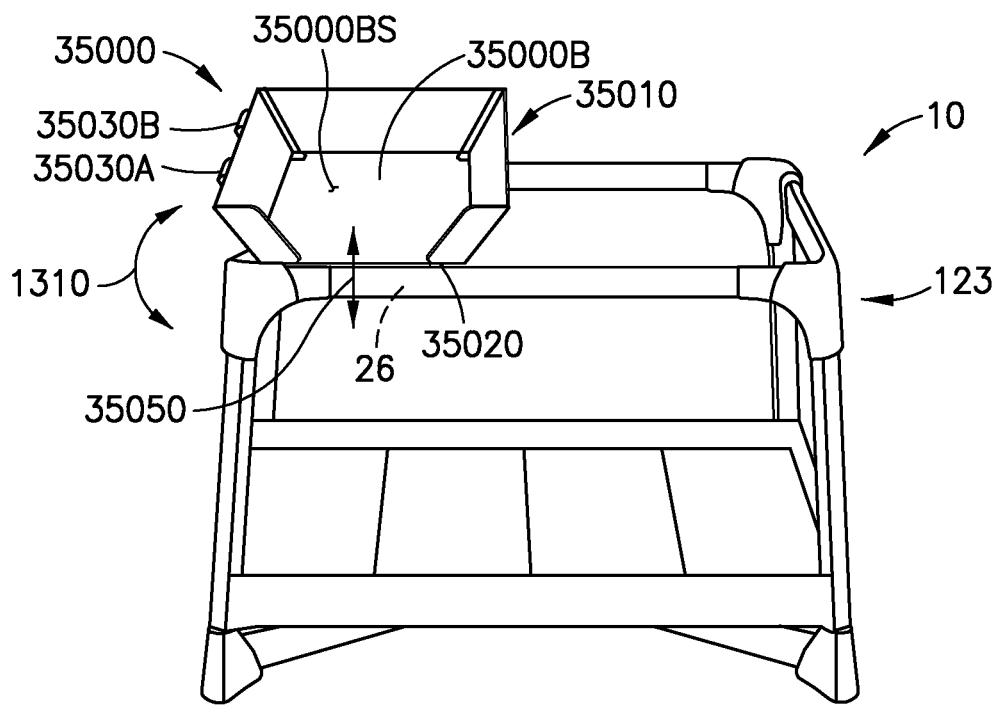
Figure 35E:
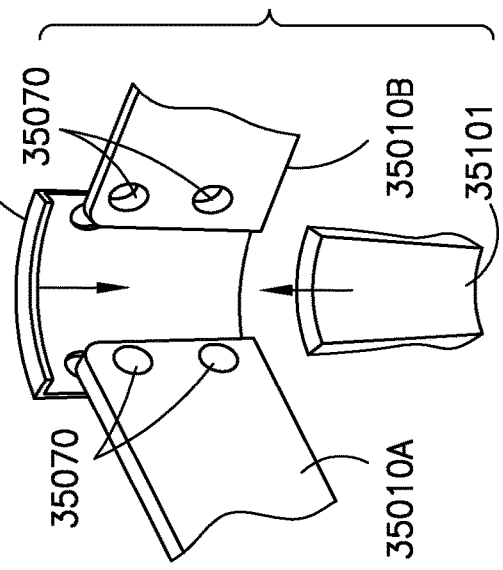
Figure 35C:
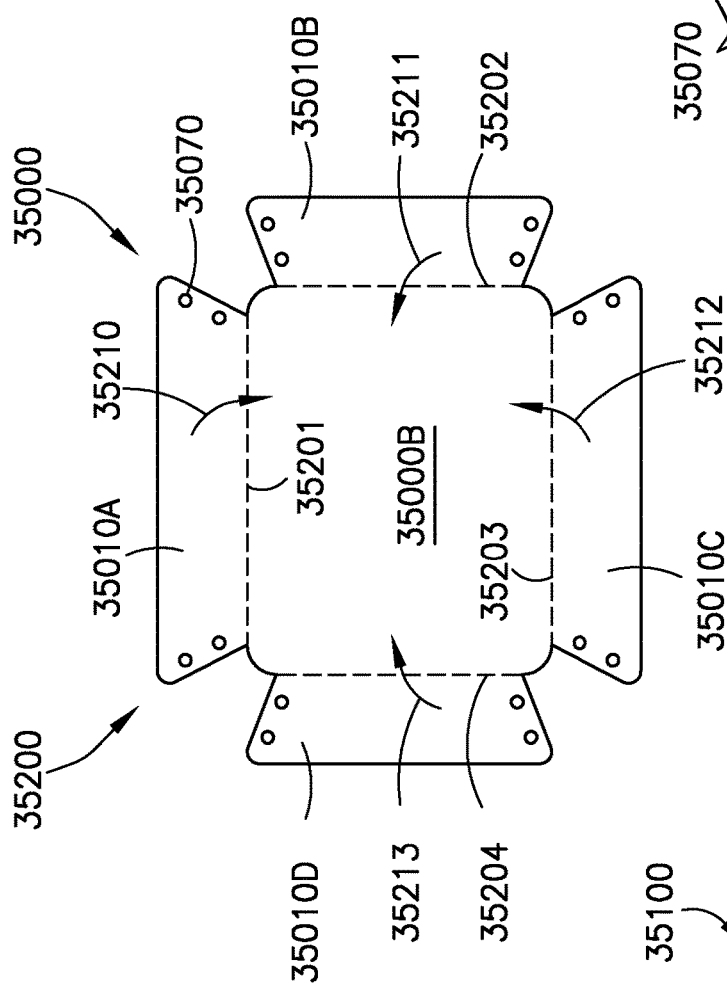
Figure 35D:
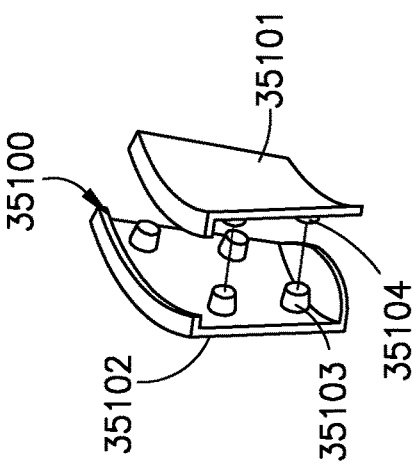

In operation, when not in use the frame 37100 (and any occupant support coupled thereto) of the changing station 37500 may be stowed alongside a side of the foldable enclosure apparatus 10 in a manner similar to that shown in FIGS. 13B and 35A. A user of the foldable enclosure apparatus 10 pivots the frame 371000 about aperture 37666 in direction 37777 so that the releasable clamp 37310 of the at least one retention member 37010, 37020 engages the one or more of the upper arms 22, 24, 26, 28, 30, 32, 34, 36. An occupant may be placed within the occupant support coupled to the frame 37100. When a changing the diaper of the occupant or other changing table task is completed the occupant is removed from the changing table, the releasable clamp 37310 of the at least one retention member 37010, 37020 may be disengaged from the one or more of the upper arms 22, 24, 26, 28, 30, 32, 34, 36 in any suitable manner, and the frame 37100 (and any occupant support coupled thereto) of the changing station 37500 may be again stowed alongside a side of the foldable enclosure apparatus 10 in a manner similar to that shown in FIGS. 13B and 35A.

In accordance with one or more aspects of the present disclosure a child enclosure comprises:

a hub member including a crank link;

a substantially four bar articulated link operably connected to the crank link;

a push rod connected to the substantially four bar articulated link so that linear movement of the crank link effects, through the substantially four bar articulated link, a linear driving motion of the push rod; and a slide wedge coupled to the push rod, the slide wedge includes a slider and a pivot surface biasing the slider transverse to the linear driving motion of the push rod, where the linear driving motion of the push rod extends and retracts the slider.

In accordance with one or more aspects of the present disclosure the child enclosure further comprises:

a side structure having a plurality of side posts; and an upper assembly having upper arms, each upper arm being pivotally coupled to a respective side post;

wherein each side post has a respective push rod coupled thereto for reciprocating in the linear driving motion along the side post, each side post has a respective slide wedge, the respective slide wedge comprises a respective slider movably coupled to the side post and the push rod so as to reciprocate with the push rod along the side post, and a respective wedge link coupling the respective slider with a respective upper arm.

In accordance with one or more aspects of the present disclosure adjacent upper arms are pivotally coupled to each other between adjacent side posts and are at least in part substantially locked in an extended position by extension of the respective wedge link by the push rod.

In accordance with one or more aspects of the present disclosure the hub member comprises a rack and pinion, the rack forming the crank link and is linearly movable within a hub member housing and the pinion is coupled to a respective substantially four bar articulated link of a plurality of substantially four bar articulated links.

In accordance with one or more aspects of the present disclosure the hub member comprises a connecting link that forms the crank link and connects a plurality of substantially four bar articulated links.

In accordance with one or more aspects of the present disclosure the crank link is movable within a hub member housing, the crank link being coupled to a plurality of substantially four bar articulated links.

In accordance with one or more aspects of the present disclosure the child enclosure further comprises:

a side structure having a plurality of side posts, the side structure being connected to the substantially four bar articulated link; and a fabric side wall coupled to adjacent side posts, a respective side of the fabric side wall being coupled to a respective side post by a locking snub anchor, the locking snub anchor extending from a slot in the respective side post where the respective side of the fabric side wall is coupled to the locking snub anchor outside of the slot.

In accordance with one or more aspects of the present disclosure the locking snub anchor comprises:

a first locking member having a first portion disposed within the slot and a second portion extending, from the first portion, outside of the slot; and a second locking member disposed at least partially within the slot, the second locking member interface with each other and the slot to prevent removal of one or both of the first locking member and the second locking member from the slot;

wherein the respective side of the fabric side wall is coupled, outside of the slot, to the second portion of the first locking member.

In accordance with one or more aspects of the present disclosure a child enclosure comprises:

a frame including a side structure having a plurality of side posts; and a fabric side wall coupled to adjacent side posts, a respective side of the fabric side wall being coupled to a respective side post by a locking snub anchor, the locking snub anchor extending from a slot in the respective side post where the respective side of the fabric side wall is coupled to the locking snub anchor outside of the slot.

In accordance with one or more aspects of the present disclosure the locking snub anchor comprises:

a first locking member having a first portion disposed within the slot and a second portion extending, from the first portion, outside of the slot; and a second locking member disposed at least partially within the slot, the second locking member interface with each other and the slot to prevent removal of one or both of the first locking member and the second locking member from the slot;

wherein the respective side of the fabric side wall is coupled, outside of the slot, to the second portion of the first locking member.

In accordance with one or more aspects of the present disclosure the child enclosure further comprises:

an upper assembly having upper arms, each upper arm being pivotally coupled to a respective side post;

a base structure coupled to the plurality of side posts, the base structure including a plurality of substantially four bar articulated links;

a hub member including a crank link operably connected to the plurality of substantially four bar articulated links;

a push rod connected to a respective side post and a respective substantially four bar articulated link so that linear movement of the crank link effects, through the respective substantially four bar articulated link, a linear driving motion of the push rod; and a slide wedge coupled to the respective side post and the push rod, the slide wedge includes a slider and a pivot surface biasing the slider transverse to the linear driving motion of the push rod, where the linear driving motion of the push rod extends and retracts the slider so as to extend and retract a respective upper arm.

In accordance with one or more aspects of the present disclosure the slide wedge comprises:

a respective slider movably coupled to the respective side post and the push rod so as to reciprocate with the push rod along the respective side post; and a respective wedge link coupling the slider with the respective upper arm.

In accordance with one or more aspects of the present disclosure adjacent upper arms are pivotally coupled to each other between adjacent side posts and are at least in part substantially locked in an extended position by extension of the respective wedge link by the push rod.

In accordance with one or more aspects of the present disclosure the hub member comprises a rack forming the crank link and a plurality of pinions, the rack is linearly movable within a hub member housing and each pinion of the plurality of pinions is coupled to a respective substantially four bar articulated links of the plurality of substantially four bar articulated links.

In accordance with one or more aspects of the present disclosure the hub member comprises a connecting link that forms the crank link and connects the plurality of substantially four bar articulated links.

In accordance with one or more aspects of the present disclosure the crank link is movable within a hub member housing, the crank link being coupled to the plurality of substantially four bar articulated links.

In accordance with one or more aspects of the present disclosure a child enclosure comprises:

a side structure having a plurality of side posts, each side post having walls forming an internal space with an elongated guide surface, and a slot formed along at least one of the walls and extending along the elongated internal guide space, a slide member disposed within the internal space so as to reciprocate within the internal space and guided by the elongated guide surface, a push rod disposed within the internal space and coupled to the slide member for effecting a linear driving motion to reciprocate the slide member within the internal space, and a drive link pivotally coupled to the slide member and extending through the slot; and an upper assembly having upper arms, each upper arm being pivotally coupled to a respective side post and pivotally coupled to a respective drive link wherein, reciprocation of the slide member within the frame effects, through the respective drive link, folding and unfolding of the upper arm relative to the respective side post.

In accordance with one or more aspects of the present disclosure the push rod comprises:

an elongated body;

a support surface fixed on the elongated body;

a stop surface fixed on the elongated body and spaced from the support surface; and a resilient member captured on the elongated body by and between the support surface and the stop surface;

wherein the resilient member engages the slide member and is configured to provide compliant relative movement between the push rod and the slide member.

In accordance with one or more aspects of the present disclosure the child enclosure further comprises:

a hub member including a crank link; and a substantially four bar articulated link operably connected to the crank link;

wherein the push rod is connected to the substantially four bar articulated link so that liner movement of the crank link effects, through the substantially four bar articulated link, the linear driving motion of the push rod.

In accordance with one or more aspects of the present disclosure the hub member comprises a rack and pinion, the rack forming the crank link and is linearly movable within a hub member housing and the pinion is coupled to a respective substantially four bar articulated link of a plurality of substantially four bar articulated links.

In accordance with one or more aspects of the present disclosure the hub member comprises a connecting link that forms the crank link and connects a plurality of substantially four bar articulated links.

In accordance with one or more aspects of the present disclosure the crank link is movable within a hub member housing, the crank link being coupled to a plurality of substantially four bar articulated links.

In accordance with one or more aspects of the present disclosure the child enclosure further comprises a fabric side wall coupled to adjacent side posts, a respective side of the fabric side wall being coupled to a respective side post by a locking snub anchor, the locking snub anchor extending from a slot in the respective side post where the respective side of the fabric side wall is coupled to the locking snub anchor outside of the slot.

In accordance with one or more aspects of the present disclosure the locking snub anchor comprises:

a first locking member having a first portion disposed within the slot and a second portion extending, from the first portion, outside of the slot; and a second locking member disposed at least partially within the slot, the second locking member interface with each other and the slot to prevent removal of one or both of the first locking member and the second locking member from the slot;

wherein the respective side of the fabric side wall is coupled, outside of the slot, to the second portion of the first locking member.

In accordance with one or more aspects of the present disclosure the child enclosure further comprises a mattress having mattress sections pivotally coupled to each other so as to effect folding and unfolding of the mattress, wherein the mattress is supported at least in part by the substantially four bar articulated link and circumscribed by the fabric side wall.

In accordance with one or more aspects of the present disclosure at least one mattress section is configured as a mattress insert and the mattress includes a pocket shaped and sized to removably receive the mattress insert.

In accordance with one or more aspects of the present disclosure the pocket includes a closure configured to contain the mattress insert within the pocket.

In accordance with one or more aspects of the present disclosure the child enclosure of further comprises a bassinet configured for removably coupling to the side structure, wherein the mattress insert is sized and shaped for insertion into the bassinet so as to form a child support surface of the bassinet.

In accordance with one or more aspects of the present disclosure adjacent upper arms are pivotally coupled to each other between adjacent side posts and are at least in part substantially locked in an extended position by extension of the drive link by the push rod.

In accordance with one or more aspects of the present disclosure the walls comprise a cam slot, one or more of the slide member and the drive link being configured to engage the cam slot to, at least in part, lock the drive link in an extended position.

In accordance with one or more aspects of the present disclosure a child enclosure comprises:

a frame including a bottom structure and a side structure, the side structure having fabric side walls;

a bassinet configured so as to be removably coupled to the side structure; and a mattress having mattress sections pivotally coupled to each other so as to effect folding and unfolding of the mattress, wherein the mattress is supported by the bottom structure of the frame and circumscribed by the fabric side wall;

wherein at least one mattress section is configured as a mattress insert and the mattress includes a pocket shaped and sized to removably receive the mattress insert, the mattress insert being sized and shaped for insertion into the bassinet so as to form a child support surface of the bassinet.

In accordance with one or more aspects of the present disclosure the pocket includes a closure configured to contain the mattress insert within the pocket.

In accordance with one or more aspects of the present disclosure the child enclosure further comprises an upper arm assembly wherein:

the side structure comprises a plurality of side posts, each side post having walls forming an internal space with an elongated guide surface, and a slot formed along at least one of the walls and extending along the elongated internal guide space, a slide member disposed within the internal space so as to reciprocate within the internal space and guided by the elongated guide surface, a push rod disposed within the internal space and coupled to the slide member for effecting a linear driving motion to reciprocate the slide member within the internal space, and a drive link pivotally coupled to the slide member and extending through the slot; and the upper assembly has upper arms, each upper arm being pivotally coupled to a respective side post and pivotally coupled to a respective drive link wherein, reciprocation of the slide member within the frame effects, through the respective drive link, folding and unfolding of the upper arm relative to the respective side post.

In accordance with one or more aspects of the present disclosure the push rod comprises:
an elongated body;
a support surface fixed on the elongated body;
a stop surface fixed on the elongated body and spaced from the support surface; and
a resilient member captured on the elongated body by and between the support surface and the stop surface;
wherein the resilient member engages the slide member and is configured to provide compliant relative movement between the push rod and the slide member.

In accordance with one or more aspects of the present disclosure the child enclosure of further comprises:
a hub member including a crank link; and
a substantially four bar articulated link operably connected to the crank link;
wherein the push rod is connected to the substantially four bar articulated link so that liner movement of the crank link effects, through the substantially four bar articulated link, the linear driving motion of the push rod.

In accordance with one or more aspects of the present disclosure the hub member comprises a rack and pinion, the rack forming the crank link and is linearly movable within a hub member housing and the pinion is coupled to a respective substantially four bar articulated link of a plurality of substantially four bar articulated links.

In accordance with one or more aspects of the present disclosure the hub member comprises a connecting link that forms the crank link and connects a plurality of substantially four bar articulated links.

In accordance with one or more aspects of the present disclosure the crank link is movable within a hub member housing, the crank link being coupled to a plurality of substantially four bar articulated links.

In accordance with one or more aspects of the present disclosure a respective side of the fabric side wall being coupled to a respective side post by a locking snub anchor, the locking snub anchor extending from a slot in the respective side post where the respective side of the fabric side wall is coupled to the locking snub anchor outside of the slot.

In accordance with one or more aspects of the present disclosure the locking snub anchor comprises:
a first locking member having a first portion disposed within the slot and a second portion extending, from the first portion, outside of the slot; and
a second locking member disposed at least partially within the slot, the second locking member interface with each other and the slot to prevent removal of one or both of the first locking member and the second locking member from the slot;
wherein the respective side of the fabric side wall is coupled, outside of the slot, to the second portion of the first locking member.

In accordance with one or more aspects of the present disclosure the child enclosure further comprises:
a hub member including a crank link;
a substantially four bar articulated link operably connected to the crank link;
a push rod connected to the substantially four bar articulated link so that linear movement of the crank link effects, through the substantially four bar articulated link, a linear driving motion of the push rod;
a slide wedge coupled to the push rod, where the linear driving motion of the push rod extends and retracts the slide wedge.
the side structure has a plurality of side posts; and
an upper assembly having upper arms, each upper arm being pivotally coupled to a respective side post;
wherein
each side post has a respective push rod coupled thereto for reciprocating in the linear driving motion along the side post,
each side post has a respective slide wedge, the respective slide wedge comprises
a slide member movably coupled to the side post and the push rod so as to reciprocate with the push rod along the side post, and
a wedge link coupling the slide member with a respective upper arm.

In accordance with one or more aspects of the present disclosure adjacent upper arms are pivotally coupled to each other between adjacent side posts and are at least in part substantially locked in an extended position by extension of the wedge link by the push rod.

In accordance with one or more aspects of the present disclosure the hub member comprises a rack and pinion, the rack forming the crank link and is linearly movable within a hub member housing and the pinion is coupled to a respective substantially four bar articulated link of a plurality of substantially four bar articulated links.

In accordance with one or more aspects of the present disclosure the hub member comprises a connecting link that forms the crank link and connects a plurality of substantially four bar articulated links.

In accordance with one or more aspects of the present disclosure, a child enclosure includes a frame having corner posts and a flexible enclosure coupled to the frame. The flexible enclosure having a plurality of corner sleeves, each corner sleeve corresponding to a respective corner post, the corner sleeve being configured to cover the respective corner post substantially in its entirety between a wheel assembly of the child enclosure coupled to a bottom of the respective corner post and an upper corner assembly of the child enclosure coupled to a top of the corner post.

In accordance with one or more aspects of the present disclosure, the sleeve comprises a coupling member configured to couple a bottom of the sleeve to the respective corner post.

In accordance with one or more aspects of the present disclosure, the coupling member is disposed between the wheel assembly and the respective corner post.

In accordance with one or more aspects of the present disclosure, the coupling member comprises a tab coupled to the corner sleeve.

In accordance with one or more aspects of the present disclosure, the tab comprises one or more of a plastic sheet, plastic ring, metal ring, and metal tab.

In accordance with one or more aspects of the present disclosure the tab is coupled to the sleeve by one or more of stitching, bonding, adhesives, and mechanical fasteners.

In accordance with one or more aspects of the present disclosure, the plurality of corner sleeves are integral with walls of the flexible enclosure.

In accordance with one or more aspects of the present disclosure the crank link is movable within a hub member housing, the crank link being coupled to a plurality of substantially four bar articulated links. It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A child enclosure comprising:
    a hub member including a crank link;
    a substantially four bar linkage articulated link operably connected to the crank link;
    a push rod connected to the substantially four bar linkage articulated link so that linear movement of the crank link effects, through the substantially four bar linkage articulated link, a linear driving motion of the push rod;
    a slide wedge coupled to the push rod, the slide wedge includes a slider and a pivot surface biasing the slider transverse to the linear driving motion of the push rod, where the linear driving motion of the push rod extends and retracts the slider;
    a side structure having a plurality of side posts; and
    an upper assembly having upper arms, each upper arm being pivotally coupled to a respective side post;
    wherein
        each side post has a respective push rod coupled thereto for reciprocating in the linear driving motion along the side post,
        each side post has a respective slide wedge, the respective slide wedge comprises:
            a respective slider movably coupled to the side post and the push rod so as to reciprocate with the push rod along the side post, and
            a respective wedge link coupling the respective slider with a respective upper arm.

2. The child enclosure of claim 1, wherein adjacent upper arms are pivotally coupled to each other between adjacent side posts and are at least in part substantially locked in an extended position by extension of the respective wedge link by the push rod.

3. The child enclosure of claim 1, wherein the hub member comprises a rack and pinion, the rack forming the crank link and is linearly movable within a hub member housing and the pinion is coupled to a respective substantially four bar linkage articulated link of a plurality of substantially four bar linkage articulated links.

4. The child enclosure of claim 1, wherein the hub member comprises a connecting link that forms the crank link and connects a plurality of substantially four bar linkage articulated links.

5. The child enclosure of claim 1, wherein the crank link is movable within a hub member housing, the crank link being coupled to a plurality of substantially four bar linkage articulated links.

6. The child enclosure of claim 1, further comprising:
    a side structure having a plurality of side posts, the side structure being connected to the substantially four bar linkage articulated link; and
    a fabric side wall coupled to adjacent side posts, a respective side of the fabric side wall being coupled to a respective side post by a locking snub anchor, the locking snub anchor extending from a slot in the respective side post where the respective side of the fabric side wall is coupled to the locking snub anchor outside of the slot.

7. The child enclosure of claim 6, wherein the locking snub anchor comprises:
    a first locking member having a first portion disposed within the slot and a second portion extending, from the first portion, outside of the slot; and
    a second locking member disposed at least partially within the slot, the second locking member interface with each other and the slot to prevent removal of one or both of the first locking member and the second locking member from the slot;
    wherein the respective side of the fabric side wall is coupled, outside of the slot, to the second portion of the first locking member.

8. The child enclosure of claim 1, further comprising:
    a frame including the side structure having the plurality of side posts; and
    a fabric side wall coupled to adjacent side posts, a respective side of the fabric side wall being coupled to a respective side post by a sleeve, the sleeve covering the respective side post where the respective side of the fabric side wall is coupled to the sleeve.

9. The child enclosure of claim 8, wherein the sleeve comprises an outer peripheral covering portion covering the outer surface of the respective side post and an inner covering portion covering the interior surface of the respective side post.

10. The child enclosure of claim 8, further comprising:
    an upper assembly having upper arms, each upper arm being pivotally coupled to a respective side post;
    a base structure coupled to the plurality of side posts, the base structure including a plurality of substantially four bar linkage articulated links;
    a hub member including a crank link operably connected to the plurality of substantially four bar linkage articulated links;
    a push rod connected to a respective side post and a respective substantially four bar linkage articulated link so that linear movement of the crank link effects, through the respective substantially four bar linkage articulated link, a linear driving motion of the push rod; and
    a slide wedge coupled to the respective side post and the push rod, the slide wedge includes a slider and a pivot surface biasing the slider transverse to the linear driving motion of the push rod, where the linear driving motion of the push rod extends and retracts the slider so as to extend and retract a respective upper arm.

11. The child enclosure of claim 10, wherein the slide wedge comprises:
    a respective slider movably coupled to the respective side post and the push rod so as to reciprocate with the push rod along the respective side post; and a respective wedge link coupling the respective slider with the respective upper arm.

12. The child enclosure of claim 11, wherein adjacent upper arms are pivotally coupled to each other between adjacent side posts and are at least in part substantially locked in an extended position by extension of the respective wedge link by the push rod.

13. The child enclosure of claim 10, wherein the hub member comprises a rack forming the crank link and a plurality of pinions, the rack is linearly movable within a hub member housing and each pinon of the plurality of pinions is coupled to a respective substantially four bar linkage articulated links of the plurality of substantially four bar linkage articulated links.

14. The child enclosure of claim 10, wherein the hub member comprises a connecting link that forms the crank link and connects the plurality of substantially four bar linkage articulated links.

15. The child enclosure of claim 10, wherein the crank link is movable within a hub member housing, the crank link being coupled to the plurality of substantially four bar linkage articulated links.

16. A child enclosure comprising:
a side structure having a plurality of side posts, each side post having
walls forming an internal space with an elongated guide surface, and a slot formed along at least one of the walls and extending along the elongated internal guide space,
a slide member disposed within the internal space so as to reciprocate within the internal space and guided by the elongated guide surface,
a push rod disposed within the internal space and coupled to the slide member for effecting a linear driving motion to reciprocate the slide member within the internal space, and
a drive link pivotally coupled to the slide member and extending through the slot; and
an upper assembly having upper arms, each upper arm being pivotally coupled to a respective side post and pivotally coupled to a respective drive link wherein, reciprocation of the slide member within the frame effects, through the respective drive link, folding and unfolding of the upper arm relative to the respective side post.

17. The child enclosure of claim 16, wherein the push rod comprises:
an elongated body;
a support surface fixed on the elongated body;
a stop surface fixed on the elongated body and spaced from the support surface; and
a resilient member captured on the elongated body by and between the support surface and the stop surface;
wherein the resilient member engages the slide member and is configured to provide compliant relative movement between the push rod and the slide member.

18. The child enclosure of claim 16, further comprising:
a hub member including a crank link; and
a substantially four bar articulated link operably connected to the crank link;
wherein the push rod is connected to the substantially four bar articulated link so that linear movement of the crank link effects, through the substantially four bar articulated link, the linear driving motion of the push rod.

19. The child enclosure of claim 18, further comprising a fabric side wall coupled to adjacent side posts, a respective side of the fabric side wall being coupled to a respective side post by a sleeve, the sleeve covering the respective side post where the respective side of the fabric side wall is coupled to the sleeve.

20. A child enclosure comprising:
a hub member including a crank link;
a substantially four bar linkage articulated link operably connected to the crank link;
a push rod connected to the substantially four bar linkage articulated link so that linear movement of the crank link effects, through the substantially four bar linkage articulated link, a linear driving motion of the push rod;
a rack assembly coupled to the push rod, the rack assembly includes a gear rack transverse to the linear driving motion of the push rod, where the linear driving motion of the push rod extends and retracts the gear rack;
a side structure having a plurality of side posts; and
an upper assembly having upper arms, each upper arm being pivotally coupled to a respective side post;
wherein
each side post has a respective push rod coupled thereto for reciprocating in the linear driving motion along the side post,
each side post has a respective rack assembly, the respective rack assembly comprises
a respective gear track movably coupled to the side post and the push rod so as to reciprocate with the push rod along the side post, and
a respective articulated driven link coupling the respective gear rack with a respective upper arm.

21. The child enclosure of claim 20, wherein adjacent upper arms are pivotally coupled to each other between adjacent side posts and are at least in part substantially locked in an extended position by extension of the respective articulated driven link by the push rod.

22. The child enclosure of claim 20, wherein the hub member comprises a rack and pinion, the rack forming the crank link and is linearly movable within a hub member housing and the pinion is coupled to a respective substantially four bar linkage articulated link of a plurality of substantially four bar linkage articulated links.

23. The child enclosure of claim 20, wherein the hub member comprises a connecting link that forms the crank link and connects a plurality of substantially four bar linkage articulated links.

24. The child enclosure of claim 20, wherein the crank link is movable within a hub member housing, the crank link being coupled to a plurality of substantially four bar linkage articulated links.

25. The child enclosure of claim 20, further comprising:
a side structure having a plurality of side posts, the side structure being connected to the substantially four bar linkage articulated link; and
a fabric side wall coupled to adjacent side posts, a respective side of the fabric side wall being coupled to a respective side post by a locking snub anchor, the locking snub anchor extending from a slot in the respective side post where the respective side of the fabric side wall is coupled to the locking snub anchor outside of the slot.

26. The child enclosure of claim 25, wherein the locking snub anchor comprises:
a first locking member having a first portion disposed within the slot and a second portion extending, from the first portion, outside of the slot; and
a second locking member disposed at least partially within the slot, the second locking member interface with each other and the slot to prevent removal of one or both of the first locking member and the second locking member from the slot;

wherein the respective side of the fabric side wall is coupled, outside of the slot, to the second portion of the first locking member.

\* \* \* \* \*